(12) United States Patent
Maylor et al.

(10) Patent No.: US 11,258,785 B2
(45) Date of Patent: *Feb. 22, 2022

(54) USER LOGIN CREDENTIAL WARNING SYSTEM

(71) Applicant: Mimecast Services Ltd., London (GB)

(72) Inventors: Jackie Anne Maylor, Wiltshire (GB); Simon Paul Tyler, Wiltshire (GB); Steven Malone, Berkshire (GB); Wayne Van Ry, Longon (GB); Francisco Ribeiro, London (GB)

(73) Assignee: Mimecast Services Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,604

(22) Filed: Jan. 2, 2020

(65) Prior Publication Data
US 2020/0186514 A1    Jun. 11, 2020

Related U.S. Application Data

(63) Continuation of application No. 15/461,857, filed on Mar. 17, 2017, now Pat. No. 10,536,449, which is a
(Continued)

(51) Int. Cl.
*H04L 29/06* (2006.01)
*G06F 21/62* (2013.01)
(Continued)

(52) U.S. Cl.
CPC ........ *H04L 63/083* (2013.01); *G06F 16/9535* (2019.01); *G06F 21/45* (2013.01);
(Continued)

(58) Field of Classification Search
CPC . H04L 63/083; H04L 63/0281; H04L 51/046; H04L 51/12; H04L 63/20;
(Continued)

(56) References Cited

U.S. PATENT DOCUMENTS 5,959,542 A    9/1999 Ishida
6,253,193 B1   6/2001 Ginter et al.
(Continued)

OTHER PUBLICATIONS

AVG Technologies, 'AVG AntiVirus Free Edition User Manual', revision AVG.22 (Aug. 8, 2016), AVG Technologies CZ, entire document,http://files-download.avg.com/doc/AVG_free_uma_en_ltst_22.pdf.

(Continued)

*Primary Examiner* — Abu S Sholeman
(74) *Attorney, Agent, or Firm* — Nutter McClennen & Fish LLP

(57) ABSTRACT

Virtually every online account requires login credentials like username and password for access. Using different credentials for each account can reduce the likelihood of unauthorized access to these accounts. Remembering all the different credentials, however, can be a challenge and it is not uncommon for a user to mistakenly provide credentials to a site that are for another, sensitive site. Accordingly, a system for warning a user of such an error is provided. The system includes a browser plugin that responds to a user entering their credentials at a requesting site by looking up an identifier of a trusted site associated with the user's credentials. The identifiers of the requesting and trusted sites are compared, and if they do not match, the browser plugin blocks the user from submitting their credentials to the requesting site. Advantageously, the system reduces the likelihood that credentials to sensitive accounts are provided by accident.

18 Claims, 37 Drawing Sheets

Related U.S. Application Data continuation-in-part of application No. 15/010,023, filed on Jan. 29, 2016, now Pat. No. 9,654,492, which is a continuation-in-part of application No. 14/855,200, filed on Sep. 15, 2015, now Pat. No. 9,467,435.

(51) Int. Cl.

| | | |
|---|---|---|
| *G06F 16/9535* | (2019.01) | |
| *H04L 12/58* | (2006.01) | |
| *G06F 21/45* | (2013.01) | |
| *G06F 21/55* | (2013.01) | |
| *H04L 12/46* | (2006.01) | |

(52) U.S. Cl.
CPC ........ *G06F 21/554* (2013.01); *G06F 21/6245* (2013.01); *H04L 12/4641* (2013.01); *H04L 51/046* (2013.01); *H04L 51/12* (2013.01); *H04L 63/0236* (2013.01); *H04L 63/0254* (2013.01); *H04L 63/0281* (2013.01); *H04L 63/08* (2013.01); *H04L 63/105* (2013.01); *H04L 63/1441* (2013.01); *H04L 63/20* (2013.01)

(58) Field of Classification Search
CPC ............... H04L 63/105; H04L 63/0254; H04L 63/1441; H04L 63/08; H04L 63/0236; H04L 12/4641; H04L 63/1416; G06F 21/45; G06F 21/554; G06F 16/9535; G06F 21/6245; G06F 21/56
See application file for complete search history.

(56) References Cited

U.S. PATENT DOCUMENTS

| | | | |
|---|---|---|---|
| 6,931,532 B1 | 8/2005 | Davis et al. | |
| 6,965,968 B1 | 11/2005 | Touboul | |
| 7,058,822 B2 | 6/2006 | Edery et al. | |
| 7,240,212 B2 | 7/2007 | Arnone et al. | |
| 7,363,490 B2 | 4/2008 | Paulsen, Jr. et al. | |
| 7,418,731 B2 | 8/2008 | Touboul | |
| 7,444,380 B1 | 10/2008 | Diamond | |
| 7,562,382 B2 | 7/2009 | Hinton et al. | |
| 7,647,633 B2 | 1/2010 | Edery et al. | |
| 7,653,695 B2 | 1/2010 | Flury et al. | |
| 7,827,402 B2 | 11/2010 | Smith | |
| 7,970,843 B2 | 6/2011 | Brown et al. | |
| 8,019,689 B1* | 9/2011 | Nachenberg ....... G06Q 20/0855 | |
| | | | 705/64 |
| 8,141,154 B2 | 3/2012 | Gruzman et al. | |
| 8,145,718 B1 | 3/2012 | Kacker et al. | |
| 8,281,372 B1 | 10/2012 | Vidal | |
| 8,392,357 B1 | 3/2013 | Zou et al. | |
| 8,522,331 B2 | 8/2013 | Onozawa | |
| 8,635,690 B2 | 1/2014 | Alperovitch | |
| 8,667,069 B1 | 3/2014 | Connelly et al. | |
| 8,843,516 B2* | 9/2014 | Leong ................. H04L 63/1483 | |
| | | | 707/770 |
| 8,843,997 B1 | 9/2014 | Hare | |
| 8,862,675 B1 | 10/2014 | Coomer | |
| 8,990,392 B1 | 3/2015 | Stamos | |
| 9,027,115 B2 | 5/2015 | Larson et al. | |
| 9,129,116 B1 | 9/2015 | Wiltzius | |
| 9,154,498 B2 | 10/2015 | Byrne et al. | |
| 9,177,293 B1 | 11/2015 | Gagnon | |
| 9,344,449 B2* | 5/2016 | Brown ................ H04L 63/1483 | |
| 9,413,774 B1 | 8/2016 | Liu et al. | |
| 9,467,410 B2 | 10/2016 | Liebmann et al. | |
| 9,467,435 B1 | 10/2016 | Tyler et al. | |
| 9,760,697 B1 | 9/2017 | Walker | |
| 10,050,998 B1 | 8/2018 | Singh | |
| 10,148,683 B1 | 12/2018 | Lin | |
| 10,277,628 B1 | 4/2019 | Jakobsson | |
| 10,536,449 B2 | 1/2020 | Maylor et al. | |
| 10,586,261 B2 | 3/2020 | Baig | |
| 10,609,073 B2 | 3/2020 | Jakobsson | |
| 10,728,239 B2 | 7/2020 | Maylor et al. | |
| 2002/0091019 A1* | 7/2002 | Bays ..................... A63B 71/06 | |
| | | | 473/407 |
| 2002/0095567 A1 | 7/2002 | Royer et al. | |
| 2002/0199096 A1 | 12/2002 | Wenocur et al. | |
| 2003/0051054 A1 | 3/2003 | Redlich et al. | |
| 2003/0065941 A1 | 4/2003 | Ballard et al. | |
| 2003/0110272 A1 | 6/2003 | du Castel et al. | |
| 2003/0182383 A1 | 9/2003 | He | |
| 2003/0202663 A1 | 10/2003 | Hollis et al. | |
| 2003/0204569 A1 | 10/2003 | Andrews et al. | |
| 2003/0227487 A1 | 12/2003 | Hugh | |
| 2004/0003398 A1 | 1/2004 | Donian | |
| 2004/0070678 A1* | 4/2004 | Toyama ............ H04N 1/00172 | |
| | | | 348/231.3 |
| 2004/0083270 A1 | 4/2004 | Heckerman et al. | |
| 2004/0086127 A1 | 5/2004 | Candelore | |
| 2004/0249897 A1 | 12/2004 | Espinosa | |
| 2005/0033855 A1* | 2/2005 | Moradi ................ G06Q 10/107 | |
| | | | 709/231 |
| 2005/0076222 A1 | 4/2005 | Olkin et al. | |
| 2005/0278540 A1 | 12/2005 | Cho | |
| 2006/0015945 A1 | 1/2006 | Fields | |
| 2006/0021031 A1* | 1/2006 | Leahy ................. H04L 63/1483 | |
| | | | 726/22 |
| 2006/0031359 A1 | 2/2006 | Clegg et al. | |
| 2006/0106802 A1 | 5/2006 | Giblin et al. | |
| 2006/0119288 A1 | 6/2006 | Ayala et al. | |
| 2006/0168006 A1 | 7/2006 | Shannon et al. | |
| 2006/0212931 A1 | 9/2006 | Shull | |
| 2006/0253458 A1* | 11/2006 | Dixon ................... H04L 63/101 | |
| 2007/0005713 A1 | 1/2007 | LeVasseur et al. | |
| 2007/0005984 A1 | 1/2007 | Florencio | |
| 2007/0038614 A1* | 2/2007 | Guha ................. G06F 16/24534 | |
| 2007/0079379 A1 | 4/2007 | Sprosts et al. | |
| 2007/0143271 A1 | 6/2007 | Yuval et al. | |
| 2007/0143827 A1 | 6/2007 | Nicodemus et al. | |
| 2007/0192853 A1 | 8/2007 | Shraim et al. | |
| 2007/0245422 A1 | 10/2007 | Hwang | |
| 2007/0294292 A1 | 12/2007 | Hydrie | |
| 2008/0028444 A1 | 1/2008 | Loesch | |
| 2008/0115227 A1 | 5/2008 | Toutonghi | |
| 2008/0127319 A1 | 5/2008 | Galloway | |
| 2008/0127339 A1 | 5/2008 | Swain et al. | |
| 2008/0148376 A1 | 6/2008 | Onozawa | |
| 2008/0178278 A1 | 7/2008 | Grinstein et al. | |
| 2008/0222425 A1 | 9/2008 | Buss | |
| 2008/0250106 A1 | 10/2008 | Rugg et al. | |
| 2008/0250114 A1 | 10/2008 | Dubovsky et al. | |
| 2008/0301445 A1 | 12/2008 | Vasic et al. | |
| 2009/0006532 A1 | 1/2009 | Sinn | |
| 2009/0063426 A1 | 3/2009 | Crouch et al. | |
| 2009/0097662 A1 | 4/2009 | Olechowski et al. | |
| 2009/0157490 A1 | 6/2009 | Lawyer | |
| 2009/0216841 A1 | 8/2009 | Choi et al. | |
| 2010/0175136 A1 | 7/2010 | Frumer et al. | |
| 2010/0211459 A1 | 8/2010 | Seeman et al. | |
| 2010/0306819 A1* | 12/2010 | Nahari ................. H04L 63/168 | |
| | | | 726/2 |
| 2011/0055004 A1 | 3/2011 | Libby | |
| 2011/0113109 A1 | 5/2011 | LeVasseur et al. | |
| 2011/0119258 A1 | 5/2011 | Forutanpour et al. | |
| 2011/0145580 A1 | 6/2011 | Auradkar et al. | |
| 2011/0179362 A1 | 7/2011 | Craddock et al. | |
| 2011/0296179 A1 | 12/2011 | Templin et al. | |
| 2012/0272317 A1 | 10/2012 | Rubin et al. | |
| 2012/0272319 A1 | 10/2012 | Shi et al. | |
| 2013/0047254 A1 | 2/2013 | Radhakrishnan et al. | |
| 2013/0074191 A1 | 3/2013 | Ben-Reuven | |
| 2013/0091580 A1 | 4/2013 | Maha et al. | |
| 2013/0298192 A1 | 11/2013 | Kumar | |
| 2014/0040394 A1 | 2/2014 | Tang | |
| 2014/0229617 A1 | 8/2014 | Cyr et al. | |
| 2014/0282964 A1 | 9/2014 | Stubblefield | |
| 2014/0331119 A1 | 11/2014 | Dixon | |
| 2014/0373127 A1* | 12/2014 | Thayer ................ H04L 63/0876 | |
| | | | 726/10 |

(56) References Cited

U.S. PATENT DOCUMENTS

| | | | |
|---|---|---|---|
| 2015/0032829 A1 | 1/2015 | Barshow et al. | |
| 2015/0039886 A1 | 2/2015 | Kahol et al. | |
| 2015/0121063 A1 | 4/2015 | Maller et al. | |
| 2015/0281262 A1 | 10/2015 | Cai et al. | |
| 2015/0350143 A1 | 12/2015 | Yang et al. | |
| 2016/0012213 A1 | 1/2016 | Walsh | |
| 2016/0036833 A1 | 2/2016 | Ardeli | |
| 2016/0119288 A1 | 4/2016 | Ardeli et al. | |
| 2016/0142426 A1* | 5/2016 | Bird | H04L 63/145 726/23 |
| 2017/0026393 A1 | 1/2017 | Walsh | |
| 2017/0078321 A1 | 3/2017 | Maylor et al. | |
| 2017/0148032 A1* | 5/2017 | Corniuk | G06Q 30/018 |
| 2018/0191754 A1 | 7/2018 | Higbee | |
| 2020/0137110 A1 | 4/2020 | Tyler et al. | |
| 2020/0186514 A1 | 6/2020 | Maylor et al. | |
| 2020/0358798 A1 | 11/2020 | Maylor et al. | |

OTHER PUBLICATIONS

Blue Coat Systems Inc., 'Web Application Firewall for Web Environments', Blue Coat Systems Inc., 2015, entire document, https://www.bluecoat.com/documents/download/c8988db3-06c0-4fb5-8bf2-2ec3e- 934e18e/f86a2dc5-cc4c-4756-b82a-1605470ede21.

Proofpoint/Gartner, Inc., 'Protecting the way people work: best practices for detecting and mitigating advanced persistent threats', Gartner, Inc., May 4, 2015, entire document,http://www.ciosummits.com/Online_Assets_Proofpoint_Gartner_Best_Practices- .pdf.

SpamTitan, 'SpamTitan Administrators Guide v6.02',2014, SpamTitan, entire document, http://www.spamtitan.com/updates/PDF/Technical%20Documentation/- SpamTitan_Administrators_Guide_v602160414_gh.pdf.

United States Patent and Trademark Office, Non-Final Office Action for U.S. Appl. No. 16/727,480, dated Feb. 23, 2021, 24 pages.

* cited by examiner

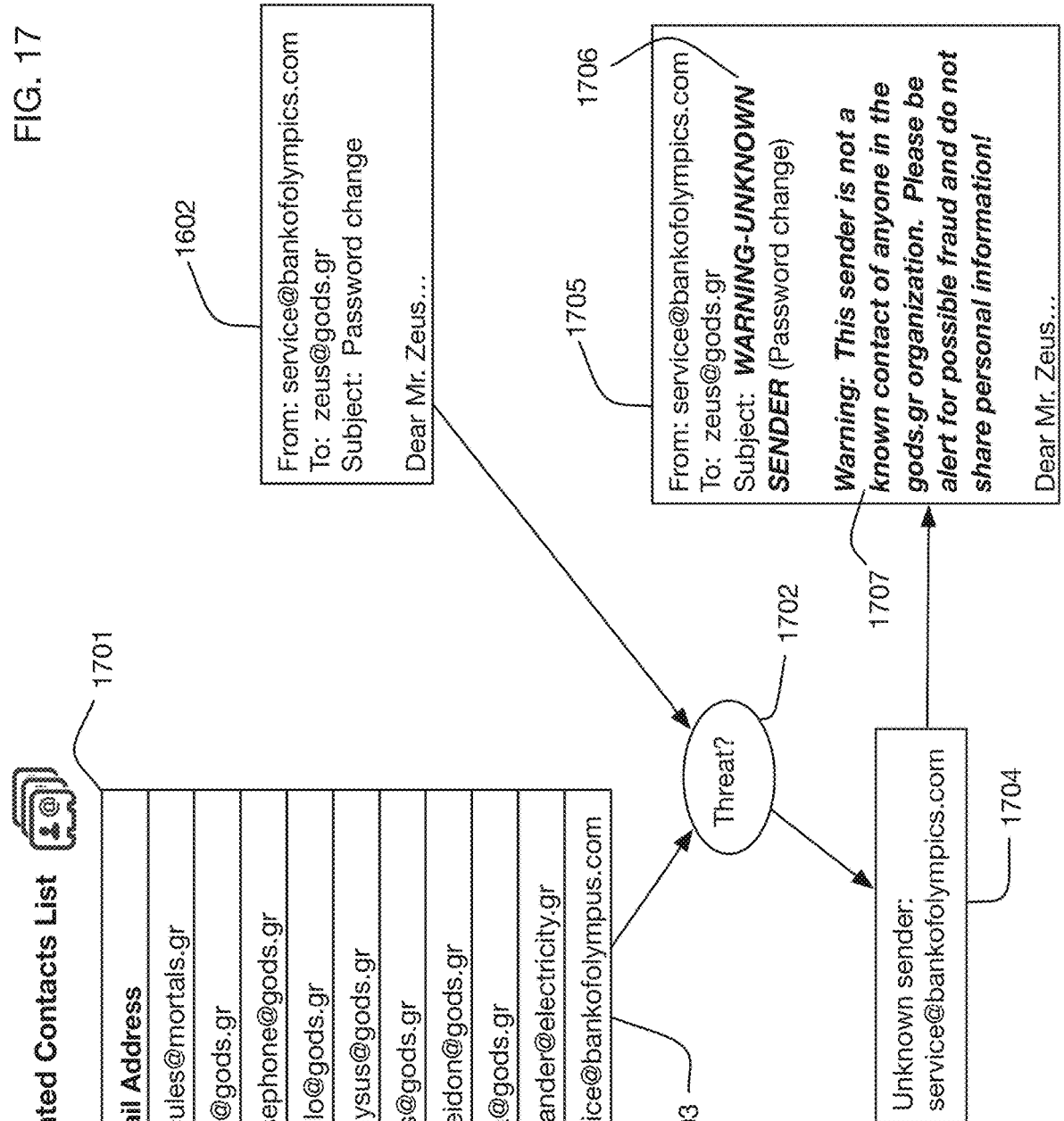

FIG. 18A

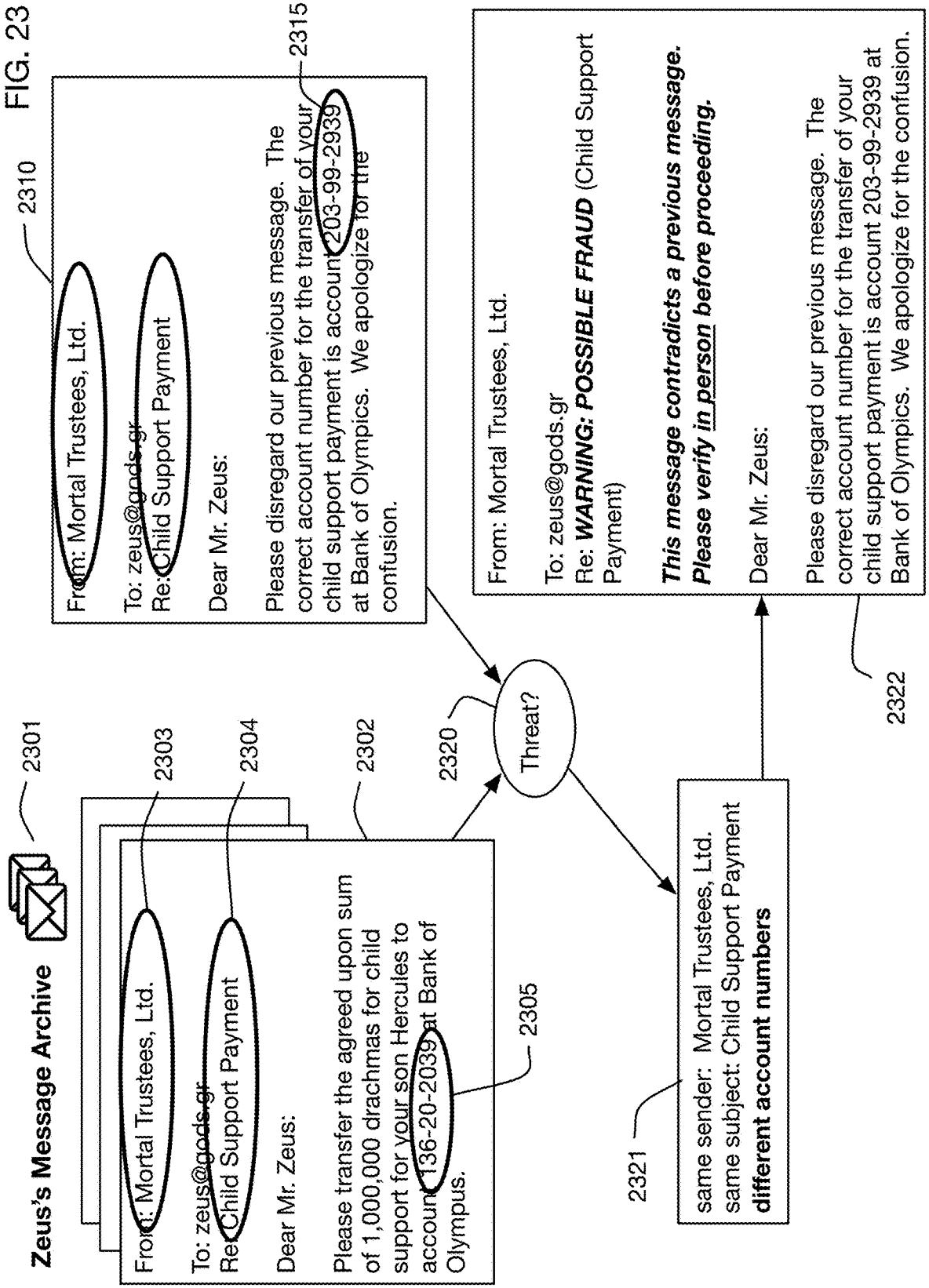

FIG. 24

Zeus's Message Archive 

| From | Subject |
|---|---|
| service@bankofolympus.com | Statement Available |
| service@bankofolympus.com | Your Personal Banker |
| service@bankofolympus.com | Statement Available |
| service@bankofolympus.com | Statement Available |
| service@bankofolympus.com | Line of Credit |

2401

2403

2402

From: Bank of Olympus
<service@bankofolympus.com>
To: zeus@gods.gr
Re: Password Change Dear Mr. Zeus:

At Bank of Olympus we ask customers to change their password every 6 months for security purposes. Please update your password at www.bankofolympics.com

2406

2404 Threat?

2405

Unusual request from Bank of Olympus:

5 previous messages from this sender: none with "Please update your password"; none with embedded link.

2410

From: Bank of Olympus
<service@bankofolympus.com>
To: zeus@gods.gr
Re: Password Change Dear Mr. Zeus:

At Bank of Olympus we ask customers to change their password every 6 months for security purposes. Please update your password at www.safelink.com/x39472a83

2411

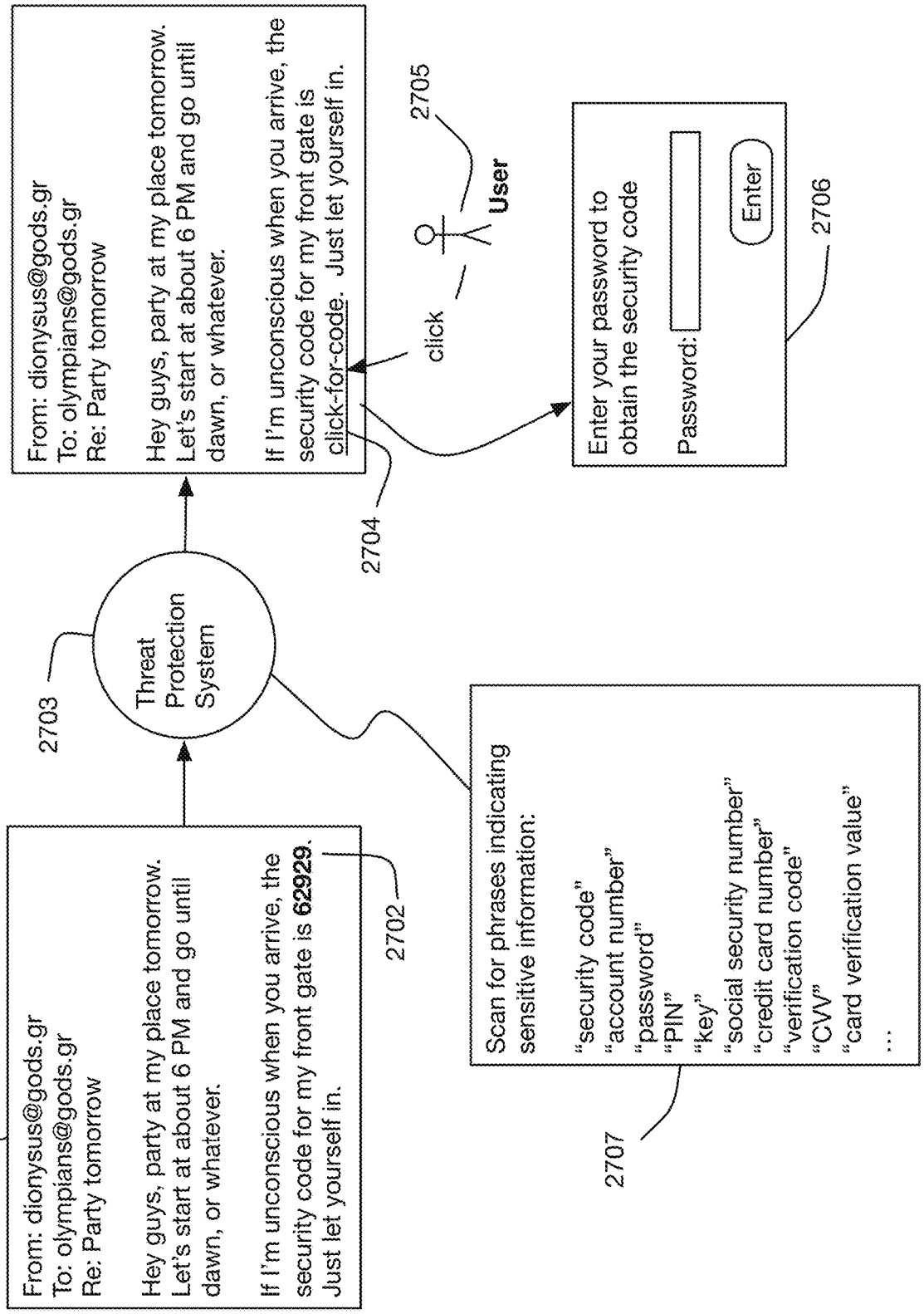

USER LOGIN CREDENTIAL WARNING SYSTEM

This application is a continuation of U.S. Utility patent application Ser. No. 15/461,857, filed Mar. 17, 2017 (now issued as U.S. Pat. No. 10,536,449), which is a continuation-in-part of U.S. Utility patent application Ser. No. 15/010,023, filed Jan. 29, 2016 (now issued as U.S. Pat. No. 9,654,492), which is a continuation-in-part of U.S. Utility patent application Ser. No. 14/855,200, filed Sep. 15, 2015 (now issued as U.S. Pat. No. 9,467,435). The specification of each of the foregoing applications is hereby incorporated herein by reference.

BACKGROUND

One or more embodiments of the invention are related to the field of data processing and electronic messaging systems. More particularly, but not by way of limitation, one or more embodiments of the invention enable a malware detection system based on stored data that for example uses contact lists and message archives of a messaging system database to determine whether a message presents a potential threat, such as for example a phishing attack.

Existing systems that enable communication of electronic messages include email, instant message, text message, calendar, and audio and video messaging systems. Electronic messages may contain security threats such as attachments with viruses, or phishing attacks with links to websites that attempt to steal sensitive information or malware. Message recipients are often unable or unwilling to protect themselves sufficiently from these threats. Therefore, electronic message security systems have emerged in the art to provide a degree of protection against some threats embedded in messages. For example, systems that automatically scan message attachments for viruses are known in the art.

Threats in web page links, such as phishing attacks, present a more complex challenge. Blocking all links may be impractical. Checking a link prior to sending a message to a recipient provides incomplete protection, since it is possible for a site to become malicious or to be recognized as malicious after the initial check. For improved security there is a need for a system that checks links, and other resources or resource references embedded in electronic messages, at the time the message recipient accesses them. However, this solution presents an additional challenge since message recipients can easily copy and share protected resource references that incorporate security checks. The security checking resources and benefits are therefore made available to anyone. Moreover, security checking resources are consumed on each access to a protected reference; widespread distribution of copies of these protected references can therefore overwhelm security checking system resources such as processor capacity, memory, or network bandwidth. Social media sites and social messaging systems compound this problem because links or other references may be shared instantly with many thousands of users. Ideally the protection offered by a security system should be available only to authorized users of the system. There are no known systems that combine electronic message threat protection with user authorization, in order to limit threat protection to those users that the system intends to protect.

Existing threat protection systems generally analyze electronic messages using rules or threat signatures configured by administrators or obtained from security firms. For example, administrators may configure whitelists of websites known to be legitimate, and blacklists of websites known to be malicious. This approach is time-consuming and resource intensive. Moreover, rules and signatures are frequently out-of-date, providing inadequate threat protection. There are no known systems that create threat rules and signatures dynamically based on the messages previously received or the contacts added to a messaging system database.

For at least the limitations described above there is a need for a malware detection system based on stored data that protects against threats in electronic messages, and that for example uses stored data such as the contacts and message archives of a messaging system database to check a message for potential threats or malware.

SUMMARY

Virtually every online account requires at least a username and password, commonly referred as to "login credentials", in order to access the account. Good password hygiene is the key to reducing the likelihood that a scam artist or criminal can access these accounts. It is recommended, among other things, that a user have a different password for each of their accounts and not to reuse passwords. At the very least, the user should have different login credentials to access their company account, bank account, email account, and other highly sensitive accounts.

Remembering all the different login credentials can be a challenge and it is not uncommon for a user to enter a password that is restricted to another, sensitive site. For example, the user forgets which login credentials to use for a site and they start entering every username, password, and combination they can think of or have used on other sites in the hopes entering the right one. One downside to this approach, which amounts to guessing, is that the user needlessly divulges login credentials, some of which may be for highly sensitive accounts. More troublesome, the user makes this a hazard disclosure over the public network to remote servers making the information susceptible to being stolen. Best practice would be, for example, to only send login credentials to a company account to a company server and no one else. Accordingly, a technique for warning a user when they provide a password that is restricted to another, sensitive site is provided.

The technique includes querying a data store with a user's login credentials to obtain one or more trusted site identifiers of a trusted site associated with the login credentials. This querying is in response to the user entering their login credentials at a requesting site, which prompted the user for their login credentials. The querying of the data store can be done as the user enters in each character of their login credentials.

The technique further includes comparing the trusted site identifiers with a corresponding number of identifiers of the requesting site, and then blocking the user from submitting the entered login credentials to the requesting site based on the comparison. The comparison can be done by determining a suspicion score and identifying the requesting site as an unsafe site based on the suspicion score. In this example of the technique, the user is blocked from submitting their login credentials to the unsafe site.

The requesting site can be identified as unsafe by comparing the suspicion score to a threshold. For example, the requesting site is unsafe when the suspicion score is below the threshold value of 5. The requesting site can also be identified as unsafe when the suspicion score is in a specified range of values. For example, the requesting site is unsafe when the suspicion score is between 0 and 5. The suspicion score can be determined by graphically comparing a screen image of the requesting site to a screen image of the trusted site. The suspicion score is determined, at least in part, based on the graphical comparison. The suspicion score can be a similarity metric that is determined based on a degree of similarity between the requesting site identifiers and trusted site identifiers. Additionally, the suspicion score can be a similarity metric that is determined based on a degree of similarity between a display representation of the requesting site identifier and a display representation of the trusted site identifier.

When the requesting site identifiers do not match the trusted site identifiers, the technique can block the user from submitting the entered login credentials to the requesting site. Alternatively, the technique can provide a warning to the user that the login credentials they entered are restricted to another, sensitive site.

In warning the user, the technique can obtain one or more trusted site identifiers and compare them with a corresponding number of requesting site identifiers. The requesting site identifiers and trusted site identifiers can be Uniform Resource Locators, Uniform Resource Identifiers, Internet Protocol addresses, domain names, or a combination of them.

Advantageously, the technique encourages a user to have good password hygiene and use different login credentials for each of their accounts. It also helps the user reduce the likelihood of giving out credentials to sensitive accounts by accident, like when they absently mindedly enter their company's ACTIVE DIRECTORY credentials into a DROPBOX login page.

BRIEF DESCRIPTION OF THE DRAWINGS

The above and other aspects, features and advantages of the invention will be more apparent from the following more particular description thereof, presented in conjunction with the following drawings wherein:

FIG. 17 illustrates an embodiment that detects a potential threat if a message is from a sender who is not in the Contacts list.

FIG. 18A illustrates a variation of the embodiment shown in FIG. 18; this variation compares biometric identifiers (fingerprints) of a sender with biometric identifiers of known contacts, in addition to comparing email addresses.

FIG. 23 illustrates an embodiment that detects a potential threat if a message contradicts a previous message; in this case the new message provides an account number that differs from a previously sent account number.

FIG. 24 illustrates an embodiment that detects a potential threat if a message is unusual compared to a pattern of previously received messages from the sender.

FIG. 27 illustrates an embodiment that transforms a message to encode and hide potentially sensitive information.

DETAILED DESCRIPTION

A malware detection system based on stored data that enables electronic message threat protection will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
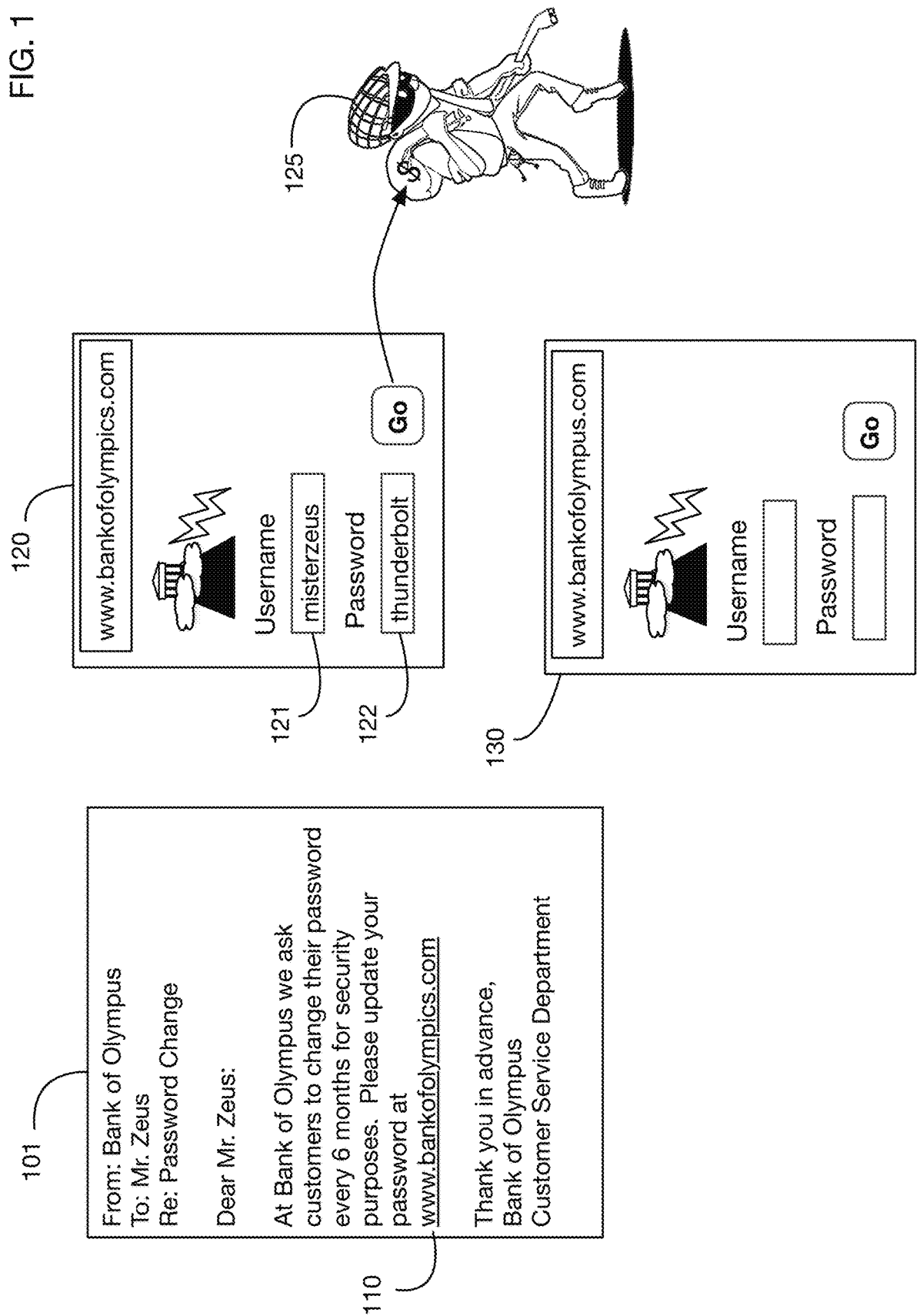
FIG. 1 illustrates an example of a problem addressed by one or more embodiments of the invention: an email contains a link that appears to refer to a legitimate web page, but is in fact a phishing attack designed to steal a user's credentials.

FIG. 1 illustrates an example of a problem that one or more embodiments of the invention address. This problem is that electronic messages may contain resources or references to resources that contain threats. Resources may present many different kinds of threats, such as for example viruses, worms, Trojan horses, or malware. FIG. 1 illustrates a particular example of a phishing attack threat embedded in a link reference to a web page. Electronic message 101, an email message, contains a link 110, and it asks the receiver to click on the link. As is typical of spear-phishing attacks, the message 101 is addressed to a specific receiver and it includes enough plausible information to make the receiver believe that the message is legitimate. The link 110 actually points to a malicious website 120, which is designed to look very similar to the legitimate website 130 that the recipient believes he is viewing. The URLs of the malicious site 120 and the legitimate site 130 are only subtly different, reinforcing the illusion. If the recipient enters his name 121 and password 122 into the malicious web page, they are sent to a thief 125 who can then use these credentials as desired.

This example illustrates a particular type of threat addressed by one or more embodiments of the invention. One or more embodiments may address any type of threat embedded in any type of electronic message. Threats may be incorporated for example, without limitation, into email messages, instant messages, text messages, personal messages, chat messages, Twitter™ messages, Instagrams™, voicemails, video messages; and postings onto social media sites, blogs, forums, newsgroups, wikis, or databases. Threats may include for example, without limitation, viruses, worms, spam, phishing attacks, spear-phishing attacks, social engineering attacks, denial of service attacks, advertisements, malware, adware, and ransomware. Threats may be embedded into any types of resources included in or referred to in an electronic message, including for example, without limitation, attachments, files, links, media, forms, workflow automation mechanisms, or embedded or linked code in JavaScript or any other language.

Figure 2:
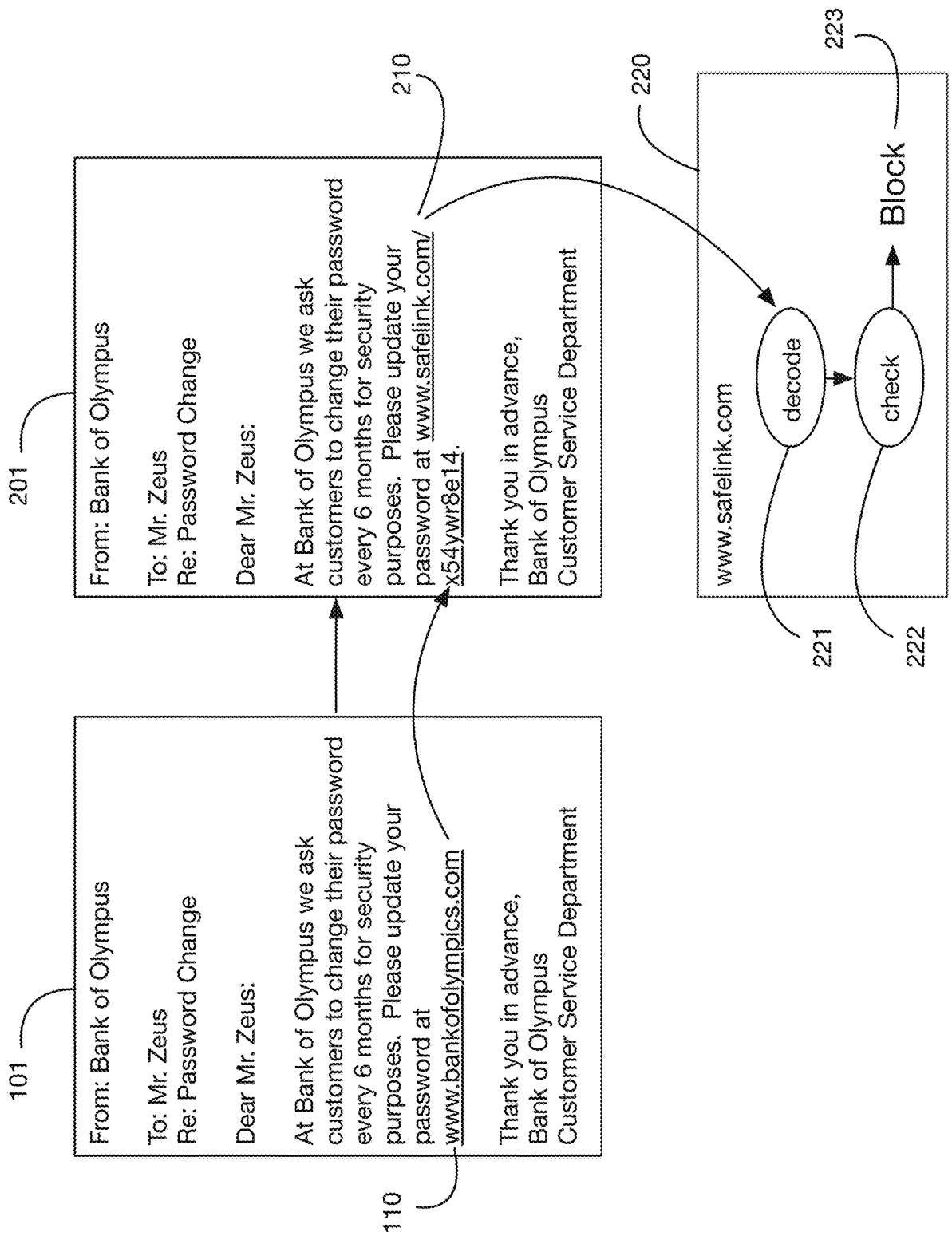
FIG. 2 illustrates a potential solution to the problem shown in FIG. 1 that is used in one or more embodiments of the invention, where a link is rewritten into an encoded form with threat checking added when a user clicks the encoded link.

FIG. 2 illustrates an example of a solution to the problem shown in FIG. 1 that is provided by one or more embodiments. Instead of sending email message 101 with malicious link 110 directly to the recipient, an email security layer transforms the message 101 into message 201, which transforms the link 110 to a protected, encoded link 210. The encoded link 210 does not connect directly to the web page 120. Instead it provides a level of indirection that incorporates a security check before opening the target web page. For example, the encoded link 210 points to a proxy server 220 (with URL "www.safelink.com"), and the encoded link 210 has a path ("x54ywr8e14") that is used internally by the proxy server to identify the original web page referred to by link 110. The proxy server 220 executes a decode step 221 to recover the original link, and it performs a check 222 on the web page before opening it and sending its contents to the user. In this example the check 222 shows that the web page is malicious, so the proxy server blocks access 223 rather than allowing the user to see the malicious web page. One or more embodiments may use any desired methods to encode and decode links or other resource references. Any form of encoding may be used as long is enough information is available in the encoded link or encoded resource reference to recover the original link or reference. For example, one or more embodiments may use an invertible function to convert a link to an encoded form, and apply the inverse function to recover the original link. One or more embodiments may store an original link in a memory or database accessible to the proxy server, and generate a reference to the saved link address as the encoded link. One or more embodiments may for example keep a copy of the original message with the original resource references, and generate an encoded resource reference as a reference to the original message along with for example an offset identifying the location of the original reference in the original message.

Figure 3:
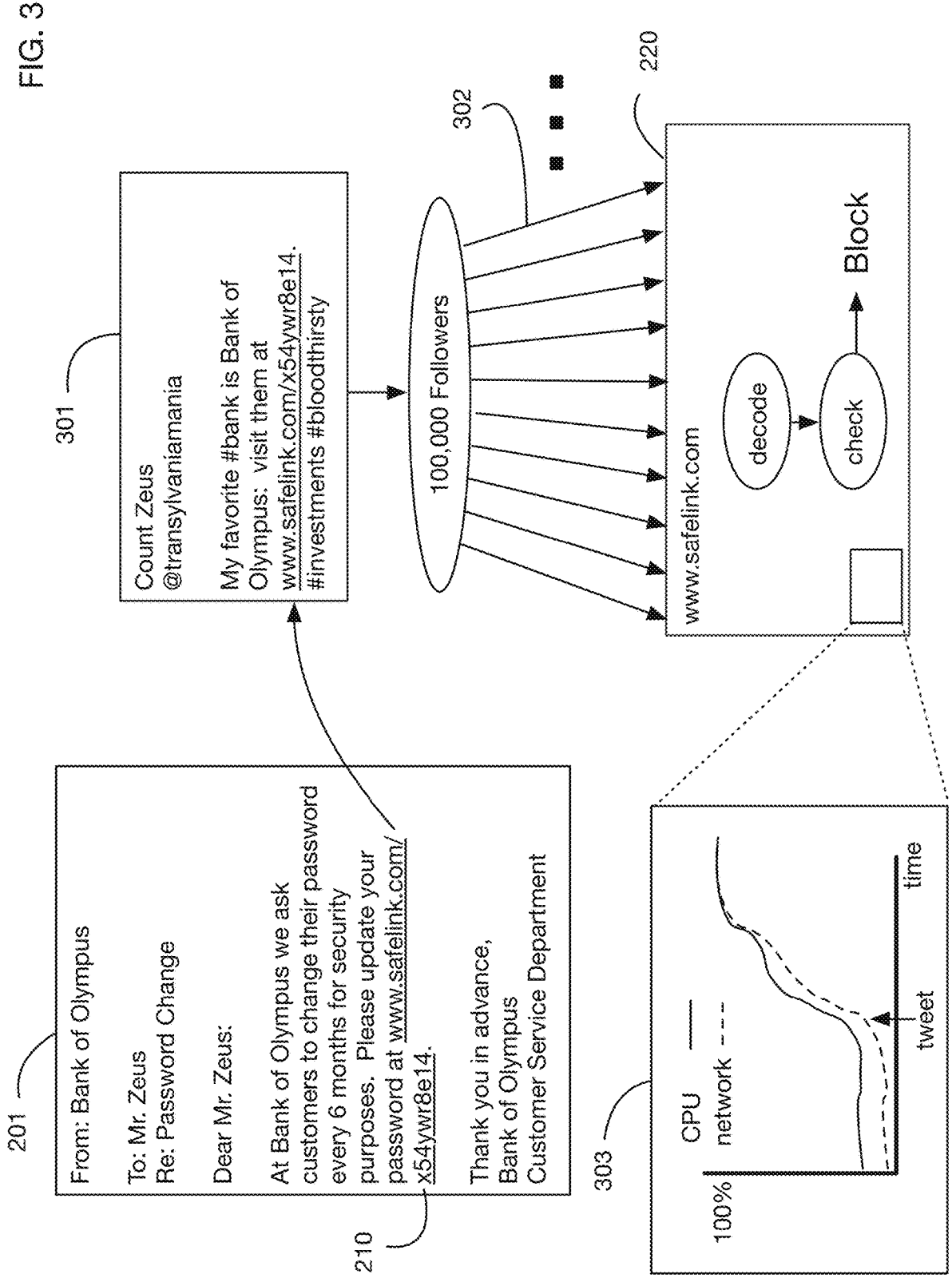
FIG. 3 illustrates a potential problem of the solution shown in FIG. 2, where an encoded link may be shared with a large number of people, many of whom may not have purchased threat protection, potentially overloading the threat protection system resources.

While the solution illustrated in FIG. 2 addresses the original threat of FIG. 1, it may create an additional problem, as illustrated for example in FIG. 3. Users can often copy resource references from electronic messages and redistribute or post them elsewhere. For example, users may copy and paste links, or forward messages to other users. If a resource reference is rewritten in a protected form, as illustrated in FIG. 2, the protected reference will be copied and distributed instead of the original reference. The protection provided by the system will then be available to any user of the copied protected references. This uncontrolled copying may create several problems, including an economic problem that the services provided by the system are available for free to users who did not pay for the services. In addition, FIG. 3 illustrates that widespread copying may create extreme system utilization problems. In FIG. 3, transformed message 201 has a protected link 210. The recipient of the message copies this link and widely distributes it, here in a tweet message 301. In this illustrative example, the user posting tweet 301 has a very large number of followers, each of whom receives a copy of the protected link 210. If many of these users attempt to access the protected link simultaneously, a very large number of requests 302 will be sent to proxy server 220. These requests may cause the resource utilization 303 of the proxy server to spike, potentially to the point that the server becomes unresponsive and unusable.

Uncontrolled copying of protected references may create additional problems. For example, in one or more embodiments protected references such as protected links may include information about the sender or recipient of the electronic message. This information may then be leaked along with the protected reference. Moreover, these leaks may be unintentional since the message recipient may not realize that this sensitive information is embedded in the protected reference. As an example, one or more embodiments of the system may provide an interface that shows personalized messages to a recipient when the recipient clicks on a protected link; these messages may for instance include sensitive information about the recipient or about the recipient's organization that should not be shared with others.

Figure 4:
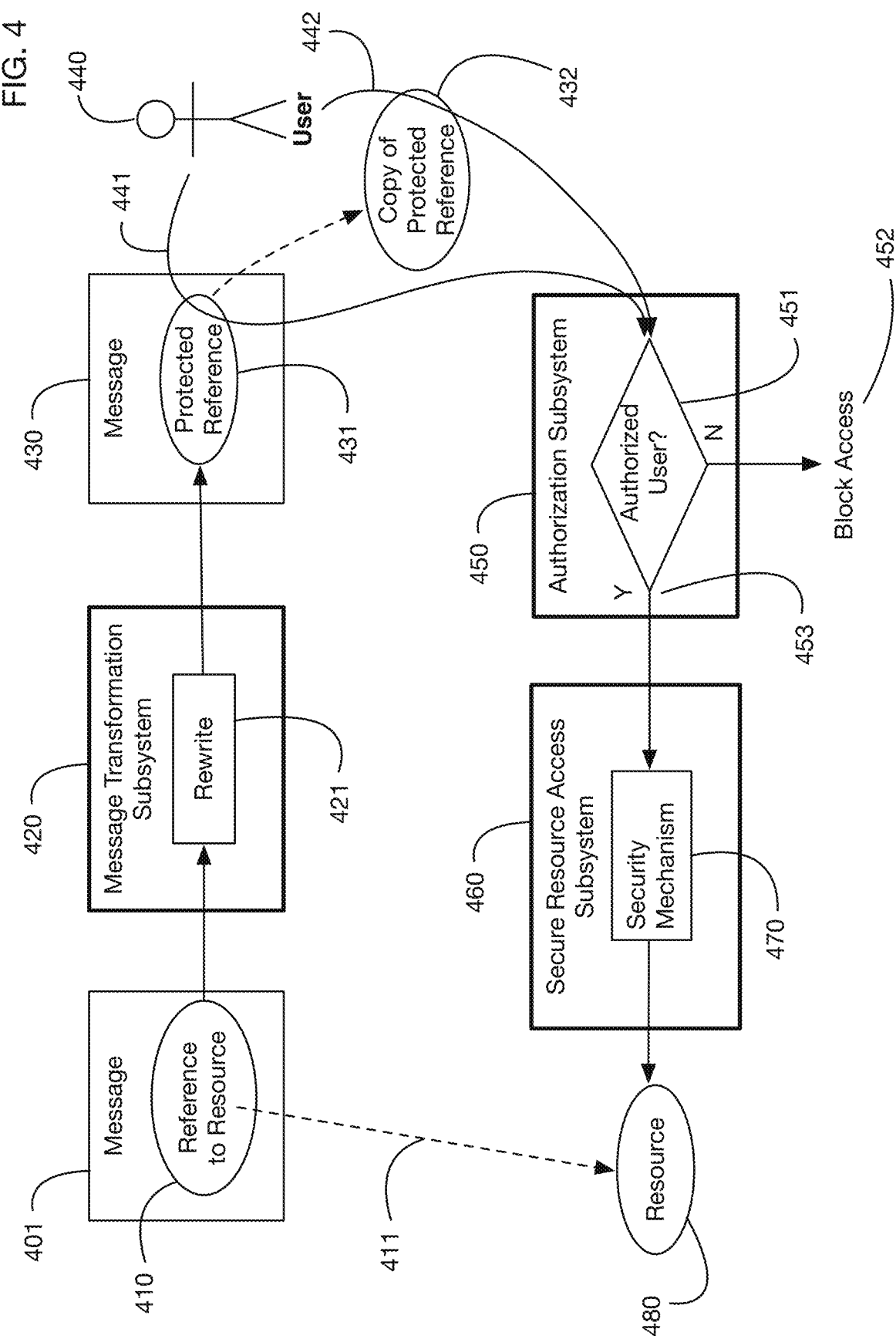
FIG. 4 illustrates an architectural block diagram of an embodiment that addresses issues like those shown in FIG. 3 by providing threat protection only to authorized users.

FIG. 4 illustrates an architectural block diagram of one or more embodiments of the invention that address the types of problems illustrated in FIG. 3. These embodiments add a user authorization check to the system to ensure that only authorized users receive the benefit of the threat protection transformations and checks. The system receives as input an electronic message 401 that contains a reference 410 to a resource. The reference 410 provides a link or a pointer 411 to a resource 480. In one or more embodiments the resource itself may be included directly in a message, rather than indirectly via a reference; in this case the reference 410 and the resource 480 may be considered identical. This link or pointer may have any form, such as for example, without limitation, a name, a directory name, an attachment, an address, a memory location, a key, an index, a virtual address, a URL, a URI, or a URN. The message may also have one or more senders and one or more recipients, as well as any other content or message parts.

As discussed above, one or more embodiments may receive electronic messages of any type, which may include resource references of any type. The single reference 410 in message 401 is for illustration only; one or more embodiments may accept and process messages with any number of resource references. An electronic message with multiple resource references may have resources or references of multiple types; for example, a message may include one or more embedded links and one or more attached files.

The system illustrated in FIG. 4 transforms the original message 401 to a transformed message 430 via Message Transformation Subsystem 420. Message Transformation Subsystem 420 includes a resource reference rewriting module 421 that transforms an original reference 410 to a protected reference 431. For example, an attached a WORD document can be rewritten into a safer form, such as a PDF file. The transformed message 430 is then delivered to one or more message recipients.

One or more embodiments may execute Message Transformation Subsystem 420 on any computer or set of computers. For example, without limitation, a Message Transformation Subsystem or modules thereof may be embedded in an email client, in an email server, in an email gateway, or in any computer or computers attached to or reachable from any of these. Any system or systems in a communication path between a sender and a recipient may execute all or part of the functions of a Message Transformation Subsystem.

Protected reference 431 in message 430 may be copied in some situations to form a copy of the protected reference 432. While FIG. 4 shows only a single copy, in one or more embodiments any number of copies of a protected reference may be generated. Copies may be generated in many ways; for example, without limitation, a user may copy and paste a reference or a portion of a message, forward a message, forward a reference as a text message or as part of a text message, post a reference on a social media site, enter a reference into a database accessible by other users, post a reference in a wiki or a blog, send a Twitter® message including the reference, encode a reference in a QR code and distribute the QR code, reply to a message, print a message, or take a screenshot of a message. Multiple copies of a message may be sent to a distribution list or mailing list, generating multiple copies of a reference. A user 440 may attempt to access the resource via protected reference 431 or via a copy 432. User 440 may or may not be the recipient of the message 430. Access 441 of the protected reference 431, or access 442 of the copy of the reference 432 each cause the system to execute various authorization and security procedures before providing user 440 with access to the resource 480. In the embodiment illustrated in FIG. 4, the system includes Authorization Subsystem 450 that performs check 451 to determine if user 440 is an authorized user. This check prevents the type of problem illustrated in FIG. 3, where multiple unauthorized users can use copies of protected references to access the resource. If authorization check 451 indicates that the user is not an authorized user, the system blocks access 452. If the user is an authorized user, access is allowed 453, and control passes to the Secure Resource Access Subsystem 460. This subsystem of the embodiment of the system provides access to the resource 480 via a Security Mechanism 470. The specific security and threat protection services provided by the Security Mechanism 470 depend on the type of resource and on the types of threats anticipated and thwarted. For example, without limitation, Security Mechanism 470 may perform malware detection, identity confirmation to prevent phishing attacks, modification of a resource to eliminate potential threats, behavior monitoring to look for suspicious behavior, limiting of permissions, or execution of code in a sandbox environment. One or more embodiments may employ any type of Security Mechanism that allows access to a resource while mitigating one or more threats. One or more embodiments may employ multiple security mechanisms to address multiple types of threats, or to provide additional security.

In one or more embodiments, the Authorization Subsystem 450 and the Secure Resource Access Subsystem 460 may execute on the same computer or same group of computers. In one or more embodiments these subsystems may be separate and they may communicate over one or more network connections. Modules of these subsystems may execute for example on a client computer, such as the computer of a message recipient. They may execute for example as part of an email server that serves email messages to clients. They may execute for example on a server on which the resource is located. They may execute for example on a proxy server that is accessed by an email client, and which then communicates with a server that contains the resource. Any configuration of the functions of these subsystems on any computer or computers accessible to a user or to a resource, or on any path between a user and a resource, is in keeping with the spirit of the invention.

Figure 5:
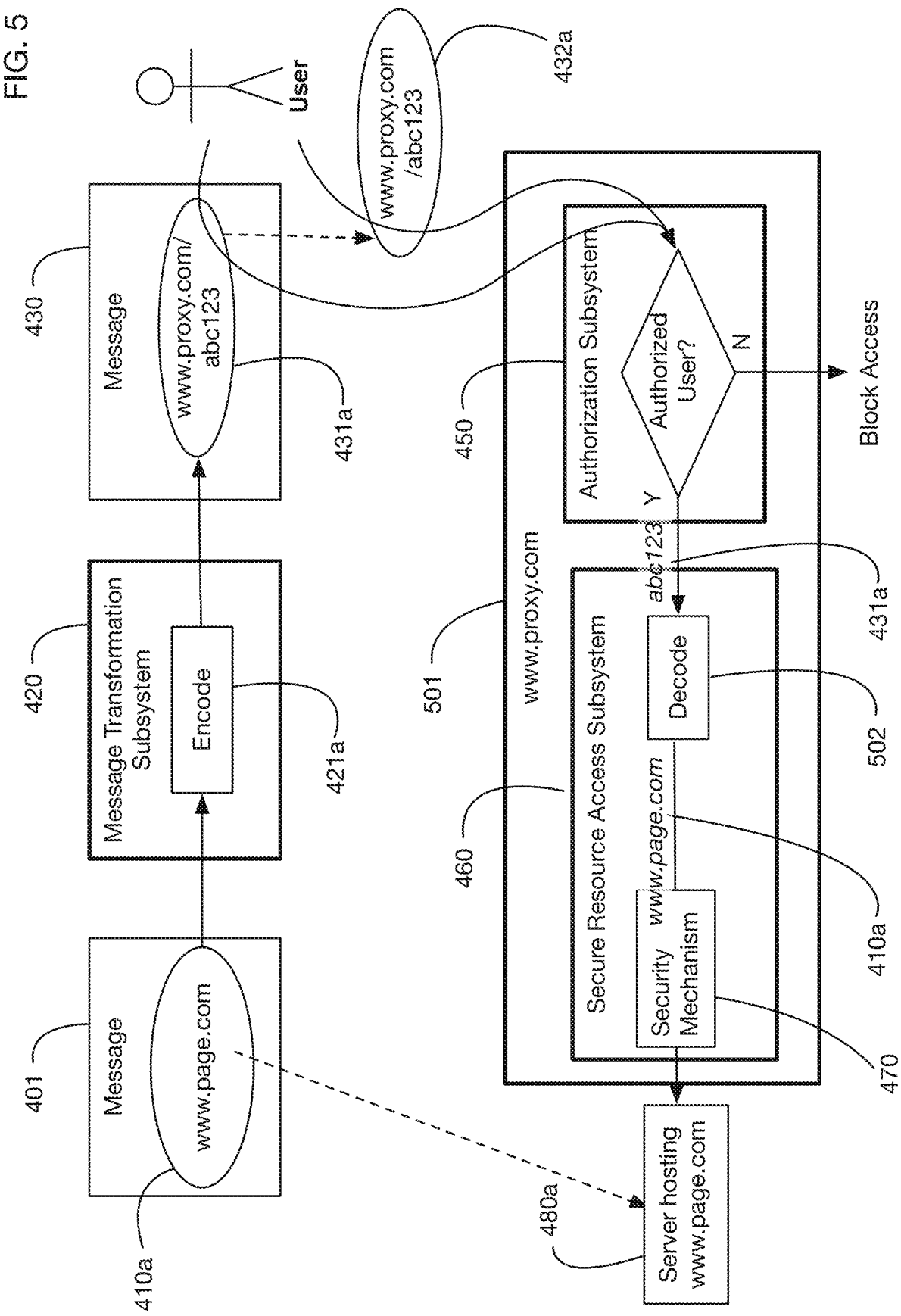
FIG. 5 illustrates an architectural block diagram of an embodiment that provides threat protection against links to malicious web pages embedded in electronic messages.

FIG. 5 illustrates an embodiment of the system that provides protection to authorized users for resource references that include links to web pages. This embodiment follows the general architecture illustrated in FIG. 4, with specific components to handle links. In this embodiment, message 401 contains a link 410a to a web page. One or more embodiments may accept messages with any types of links to any types of resource. Links may be for example, without limitation, any uniform resource locator (URL), uniform resource identifier (URI), or uniform resource name (URN) that reference any type of resource, including but not limited to web pages. URIs for example may use any URI scheme, including for example, without limitation, file, http, https, ftp, rtsp, telnet, imap, dns, smtp, mailto, news, or sms. Any method of referring to resources may be used by one or more embodiments. One or more embodiments may accept and rewrite messages with resources included directly in a message, rather than indirectly via a link or reference.

Message Transformation Subsystem 420 includes an Encode module 421a that rewrites the link 410a into an encoded form 431a. In the illustrative embodiment shown in FIG. 5, this encoded link 431a provides an indirect and encoded link to the resource through proxy server 501. Access by a user to the encoded link 431a, or to a copy thereof 432a, accesses the proxy server 501; the proxy server uses the path name ("abc123") after the proxy server's URI ("http://www.proxy.com") to determine which resource is referred to. This scheme is illustrative; one or more embodiments may encode links or other resources or resource references in any desired manner. As discussed for FIG. 4, the proxy server first applies a check for authorized users via the Authorization Subsystem 450. If the user is authorized, the encoded link 431a is decoded by Decode module 502, yielding the original link 410a to the web page. Any method may be used to encode and decode links. For example, one or more embodiments may use a bijective cryptographic function using a key shared between the Message Transformation Subsystem and the Secure Resource Access System. As another example, in one or more embodiments the Message Transformation Subsystem may generate random encoded links and share a table associating encoded and decoded links with the Secure Resource Access Subsystem.

After user authorization, the Secure Resource Access Subsystem 460 provides access to the web page 480a via Secure Mechanism 470 in order to detect potential threats posed by the web page. FIG. 5 illustrates the Authorization Subsystem 450 and the Secure Resource Access Subsystem 460 executing on the same proxy server 501. This is an illustrative configuration; one or more embodiments may distribute these subsystems or modules of these subsystems across servers or other computers in any desired manner.

Figure 6:
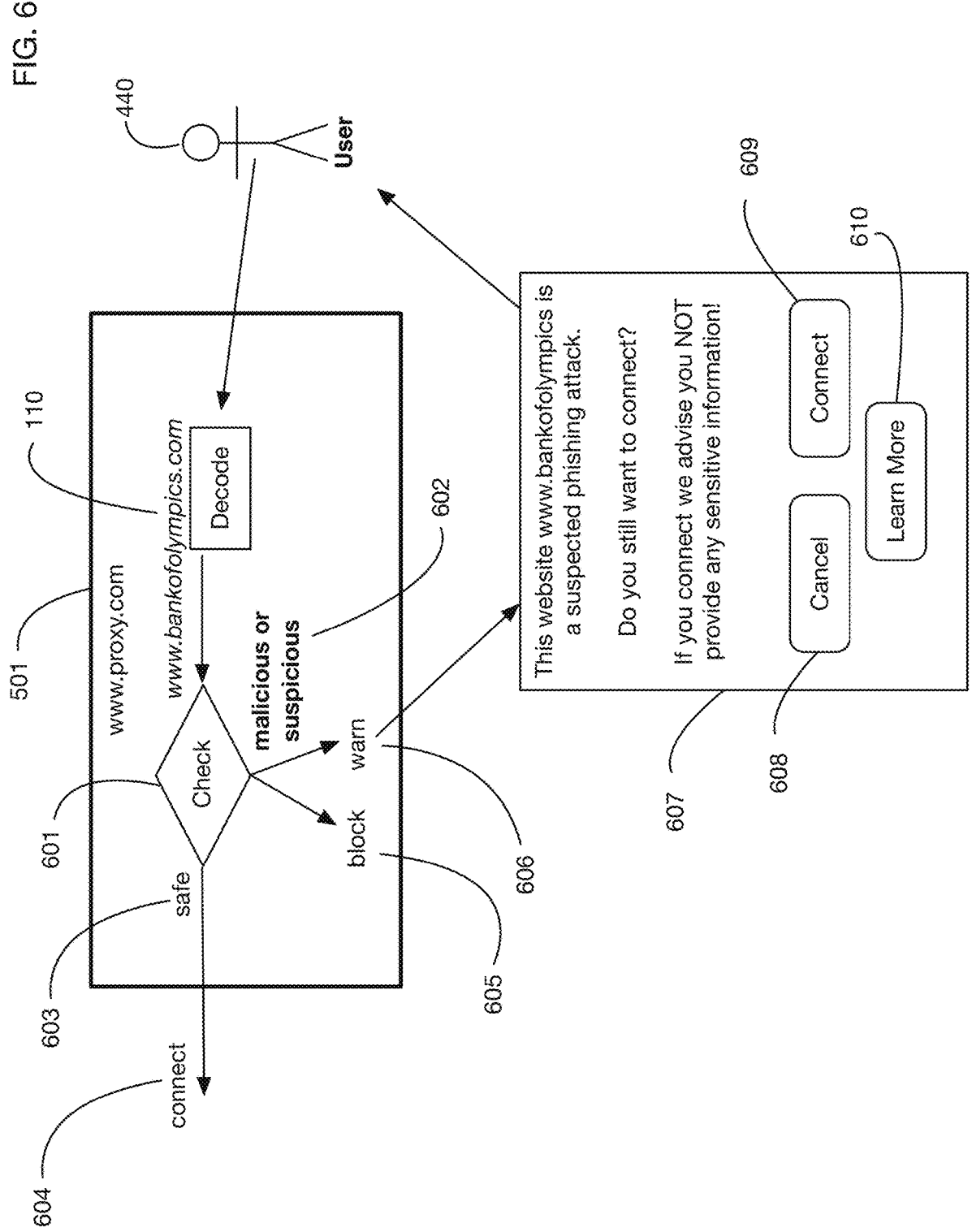
FIG. 6 illustrates possible outcomes of checking a link in an embodiment of the invention, which include connecting, blocking, or warning the user.

One or more embodiments may use various techniques to provide secure access to a link or other resource via a Security Mechanism. FIG. 6 illustrates an embodiment of the system that screens a web page first for possible threats, and then connects if the web page is deemed safe. Proxy server 501 receives a decoded link 110 from the Decode module. It then performs a safety Check 601 on the web page. This check may use any desired method to determine whether the web page presents known or suspected threats of any kind. Below we discuss a check method that uses whitelists and blacklists. Other examples of potential check methods that may be used by one or more embodiments include, without limitation, checking for a valid certificate from a recognized certificate authority, verifying the identity of the sender of a message using for example DomainKeys Identified Mail (DKIM) or Sender Policy Framework (SPF), checking whether the name of a web page or domain is suspiciously similar to that of a known legitimate site, checking the length of time a web page or domain has been registered (under the presumption for example that many phishing sites for instance may be recent or short-lived), checking the IP address associated with a domain for suspicious geographical locations, and using a recommender system to determine a web page's safety reputation.

In the embodiment shown in FIG. 6, Check 601 determines that the link 110 is either safe 603 or malicious or suspicious 602. If the link is deemed safe, the system proceeds to connect 604 to the web page. If the link is deemed malicious or suspicious, one or more embodiments may either block access 605, or warn the user 606. An illustrative warning 607 is presented to the user 440 who requested access to the link. This warning may for example explain to the user why the link is or may be dangerous. It may also provide user education on potential threats and how to avoid them. In this illustrative example the warning presents the user with three options: Cancel 608, which blocks access; Connect 609, which ignores the warning and connects; and Learn More 610, which may present more detailed information about the threat or about threats in general. One or more embodiments may always block 605 rather than warning a user. One or more embodiments may always warn 606 and never block 605. One or more embodiments may block certain links and warn the user about other links. In one or more embodiments a user warning may for example ask the user one or more questions about the link or about the message in which the link was included; the system may then determine whether to allow access to the link based on the user's response to the questions.

Figure 7:
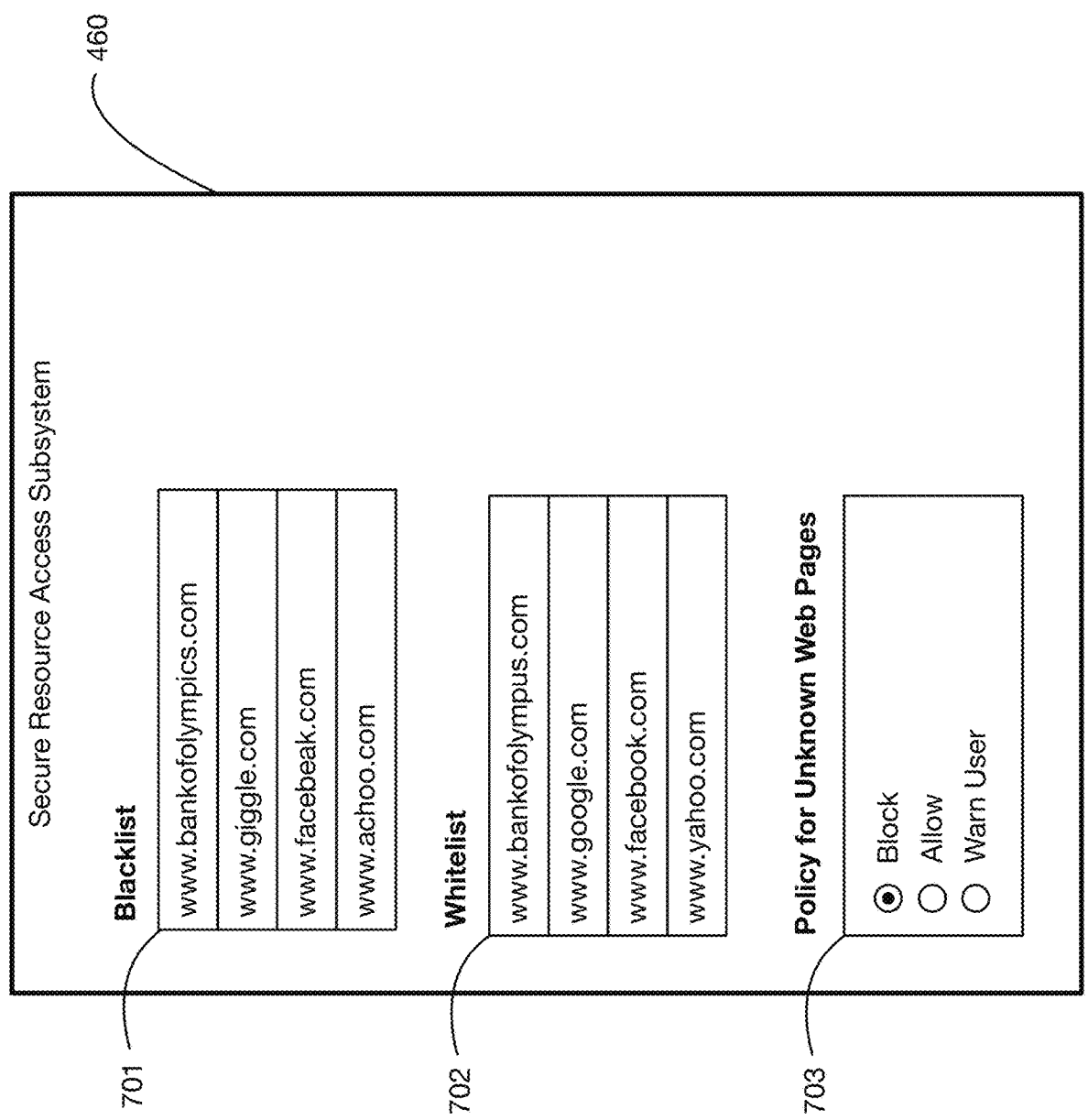
FIG. 7 illustrates an embodiment of a Secure Resource Access Subsystem that has blacklist and whitelist tables, and a policy for web pages in neither list.

FIG. 7 illustrates an embodiment of the system that uses a blacklist and a whitelist to determine whether to allow access to a link. The Secure Resource Access Subsystem 460 contains a Blacklist 701 of domain names that are known or suspected to be malicious, and a Whitelist 702 of domain names that are known or presumed to be safe. An illustrative checking method is to allow access to all links with domains in the Whitelist, and block access to all links with domains in the Blacklist. One or more embodiments may have only one of a Whitelist or a Blacklist. One or more embodiments may use any form of identity for a web page instead of or in addition to a domain name. A web page identity may include for example, without limitation, a domain name for the associated website, a complete URLs for the web page, an IP address for the website, or information associated with or derived from a certificate associated with the website. The embodiment shown in FIG. 7 also has a Policy for Unknown Web Pages 703 that determines the action for a link that appears in neither the Whitelist 702 or the Blacklist 701; options shown are to Block these links, to Allow these links, or to Warn User about these links. One or more embodiments may apply other policies or have other configurable policy options for unknown web pages that appear in neither a Blacklist nor a Whitelist.

One or more embodiments may calculate a suspicion score for a link, and use this suspicion score to determine the action when a user attempts to access the link. For example, links with high suspicion scores may be blocked, those with low suspicion scores may be allowed, and those with intermediate suspicion scores may trigger a user warning. Embodiments may use any desired methodology to calculate a suspicion score. For example, an illustrative suspicion score may be based on how closely the name of a domain from a link matches the domain name of a known legitimate website (while not matching it identically). An example name proximity score is the minimum number of letters that must be added to, deleted from, or modified in one name to obtain another name. An example suspicion score is then for example the inverse of the proximity score (possibly with scaling or offset constants). We take as an illustration the suspicion score: suspicion=10−name proximity. Using the links in FIG. 7 as an illustration, the name proximity score between www.bankofolympics.com and www.bankofolympus.com is 2, since the former can be derived from the latter by replacing "u" with "i" and adding "c". Presuming that www.bankofolympus.com is a known legitimate site, the suspicion score for www.bankofolympics.com is therefore 8. Another illustrative link, www.bankofoliphant.com, has a name proximity score of 6 and a suspicion score of 4; therefore it would be considered less suspicious than www-.bankofolympics.com. These calculations and score definitions are illustrative; one or more embodiments may employ any desired methodology to rate or classify links or resources or resource references in order to determine actions when a user attempts to access the link or resource.

In one or more embodiments the suspicion score for an identifier (such as link domain name) may use similarity of a display representation of that identifier to the display representation of another identifier. Comparison of display representations rather than underlying textual representations may protect against homograph attacks using internationalized domain names, for example.

Figure 8:
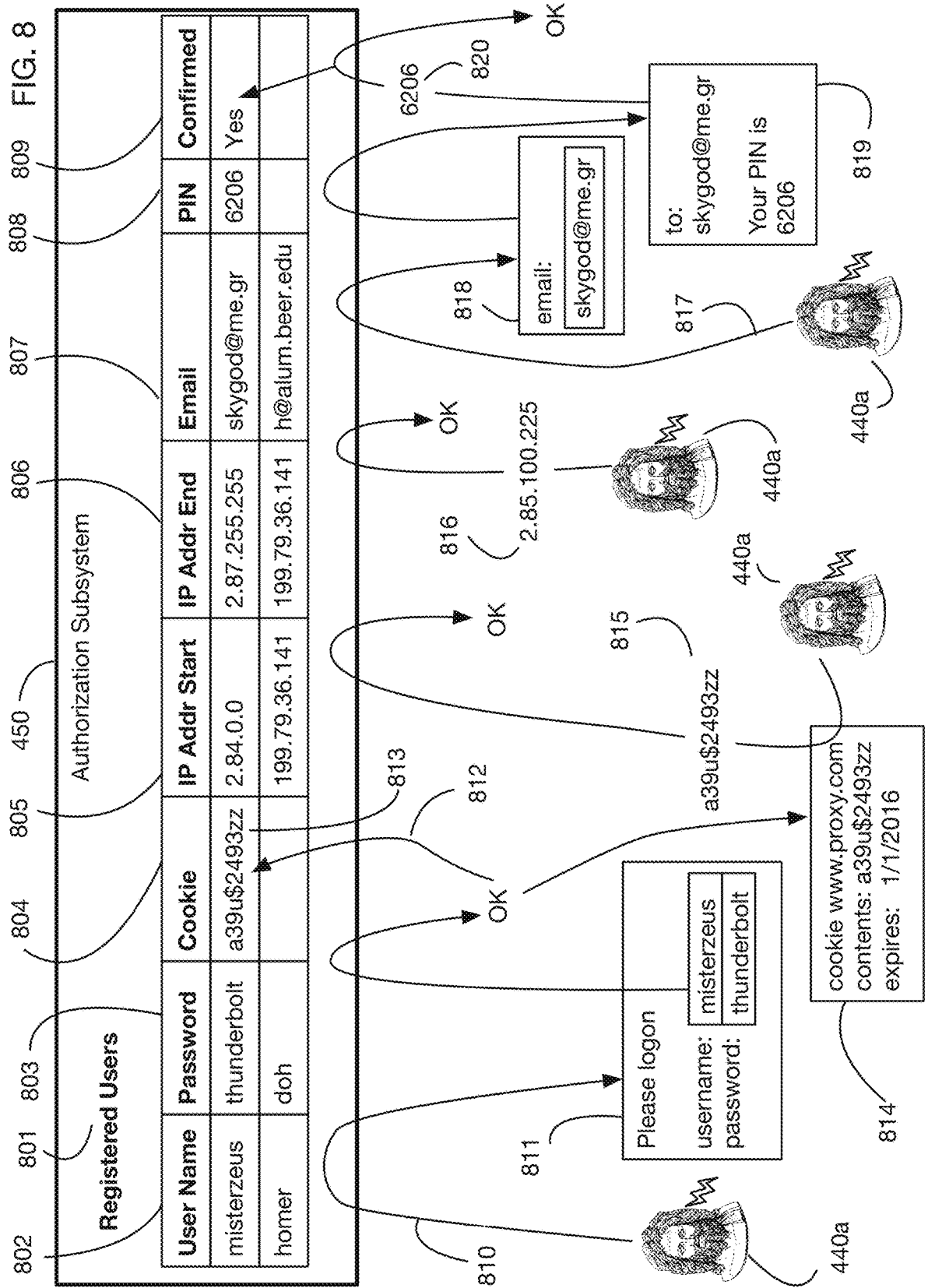
FIG. 8 illustrates an embodiment of an Authorization Subsystem that may obtain one or more types of user credentials to authenticate a user.

Turning now to the Authorization Subsystem, one or more embodiments may determine if a user is an authorized user by requesting credentials from the user and validating these credentials. FIG. 8 illustrates an embodiment in which the Authorization Subsystem 450 includes a table 801 of registered users and their credentials. This table may for example be created by an administrator. One or more embodiments may provide tools for administrators or other users to create or edit user registration entries and credentials, including for example tools to revoke user authorizations. The table 801 may for example be stored in a database or in any other format. One or more embodiments may use any type or types of user credentials. The Registered Users table 801 illustrates some possible credentials that may be used in one or more embodiments. The table has a User Name column 802 and a password column 803. One or more embodiments may use any type of password or PIN and may store these in any unencrypted, encrypted, or hashed form. One or more embodiments may use salted hashing. User 440a attempts access 810 to a protected resource, and the Authorization Subsystem responds with a logon prompt 811 requesting the user name and password; the password is checked against the table 801 and access is permitted. In this illustrative embodiment, after a successful logon credentials are cached in a cookie 814 stored on the user's local computer, and the value 813 of this cookie is added 812 to the table 801 in column 804. A subsequent access attempt by user 440a retrieves and transmits this cookie value 815 to the Authorization Subsystem; the Authorization Subsystem can check the cookie value against the stored value 813 and authorize the user without re-requesting a password. This implementation of stored and cached credentials using a cookie is illustrative; one or more embodiments may use any desired method to cache credentials after an initial validation. One or more embodiments may cache credentials in any memory accessible to a user or to a user's computer.

FIG. 8 illustrates another possible user authorization technique using the user's IP address. The Registered Users table 801 includes an IP address range for each user, stored in columns 805 and 806. When user 440a attempts access, the user's IP address 816 is automatically provided to the system, and the system can check it against the expected IP address range for the user. IP address checks may be particularly useful for example to ensure that employees only access resources from authorized computers with known IP addresses. One or more embodiments may use IP checking as the only or the primary authentication mechanism. One or more embodiments may require additional authentication information in addition to the IP address of the user. One or more embodiments may combine IP address checking with passwords, cookies, or any other scheme for checking user credentials. For example, one or more embodiments may check a user's IP address first, and then use a logon prompt for a password if the initial IP address check fails. One or more embodiments may use any type of user credentials, including for example, without limitation, passwords, PINs, biometric credentials, security certificates, access requests that result in a one-time PIN being sent to a user's registered email or texted to a user's registered mobile device, responses to challenge questions, single sign-on credentials, or security tokens such as USB keys or smart cards. One or more embodiments may use multi-factor authentication combining credentials in any desired manner.

FIG. 8 illustrates another possible user authorization technique that confirms a user's identity by sending a one-time PIN to the user's email address, which may be time limited for example. User 440a attempts access 817 to a protected resource reference, and the system responds with a registration prompt 818 asking the user to provide his or her email address. This causes a one-time PIN to be sent to that email address in message 819, or sent via SMS or in any other manner. The system may first verify that the email address is a valid email for an authorized user of the system. The PIN is stored in column 808 of the Registered User's table 801. In one or more embodiments the stored PIN may be encrypted or hashed. The user provides the PIN 820 to the system, which then indicates that the authentication and user registration is complete in the Confirmed column 809. In one or more embodiments the PIN-based registration may be valid for a limited period of time, and it may for example need to be repeated with a new PIN after an initial registration and authentication has expired.

Figure 9:
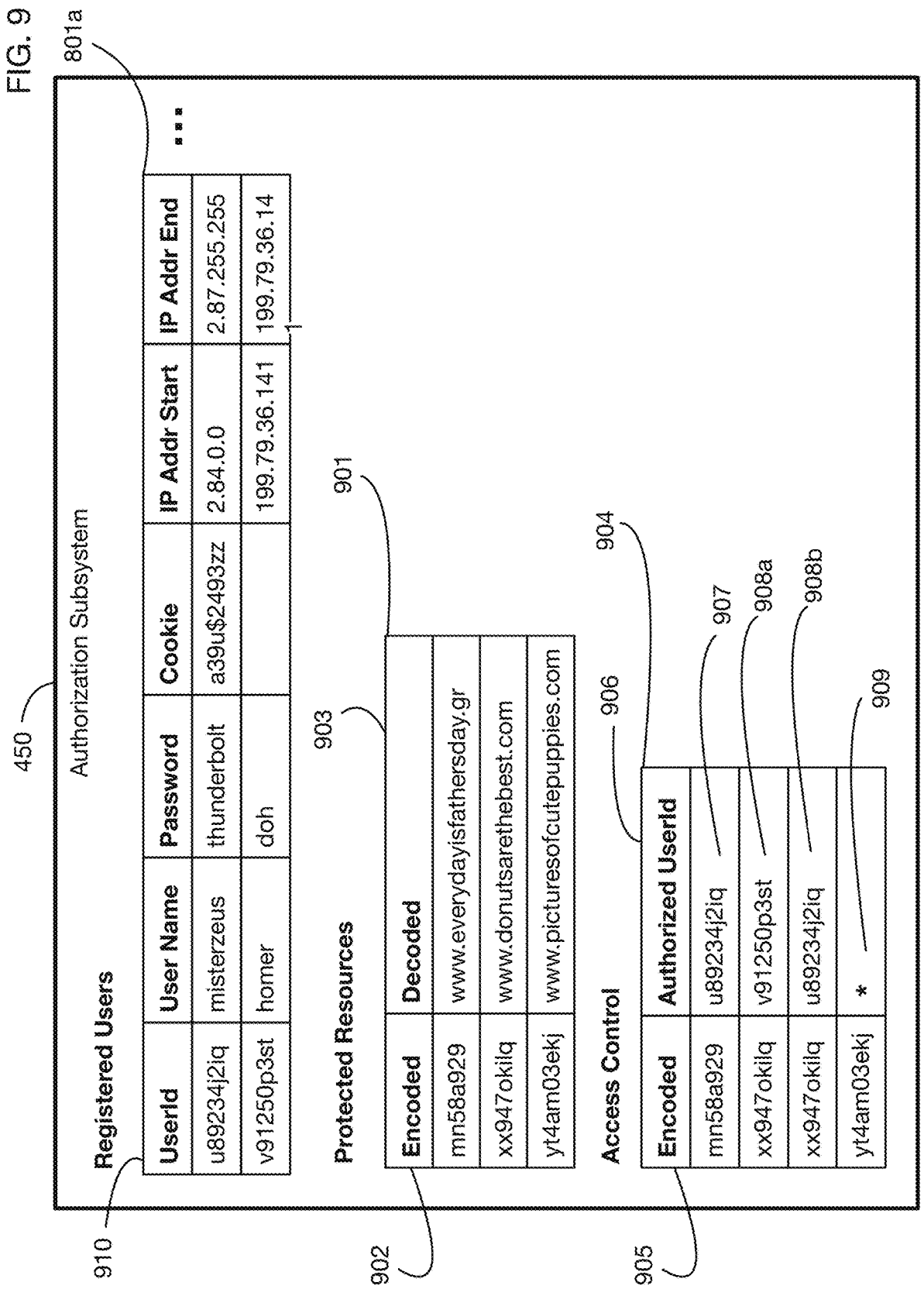
FIG. 9 illustrates an embodiment of an Authorization Subsystem that extends the user credentials illustrated in FIG. 8 to include access control lists for individual resources.

In one or more embodiments of the system, a user may require authorization for a specific resource (in addition to authorization for the system overall) in order to access the resource. FIG. 9 illustrates an embodiment that incorporates resource-specific access control into the Authorization Subsystem 450. In addition to the Registered Users table 801a that contains user credentials, this embodiment includes a Protected Resources table 901 that describes the protected resources, and an Access Control table 904 that indicates which users may access which protected resources. The Registered Users table 801a contains an additional column 910 with a unique ID for the user. The Protected Resources table 901 maps the Encoded links in column 902 into the corresponding Decoded links in column 903. The Access Control table 904 is a one-to-many table mapping the Encoded links in column 905 into the Authorized User Id 906 that may be for example a foreign key to the Registered users table 801*a* corresponding to column 910. This one-to-many mapping provides fine-grained access control that can grant or deny access of any user to any resource. For example, encoded link mn58a929 appears only in row 907, indicating that it may be accessed only by user u89234j2iq. Encoded link xx947oki1q appears in rows 908*a* and 908*b*, indicated that users v91250p3st and u89234j2iq can both access the resource. Row 909 shows a "*" for the Authorized User Id associated with encoded link yt4am03ekj; this may indicate for example that all users authorized by the system may access this resource. One or more embodiments may use more complex access control lists that indicate for example specific permissions associated with each user and resource combination. For example, some users may have read-only access to a resource, while other users may have read and write access to a resource. In one or more embodiments an Access Control table may for example define access rules for groups of users in addition to or instead of individual users. In one or more embodiments an Access Control table may contain negative permissions that prevent specified users or groups from accessing specific resources or from performing particular actions. In one or more embodiments, use of the encoded resource reference 902 as the key to the Access Control table may provide an optimization since access authority for a user can be checked prior to decoding a link. In one or more embodiments Access Control tables or other access authorization mechanisms may use the decoded references rather than the encoded references, and decoding may be needed prior to checking authorization.

Figure 10:
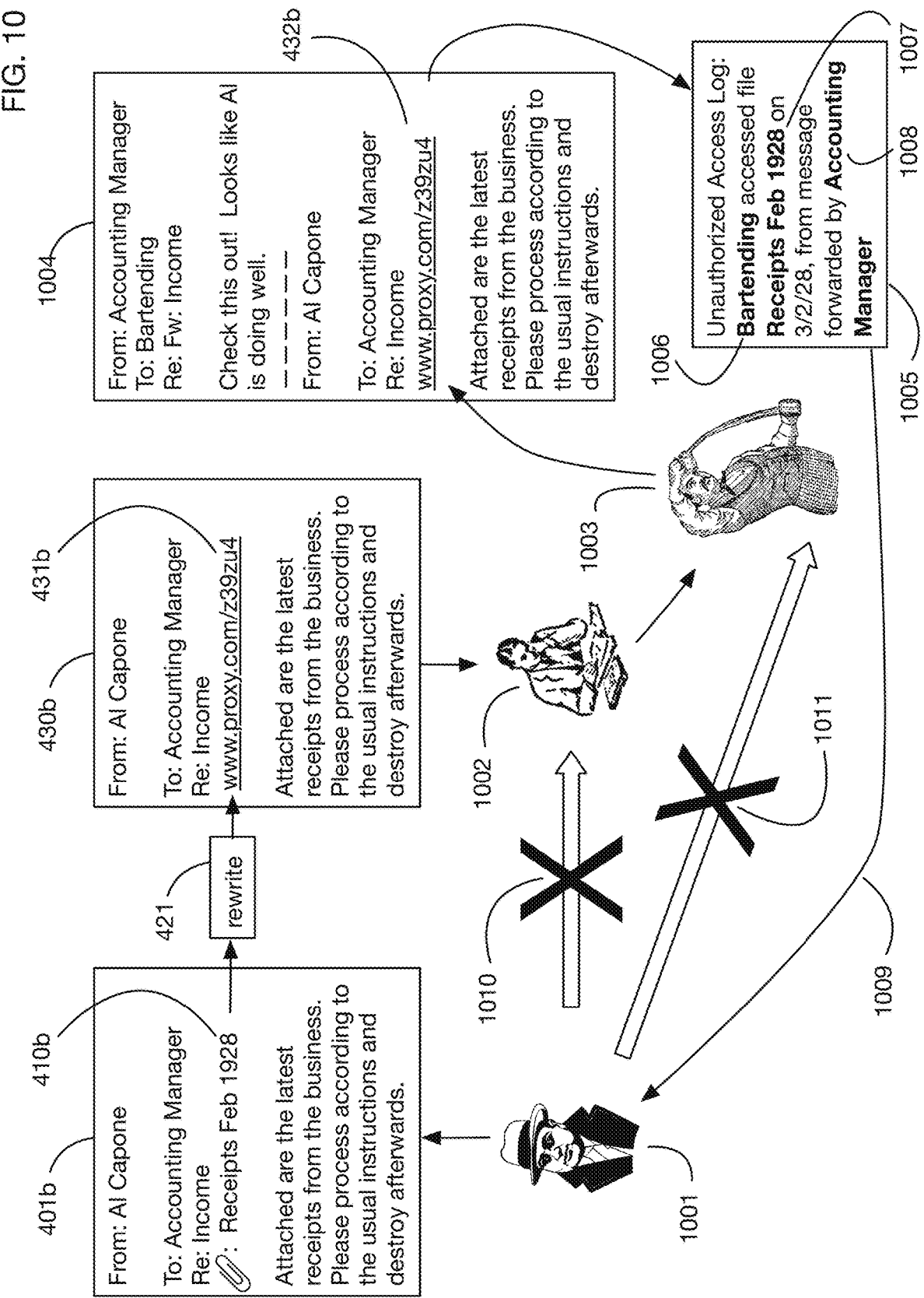
FIG. 10 illustrates an embodiment of the invention that provides access security for an email attachment, by logging unauthorized access attempts.

In one or more embodiments, the resources protected by the system may include message attachments. These attachments may include for example any kind of file or media, or any other item that can be attached to or included with an electronic message. FIG. 10 illustrates an example with message 401*b* from sender 1001 containing an attached file 410*b*. The system performs rewrite operation 421 on the attachment 410*b* and converts it to a protected reference 431*b* in protected message 430*b*. For example, an attached WORD document can be rewritten into a safer form, such as a PDF file. The protected message 430*b* is then delivered to the recipient 1002. Recipient 1002 makes a copy of the protected reference by forwarding the message 430*b* to another user 1003 as forwarded message 1004 with copy of the protected reference 432*b*. User 1003 then attempts to access the resource through this copy 432*b* of the protected reference to the resource. This example presumes that only recipient 1002 and sender 1001 are authorized users for the resource as defined for example in an access control list for the resource. User 1003 is an unauthorized user, and the system therefore blocks access, as described above. FIG. 10 also illustrates an additional feature of one or more embodiments wherein unauthorized access attempts may be logged with detailed information about the access attempt. The system generates Unauthorized Access Log entry 1005, which in this illustrative example describes the user attempting access 1006, the resource the user attempted to access 1007, and the source of the copy 1008. One or more embodiments may include any available information in an unauthorized access log entry, in order for example for senders or administrators to monitor communication paths, identify channels that may leak protected information, and monitor compliance with policies for secure information. In this example the Unauthorized Access Log 1005 is sent on path 1009 to sender 1001, who may then take corrective actions 1010 and 1011. In one or more embodiments access logs and notices of attempted unauthorized access may be sent immediately or periodically for example to senders, recipients, system administrators, security personnel, or any other relevant parties.

Figure 11:
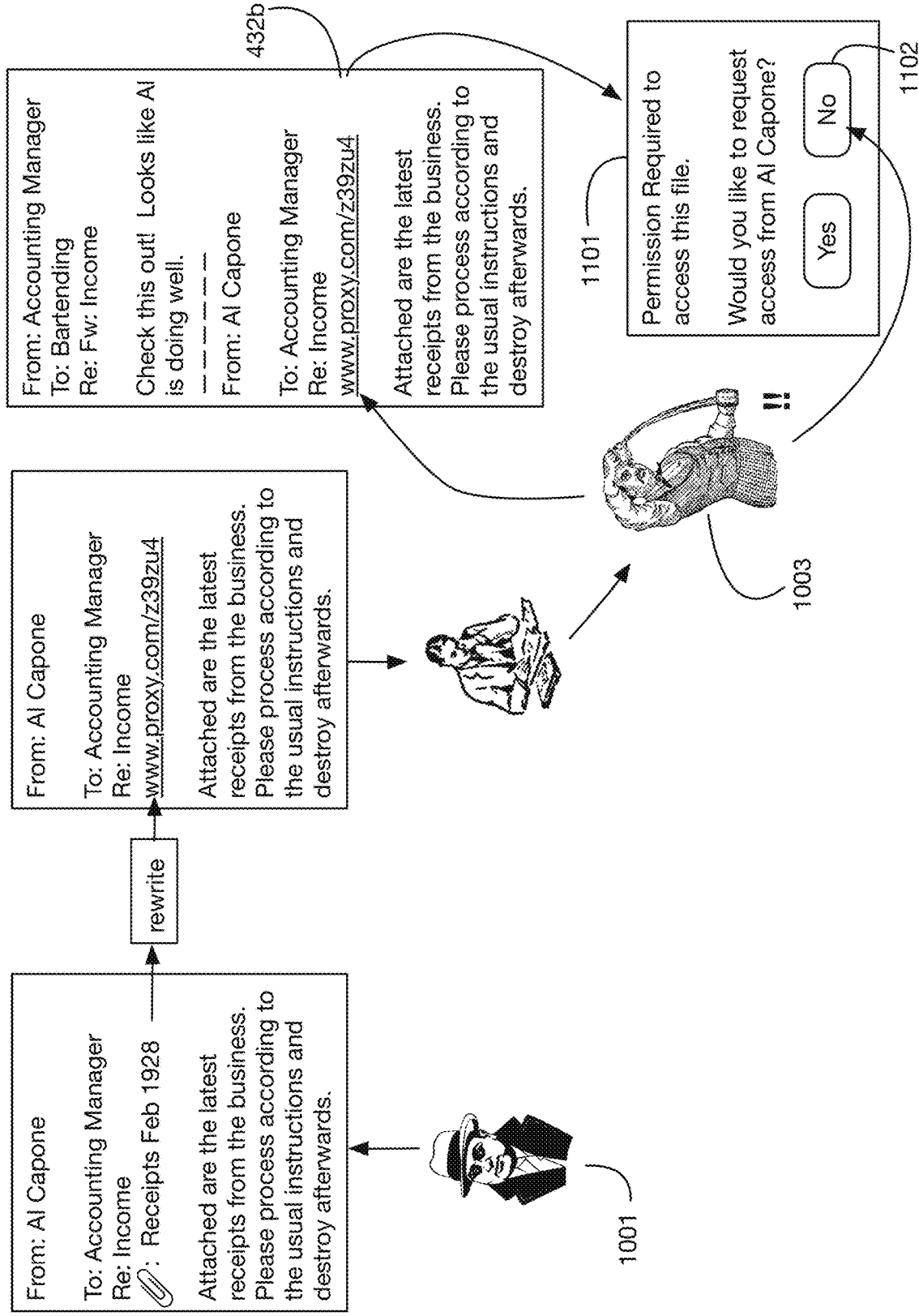
FIG. 11 illustrates a variation of the embodiment of FIG. 10 that asks an unauthorized user attempting to access a resource if he wishes to request permission to access the resource.

FIG. 11 illustrates an embodiment that is a variation of the example shown in FIG. 10. In this example, an attempt by unauthorized user 1003 to view protected resource reference 432*b* triggers a prompt 1101 to user 1003 informing him that permission is required to access the file, and asking him if he wants to request permission, in this case from the sender 1001. The user 1003 chooses the No option 1102 to indicate that he does not want to request permission. One or more embodiments may apply any desired policy to manage attempts by unauthorized users to access protected resource references. These policies may include for example, without limitation, blocking access, logging the access attempt (as illustrated in FIG. 10), informing the user that the resource is unavailable, asking the user if he or she wants to request permission to access the resource (as illustrated in FIG. 11), providing limited or restricted access, dispatching security or police services, or any combination of these policies.

Figure 12:
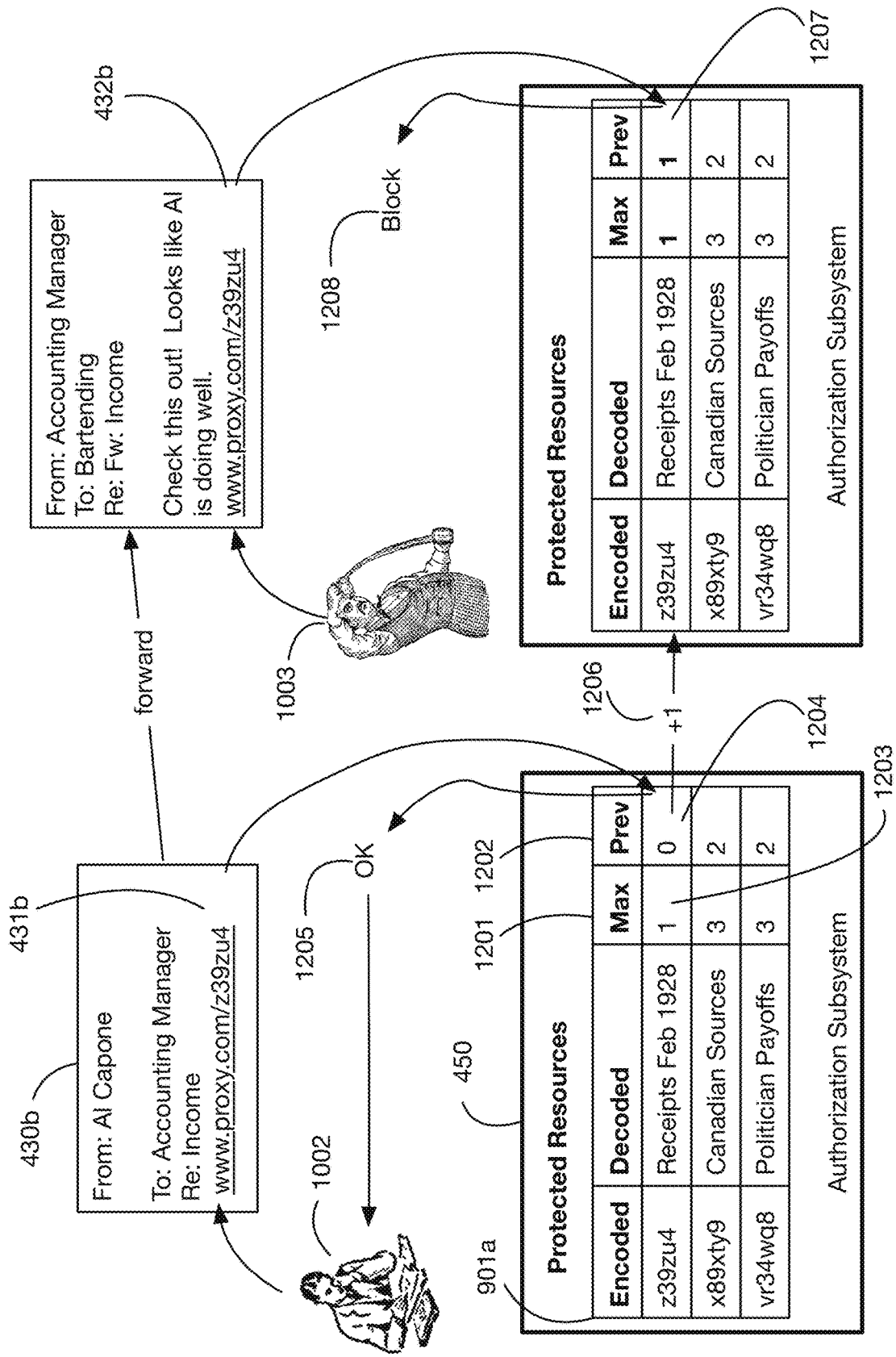
FIG. 12 illustrates an embodiment of an Authorization Subsystem that limits resource access by setting a maximum number of times a resource may be accessed.

One or more embodiments may limit access to protected resources by limiting the number of times a protected resource reference may be used. FIG. 12 illustrates an example of an embodiment that includes a maximum count 1201 for resource reference usage in the Protected Resources table 901*a* of the Authorization Subsystem 450. The table also tracks the number of previous accesses 1202 for each protected resource reference. In this illustrative example, protected message 430*b* contains an encoded reference 431*b* to a resource (here a file attachment), and the maximum number of accesses 1203 allowed for this resource is 1. Thus any attempts after the initial access to view this resource will be blocked. When recipient 1002 receives the message 430*b* and initially accesses the protected reference 431*b*, the previous access count 1204 is zero. Because this previous access count 1204 is lower than the maximum count 1203, access is permitted 1205. The Authorization Subsystem increments 1206 the previous access count to 1207 to reflect this access. If recipient 1002 then forwards the message to user 1003, generating copy 432*b* of the protected reference, an attempt by user 1003 to access 432*b* will be blocked 1208 since the resource has already been accessed for the maximum number of times. Similarly, one or more embodiments may limit the amount of time that a resource may be accessed. For example, the Authorization Subsystem may have a protected resource reference expiration date, after which no accesses of this protected resource are permitted. One or more embodiments may limit the total duration of access, for example if the time of access can be monitored by the system. One or more embodiments may combine maximum resource access counts or times with other authorization control mechanisms included those described above.

Figure 12A:
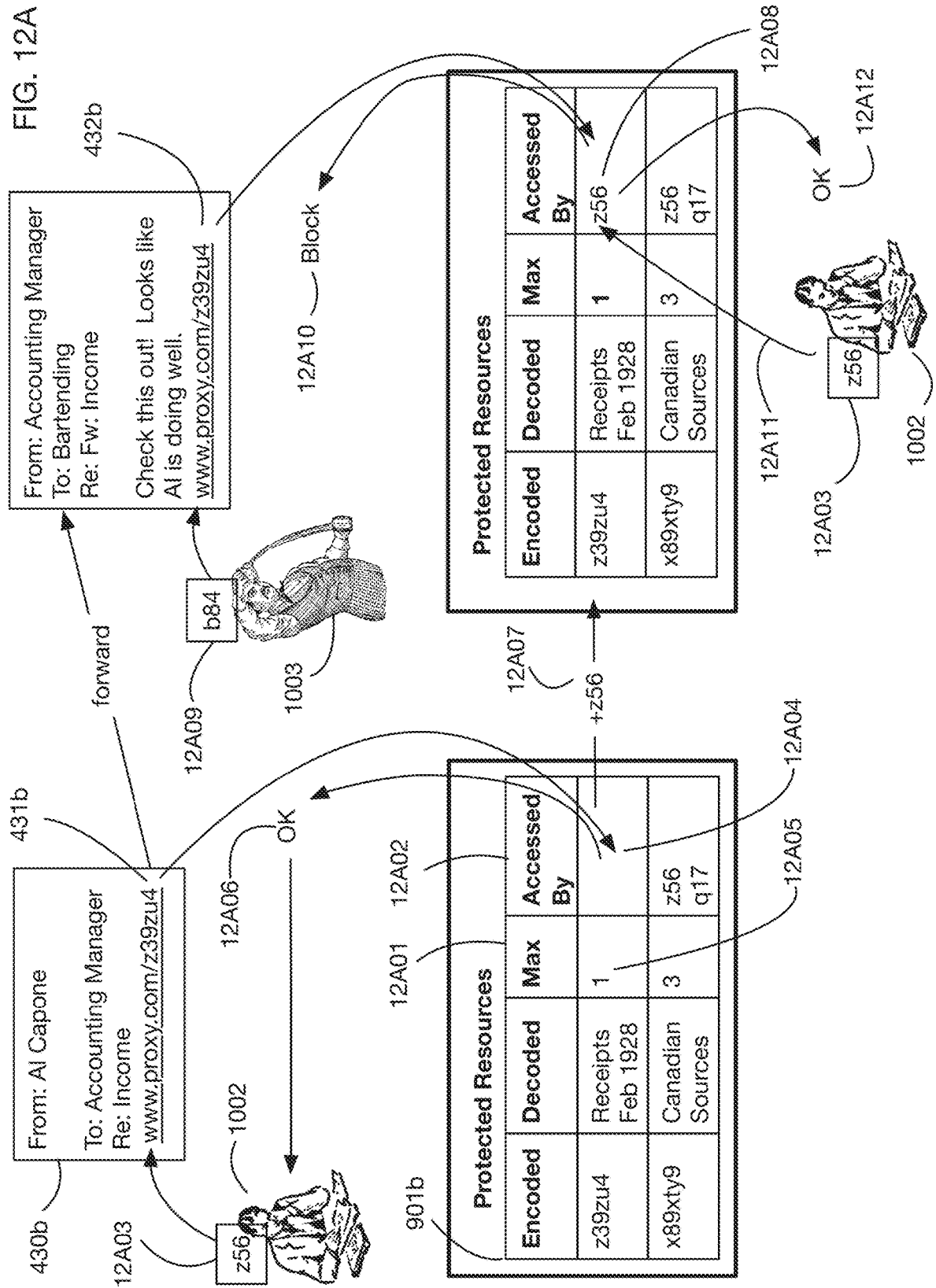
FIG. 12A illustrates a variation of the embodiment of FIG. 12 that limits the maximum number of users that may access a resource.

One or more embodiments may limit the number of users that are allowed to access a resource, instead of or in addition to limiting the total number of accesses or the total time available for access. FIG. 12A illustrates an embodiment that uses this technique to determine if users are authorized to access resources. Protected Resources table 901*b* has column 12A01 for the maximum users count for a resource; this count is the maximum number of distinct users that may access a resource before further access is blocked. Column 12A02 is an accessed-by list for each resource; this column tracks the identities of users who have previously accessed each resource. In this illustrative example arbitrary 3-character user identifiers are used to show user identities; one or more embodiments may use any user identifier to track which users have accessed which resources. User 1002 with illustrative user identifier 12A03 attempts to access protected link 431*b* in message 430*b*. This access attempt triggers a check of the Protected Resources table 901*b*. The accessed-by list 12A04 for this protected resource reference is empty, and the maximum user count 12A05 is 1; thus an additional access is allowed and the system allows access 12A06. This successful access causes the user's identity 12A03 to be added 12A07 to the accessed-by column, resulting in a new accessed-by list 12A08 for this resource. User 1002 then forwards the message to user 1003 with user identifier 12A09. User 1003 attempts to access the copy 432*b* of the protected resource reference. This triggers another check of the Protected Resources table. Now the number of users in the accessed-by column 12A08 for the resource is 1, which matches the maximum 12A05. Therefore the access attempt is blocked 12A10. However if the initial user 1002 attempts to access the resource again with access attempt 12A11, the authorization check determines that the user's identity 12A03 is already in the accessed-by list 12A08 for the resource, so the subsequent access is permitted 12A12.

Figure 13:
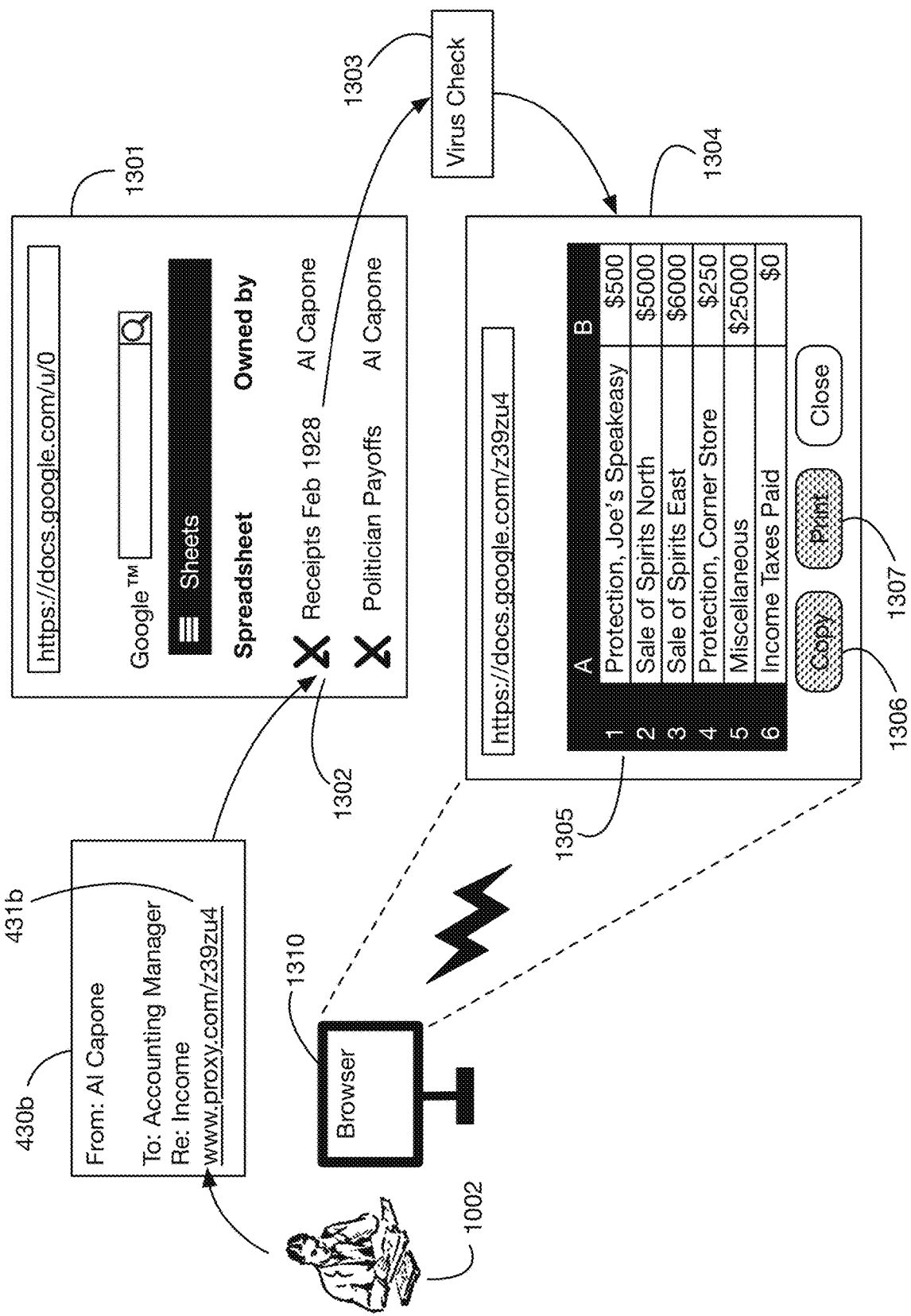
FIG. 13 illustrates an embodiment of the invention that provides secure access to a resource by opening it in a managed cloud application rather than on a user's local computer.

One or more embodiments may provide secure access to resources via a sandbox environment. The sandbox environment may for example allow users to open, view, manipulate, or execute resources in an environment that limits the effect of potential threats, or that limits users' ability to perform selected actions. Sandbox environments may for example include virtual machines, specialized applications, specialized electronic message clients, or managed cloud applications. FIG. 13 illustrates an embodiment that uses a managed cloud application to provide secure access to resources. When user 1002 accesses protected resource reference 431*b*, which here refers to an email attachment, the system provides access to a copy 1302 of the original attachment that is stored in a cloud-based file system 1301. A copy of the original attachment is never downloaded to the user's computer. The system opens the file using a managed cloud application (here a spreadsheet viewer 1305) that executes on a remote server 1304; the user views the file through his browser 1310. The managed cloud application 1305 and cloud-based file system 1301 provide a sandbox environment that limits the impact of potential threats on the user's computer (and on other systems connected to this computer). For example, a virus check 1303 may be performed automatically when opening the file 1302. Because the cloud-based system is managed, virus checking and other security features may be more complete and more up to date than the security capabilities of the user's local computer. For example, a cloud-based system may have the latest security patches and virus definitions, whereas a user may forget or choose not to install these. In addition, the effect of any threats embedded in the file are limited since the browser environment itself provides a sandbox. Moreover, the cloud application may be configured to limit the user's permissions for the resource. In this example, the Copy button 1306 and Print button 1307 of the managed spreadsheet application 1305 are greyed out, indicating that they are disabled for the user. Disabling these or similar features may for example limit leaks of sensitive information contained in the file. One or more embodiments may use any sandbox environment for access to protected resources, including but not limited to managed cloud environments such for example as Google™ Docs, Microsoft Office™ Online, or Dropbox™. One or more embodiments may configure a sandbox environment to associate any applications with any types of files. One or more embodiments may perform any desired security checking actions, such as for example virus checking, prior to opening a file or accessing a resource in a sandbox environment. One or more embodiments may provide any desired limitations on application features and permissions within a sandbox environment.

Figure 14:
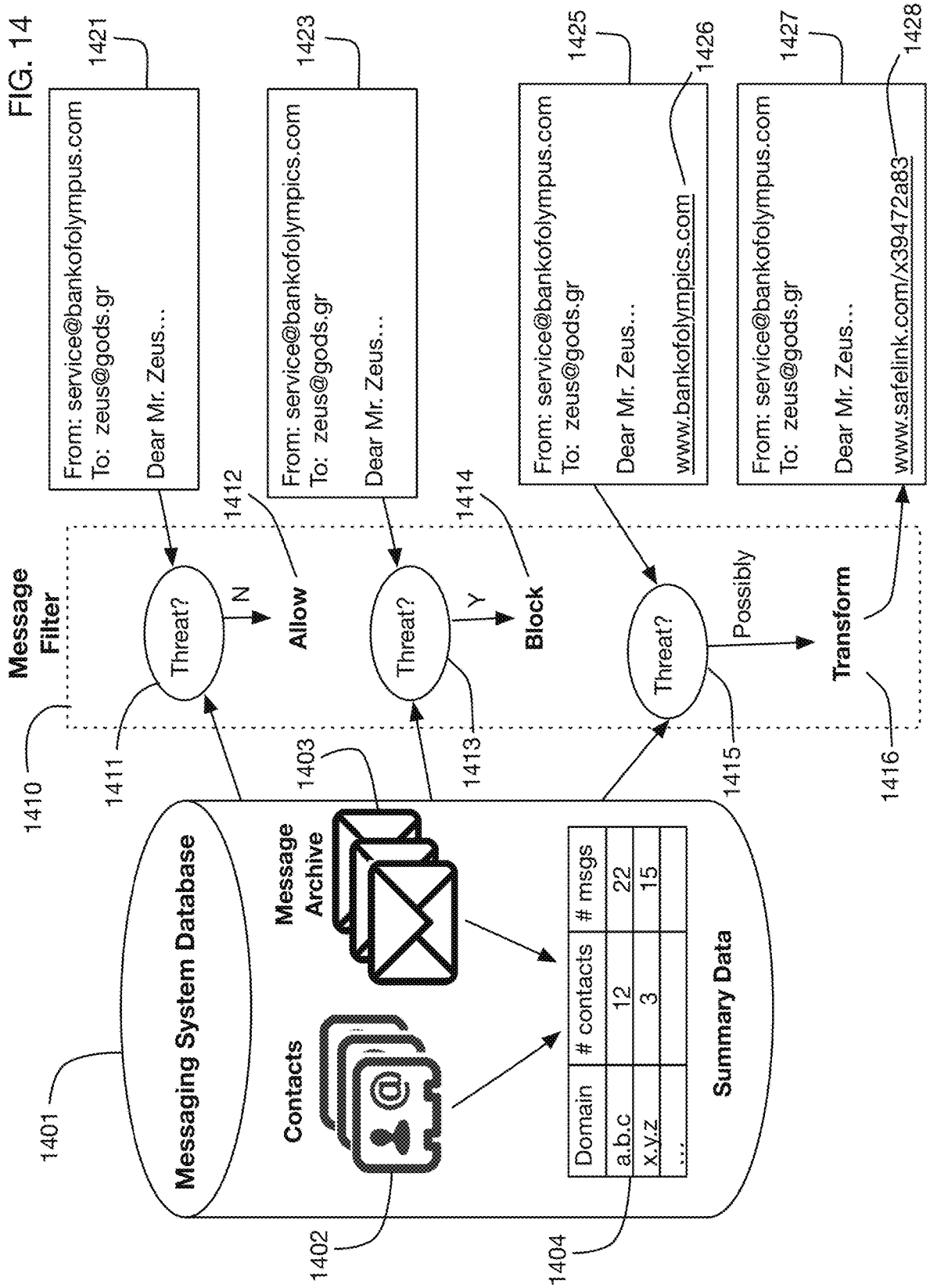
FIG. 14 shows an architectural overview of an embodiment of the invention that uses a messaging system database with Contacts and a Message Archive to determine whether a message presents or contains a potential threat.

One or more embodiments of the invention may use stored data such as a messaging system database to determine whether an electronic message contains or presents a potential threat. Threat detection rules may therefore be dynamically generated or modified based on actual communications and contacts made by a user or by an organization. FIG. 14 shows an architectural overview of an embodiment of a threat detection system that uses data in messaging system database 1401 to determine whether electronic messages contain potential threats. The message system database 1401 may contain any information related to messages, contacts, addresses, communications, connections, social or professional networks, or organizational structures. For example, in the embodiment shown in FIG. 14, database 1401 contains Contacts list 1402, Message Archive 1403, and Summary Data 1404 that for example may be derived from the Contacts list, the Message Archive, or both. Contacts 1402 may contain any information on persons, groups, or organizations; this information may include for example, without limitation, names, addresses, email addresses, identities, certificates, demographic data, social networking names or addresses, aliases, notes, nicknames, phone numbers, physical addresses, roles, titles, affiliations, and personal information such as birthdays or relatives. In one or more embodiments contact list information may be obtained from, augmented with, or validated against directories, registries, or databases that are organization-wide or that span organizations, such as for example Active Directory services. Information from multiple directories may be merged into or copied into a Contacts list, using for example utilities such as ADSync. A Contacts list may be a Global Address List, or it may include all or part of one or more Global Address Lists. A Contacts list may also include information from any public or shared lists of persons, addresses, organizations, or names. Message Archive 1403 may represent any archive of messages sent by, received by, drafted by, viewed by, or otherwise accessed by a user or any set of users. The messages in Message Archive 1403 may be any type of message, such as for example, without limitation, emails, text messages, voice messages, video messages, faxes, tweets, Instagrams, or postings on social network sites. A Message Archive may contain any list or lists of any types of messages over any time period. Messaging System Database 1401 may also contain Summary Data 1404, which may for example consolidate information from the Contacts and the Message Archive. Any type of summary information may be derived and stored. For example, Summary Data 1404 may include counts or sizes of messages sent to or received from each contact in the Contacts list, potentially grouped as well by organization or domain name. It may include the number of contacts associated with each domain name. Summary Data may also include temporal information, such as for example the time that each Contact was last contacted. These examples are illustrative; one or more embodiments may use any type of Summary Data that is derived in any fashion from the Contacts or Message Archive information.

In the embodiment illustrated in FIG. 14, data in the Messaging System Database 1401 is used to analyze electronic messages in order to determine whether the messages contain or may contain a threat. This analysis may check for any kind of threat, including for example, without limitation, phishing attacks, spear-phishing attacks, whaling attacks, malware, viruses, worms, Trojans, spam, adware, spyware, or denial of service attacks. Analysis may use any information in the messages combined with any information in the Messaging System Database to assess whether a message presents a potential threat. One or more embodiments may use any additional information to perform threat analysis, such as for example, without limitation, whitelists, blacklists, or signatures of viruses or other malware; this information may be combined with information from the Messaging System Database in any manner.

One or more embodiments may apply a Message Filter 1410 to electronic messages, in order to check for potential threats and to respond to detected or suspected threats. A filter may check any or all of the message parts that comprise a message, such as for example, without limitation, the sender or senders, the receiver or receivers, the headers, the message text, the subject, the message thread, attachments, embedded links, embedded media, the path along which the message was transmitted, and timestamps associated with creating, sending, forward, receiving, and reading the message. The sender's IP address and verification information or signature(s), such as DomainKeys Identified Mail (DKIM), Sender Policy Framework (SPF) record, and Domain-based Message Authentication, Reporting and Conformance (DMARC), can also be checked by the filter.

The Message Filter may take any desired action when a threat is detected or suspected, such as for example blocking all or part of a message, or adding warnings that alert users to potential threats. FIG. 14 illustrates several illustrative actions taken by the Message Filter 1410. Message 1421 is analyzed 1411 for threats; because the filter does not detect a threat, the message is allowed 1412 with no modifications. Message 1423 is analyzed 1413 for threats; because a threat is detected, the message is blocked 1414. One or more embodiments may block only parts of a message instead of an entire message. Message 1425 is analyzed 1415 for threats; because the embedded link 1426 appears suspicious, the message filter transforms 1416 the message into a modified message 1427. In the modified message 1427, the link 1426 is replaced with an indirect link 1428 that applies additional checking or warnings when the link 1428 is clicked. These examples illustrate some possible actions of the Message Filter 1410: it may pass a message through unchanged; it may block all or part of a message; or it may transform all or part of a message to a modified message that for example incorporates additional checks or warnings.

Figure 15:
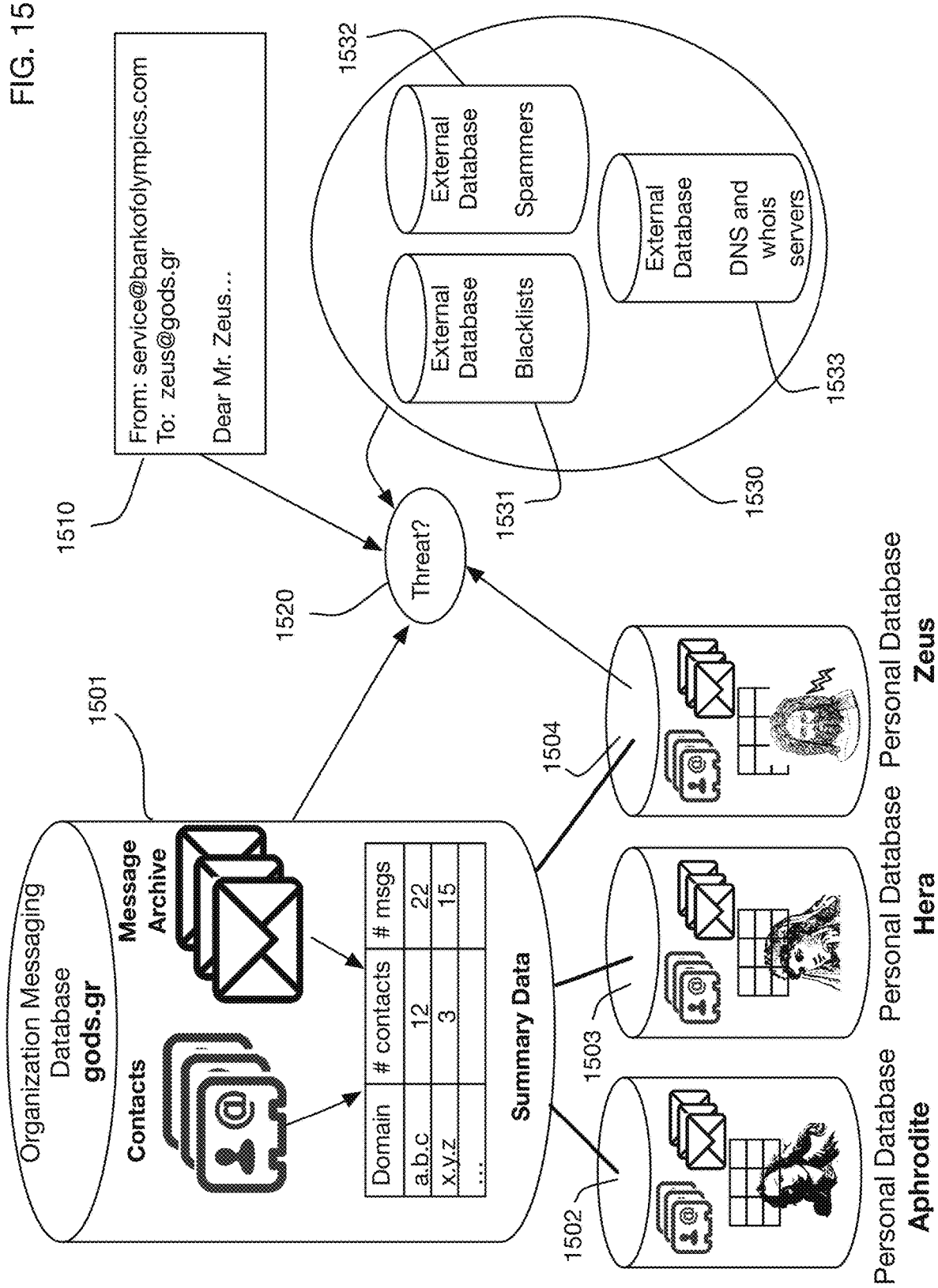
FIG. 15 illustrates an embodiment that performs threat detection using a hierarchical messaging system database that includes an organizational Contacts and Message Archive, as well as personal Contacts and Message Archives for each user within the organization.

A Messaging System Database 1401 may be associated with an individual, with a group, or with an entire organization. Message Filter 1410 may use multiple Messaging System Databases to perform threat checking and transformations. For example, in a message addressed to an individual, both the Messaging System Database of the individual and that of the individual's organization may be used for threat checking. FIG. 15 illustrates an embodiment with a hierarchically organized set of Messaging System Databases. Organizational database 1501 contains an aggregate Message Archive and Contacts for all individuals within the organization, and Summary Data derived from these aggregates. Each individual within the organization has an individual Personal Database, such as for example Personal Databases 1502, 1503, and 1504. The Personal Database for an individual may contain, for example, messages sent to or sent by that individual, and contacts entered by that individual. The Organizational Database 1501 may for example be a union of all of the Personal Databases, and it may include additional organization-wide information that is not associated with any particular individual. Threat detection 1520 for an incoming message such as 1510 may reference the Organizational Database 1501 as well as the Personal Database 1504 of the message recipient. This scheme is illustrative; one or more embodiments may use any set of Messaging System Databases in any manner to check messages for threats.

FIG. 15 also illustrates an embodiment that uses data from one or more external databases to supplement the analysis of the organization messaging database in order to perform threat detection. In the embodiment shown, external databases 1530 are accessed by threat check 1520. These databases may include for example database 1531 that may contain blacklisted senders or websites, database 1532 that may contain known or suspected spammers, and database 1533 that comprises for example DNS and whois servers that provide information on website identity and registration. These examples are illustrative; one or more embodiments may access any available external databases in addition to internal organizational messaging databases to perform threat detection.

Figure 16:
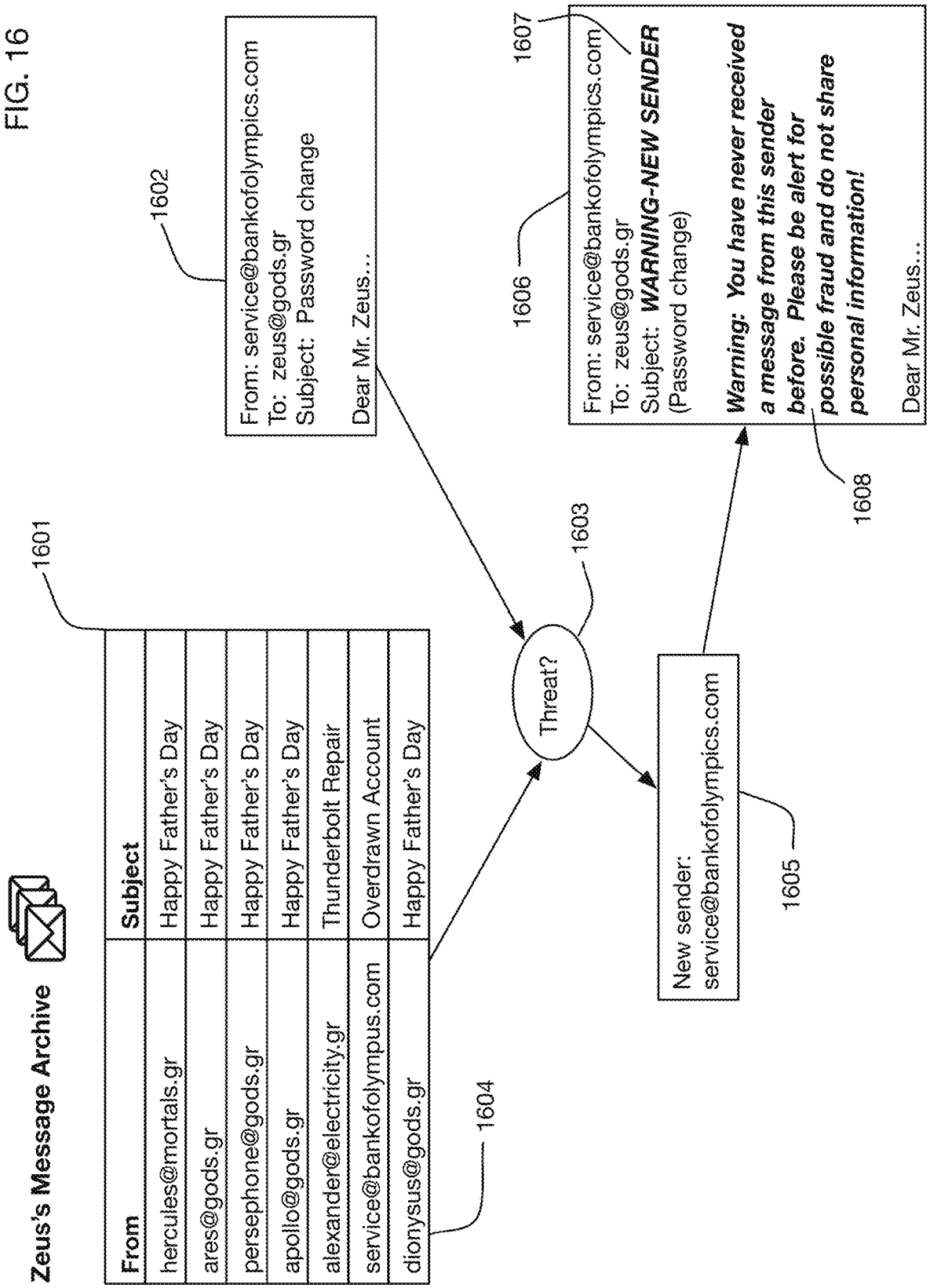
FIG. 16 illustrates an embodiment that detects a potential threat if a message is from a new sender that does not appear in the Message Archive.

One or more embodiments may use any information in a Messaging System Database to check a message for threats. We will now describe several specific examples of threat detection techniques that use the Messaging System Database information. FIG. 16 illustrates an embodiment that checks for threats by comparing the sender of a message to the senders of all previously received messages in the Message Archive; if a sender is a new sender, the message is classified as a potential threat. It should be appreciated that the identity of a sender is a rarely known and it is easy to forge a sender. Instead, the identity of a sender is alleged with a level of confidence. For purposes of explaining the embodiments, the term "sender" includes alleged or purported senders.

In the example illustrated in FIG. 16, the Personal Message Archive 1601 of the recipient is used for the threat check 1603; one or more embodiments may also use an organizational message archive (for example, to classify a message as a potential threat if the sender has never sent a message to anyone in the organization). The email address of the sender of message 1602 does not appear in the From field 1604 of any message in the Message Archive 1601; thus the threat detection process 1603 classifies the sender as a "new sender" 1605. Based on this classification, one or more embodiments may consider the message to be a threat or a potential threat. Actions taken by the system for this potential threat may include blocking the message entirely, blocking parts of the message, or warning the user about the potential threat. The system can also rewrite an attached file into a safer form, for example, a WORD document is converted into a PDF file. In the example shown in FIG. 16, the system transforms message 1602 into modified message 1606; the transformation inserts a warning that the sender is new, and that the user should therefore be cautious, particularly in sharing personal information. In this example, the system inserts a warning 1607 into the subject line, and it inserts a preamble 1608 prior to the message contents that warns that the sender is new.

The example shown in FIG. 16 uses the Message Archive to determine if a sender is new, and hence potentially a threat. One or more embodiments may use a Contacts list for a similar purpose. For example, a sender may be considered "new" if the sender does not appear in the Contacts list. FIG. 17 illustrates an embodiment that uses a Contacts list to determine if a message sender is a known contact. For illustration, this example uses an Organizational contacts list 1701 instead of a personal contacts list. This is for illustration only; one or more embodiments may use any combination of personal contacts and organizational contacts to screen messages for potential threats. In the example of FIG. 17, message 1602 is checked 1702 for threats by comparing the sender of 1602 to the known contacts in 1701. Because the sender address does not match the email addresses 1703 of the contacts in database 1701, the message is classified as having an "unknown sender" 1704. In this example, the sender's email address is compared to the email addresses of known contacts in the Contacts list 1701. One or more embodiments may use any type of sender identity and contacts identity to determine whether a sender is a known contact, instead of or in addition to email addresses, such as for example, without limitation, names, nicknames, display names, aliases, physical addresses, phone numbers, certificates, or any other identifying information. One or more embodiments may use only parts of an email address, such as for example the domain name portion of the email address. Because message 1602 is from an unknown sender (one whose email address does not appear in Contacts 1701), the message filter of the system may block all or part of the message, or it may transform the message for example to add a warning. In the example of FIG. 17, the system transforms message 1602 to modified message 1705, with a warning 1706 inserted in the subject, and another warning 1707 inserted into the message contents. One or more embodiments may perform any desired transformation on messages that have suspected threats, including for example, without limitation, adding warnings, removing message parts, encoding links or other resources, rewriting message text, and adding levels of security or checking when users attempt to access the message or any of the message parts. As another example, a file attached to the message can be written into a safer form, for example, a WORD document can be converted into a PDF file.

The example of FIG. 16 uses a Message Archive to determine whether senders are known; the example of FIG. 17 uses a Contacts list to determine whether senders are known. One or more embodiments may combine these techniques in any desired manner, using combinations of the Message Archive and the Contacts list to assess the threat potential from the sender of a message. For example, one or more embodiments may classify a sender as unknown if the sender appears in neither the Contacts list nor the Message Archive.

Figure 17A:
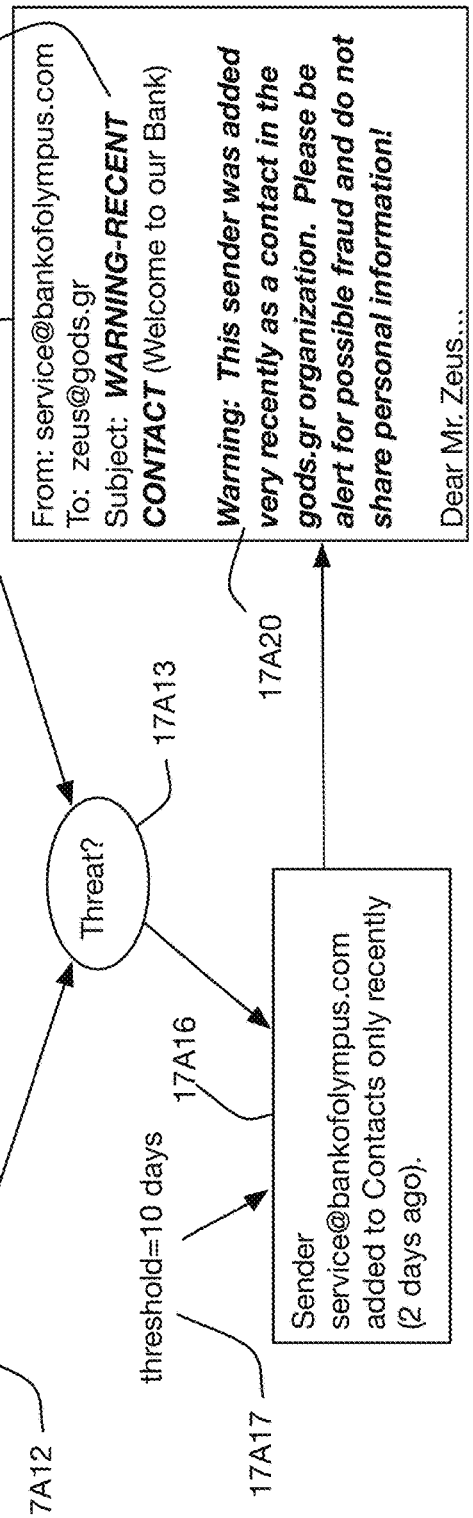
FIG. 17A illustrates a variation of FIG. 17, wherein a message from a sender who was only recently added to the Contacts list is considered a potential threat.

One or more embodiments may use the length of time a contact has been in a Contacts list to determine the likelihood that a message from that contact is a potential threat. This approach may assume, for example, that newer contacts may be less trustworthy since the user or the organization has less experience with them. FIG. 17A illustrates an embodiment that uses the time a contact has been known in a Contacts list to determine the threat potential of a message from that contact. Contact list 17A01 includes field 17A02 with the timestamp of when each contact was entered into the Contacts list. Message 17A10 is received from email address 17A11 from someone claiming to be that address. This address matches the email address 17A12 of a contact in the Contact list. The sender is therefore a known contact, unlike the example illustrated in FIG. 17. The threat check 17A13 therefore checks how long the contact has been in the Contacts list. By comparing the timestamp 17A14 of when the message was received with the timestamp 17A15 of when the contact was added to the Contact list, the threat check 17A13 determines that the contact was recently added 17A16. This value is compared to threshold 17A17; since the age of the contact is below the threshold, the message is classified as a potential threat. In this example, the threat protection system modifies the message 17A10 by inserting warnings to form message 17A18; warning 17A19 is inserted in the subject line, and warning 17A20 is inserted in the message text. One or more embodiments may block the message or parts of the message instead of or in addition to inserting warnings.

Figure 17B:
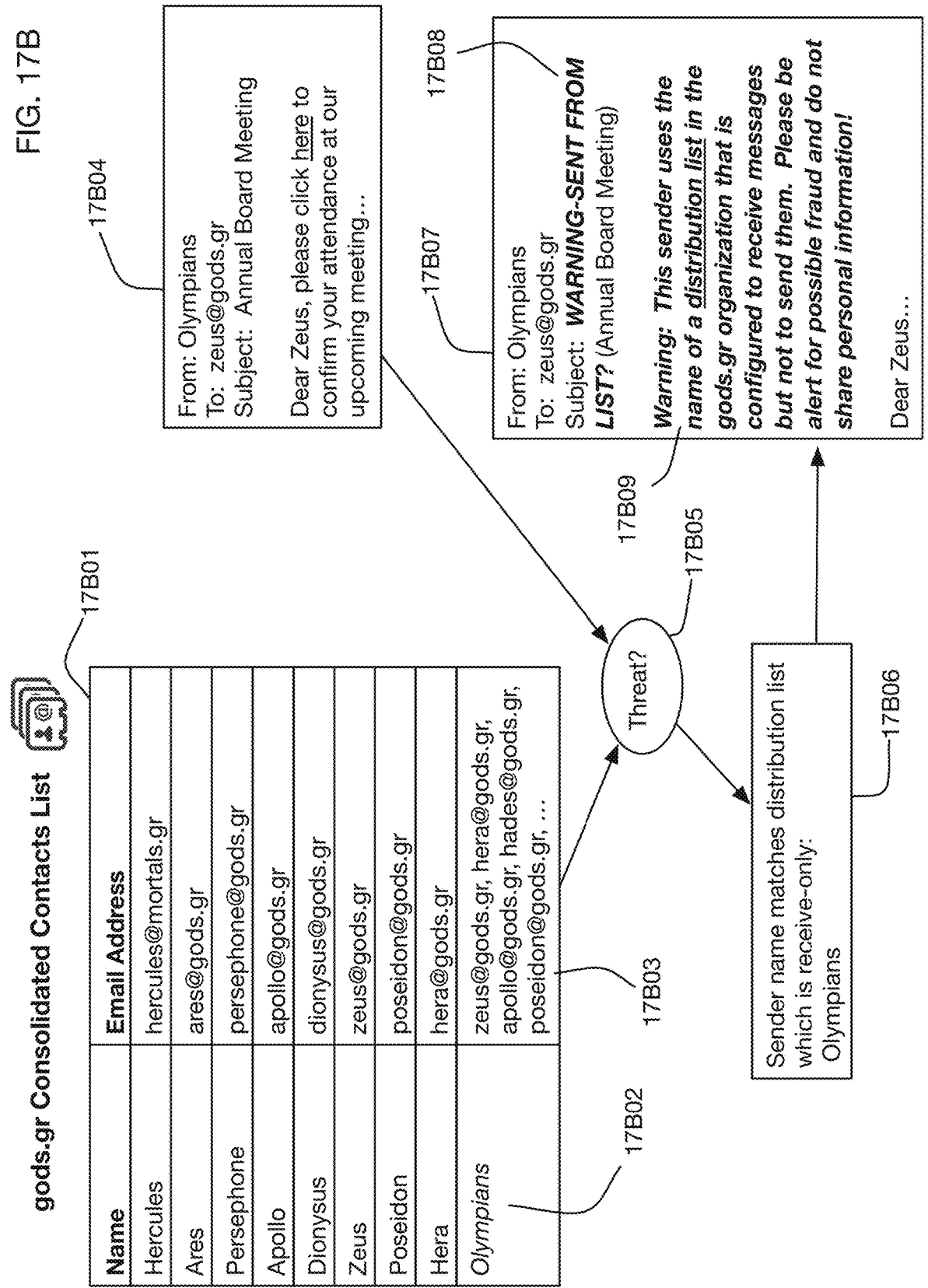
FIG. 17B illustrates an embodiment that detects a potential threat if a message sender appears to match a distribution list, which typically can only receive messages rather than send them.

Fraudulent messages such as phishing attacks are often constructed so that they appear to be sent by a known contact. In some cases, messages from senders that appear in the Contacts list may be recognized as fraudulent or potentially fraudulent if the apparent sender is not capable of sending messages. FIG. 17B illustrates an example with a message sender impersonating a distribution list in the Contact list. Contact list 17B01 contains several individual names and addresses, and a named distribution list 17B02 that contains multiple addresses 17B03. Distribution lists are typically configured as recipients of messages rather than senders of messages. Therefore, a legitimate message typically should not have a distribution list as a sender. In the example shown in FIG. 17B, message 17B04 has sender with identity matching the distribution list entry 17B02 in the Contact list 17B01. (It should be appreciated that the term "sender" includes alleged or purported senders whose identity is known to a level of confidence less than full.)

The threat check 17B05 flags the message as suspicious 17B06 because the sender's name matches the name of distribution list 17B02, which generally should only be a message receiver. Therefore, the system transforms message 17B04 to message 17B07, with warning 17B08 inserted in the message subject and warning 17B09 inserting in the message text. One or more embodiments may block a message from a distribution list instead of inserting warnings. One or more embodiments may use any desired method to detect and flag senders that appear in a Contact list but are not legitimate or typical sources of messages. For example, in addition to distribution lists, non-sending Contact list entries may include email addresses that have been configured by an organization as recipients for particular purposes (e.g., unsubscribe@gods.gr), but that are not used for sending messages.

In some cases, an impostor may use a sending address that is almost identical to that of a known contact, so that the receiver mistakes the sender for the real contact. One or more embodiments therefore may classify a message as a potential threat if the identity of the sender is similar to, but not identical to, that of a known contact in a Contacts list. Any type of identity may be used to compare a sender to a contact. For example, without limitation, an identity may comprise an email address, a partial email address, a domain name of an email address, a display name of an email address, a physical address, a last name, a full name, a nickname, an alias, a phone number, an extension, a PIN, a social security number, or an account number. One or more embodiments may use any method to define and calculate the similarity between two identities.

Figure 18:
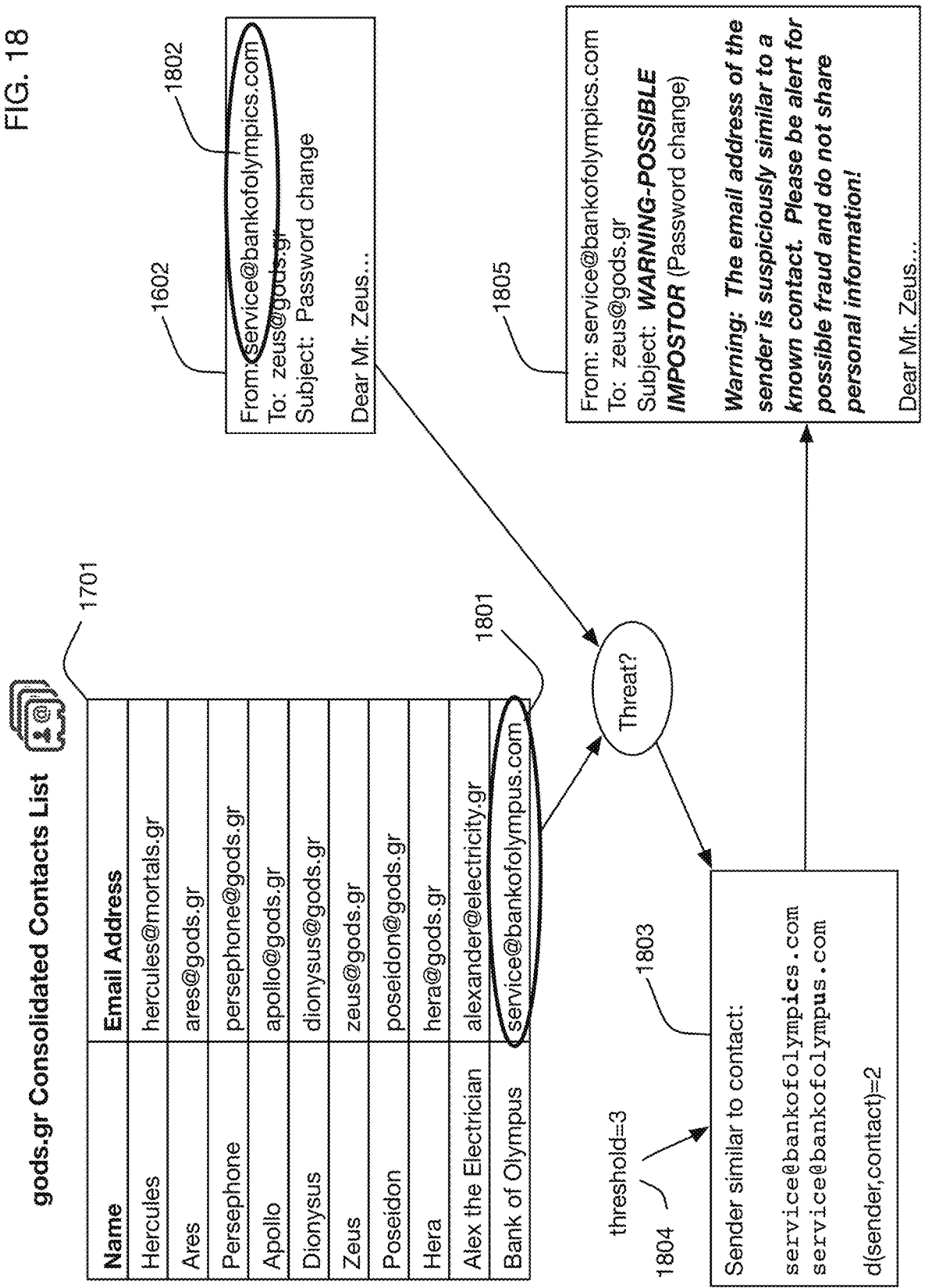
FIG. 18 illustrates an embodiment that detects a potential threat if a message is from a sender with an identity that is similar to, but not identical to, that of a known contact.

FIG. 18 illustrates an example of an embodiment that uses similarity of a sender to a known contact to determine whether a message is a potential threat. Message 1602 has sender with email address 1802. Contact list 1701 contains a similar, but not identical, email address 1801. The threat detection system compares these two identities (which in this example are email addresses) and determines that the sender's identity is similar to, but not identical to, the contact's identity. In this example the comparison uses a distance function between the two identities. One or more embodiments may use any distance function or similarity metric, or any other method to compare identities to determine the degree of similarity. One or more embodiments may compare any form of identity, including for example any portion of the email address or any other name, identifier, number, string, or value associated with a sender or a contact.

For example, how similar the email addresses of a suspicious (unknown/unverified) sender is to the email address of a known contact is determined using a Levenshtein distance function, which counts the number of character changes needed to transform one string into another string. The result of the Levenshtein distance function (shown in the figure as result 1803) is then compared against threshold 1804. In this example, when the result 1803 is positive and less than the threshold 1804, the email address of the sender is suspiciously similar to the email address of the known contact. As shown, the result 1803 has a value of two and the threshold 1804 has a value of three. Because the similarity metric (result 1803) is positive and below the threshold 1804, the message is classified as a potential threat. The threat protection system transforms message 1602 into modified message 1805, with warnings inserted into the subject line and the message text.

Phishing attacks and other threats may use names or addresses of senders or websites that are similar to those of known, legitimate senders or websites. In addition to deliberate, minor spelling changes, such as the difference between address 1801 and address 1802 of FIG. 18, attackers may use homograph attacks that use different characters that look alike. For example, different Unicode characters may have identical or similar displays; hence names may differ in their Unicode representation even if they appear identical or very similar to a receiver. As an illustration, the Unicode character 0x0430 is a Cyrillic lower case "a"; this character may look identical to Unicode character 0x0061, which is a Latin lower case "a". Thus for example the domain name www.bankofolympus.com with the "a" in Cyrillic is a different domain from the identical looking name www.bankofolympus with the "a" in Latin. One or more embodiments may compare names for similarity using knowledge of homographs. For example, a distance metric may take into account the display of characters as well as their internal (e.g., Unicode) representation. As an example, each Unicode character may be mapped into a canonical representation character prior to calculating a distance. Thus for example, both 0x0430 and 0x0061 might be mapped to the same representation character "a". The homograph-aware distance between the www.bankofolympus.com name with Cyrillic "a" and www.bankofolympus.com with Latin "a" would then be 0, indicating that one may be an impostor posing as the other. Comparison of names that may include internationalized domain names (or similar identifiers) may first transform these names from an encoded internationalized representation to a Unicode character set, and then to a canonical form or other representation that reflects the display of the characters. For example, the internationalized domain name www.bankofolympus.com with a Cyrillic "a" may be encoded in ASCII as www.xn--bnkofolympus-x9j.com. For name comparison, one or more embodiments may first decode an encoded internationalized ASCII string (like www.xn--bnkofolympus-x9j.com) into the corresponding Unicode characters, and then compare the Unicode string to other names using canonical representations based on display, or based on other similarity scores that take display representations into account.

One or more embodiments may also calculate distances between names taking into account letter combinations that look similar; for example, the letter combination "rn" looks very similar to "m". Thus the name www.bankofolyrnpus.com may be easily confused with www.bankofolympus.com. An illustrative distance metric that takes these similar appearing letter combinations into account may for example use a variation of a Levenshtein distance function that counts a substitution of one combination for a similar looking letter as a fractional letter substitution to reflect the display similarity. For instance, a substitution mapping "rn" to "m" may count as a distance of 0.5, rather than as 2 in a standard Levenshtein distance function. One or more embodiments may extend this example using a table of substitutions between characters and character combinations, with an associated distance weight associated with each such substitution. This approach may also be used for the homograph similarity described above; substitution of one letter for a homograph (identical or similar appearing letter) may for example count as a fractional distance rather than as a full character edit.

Figure 18A:
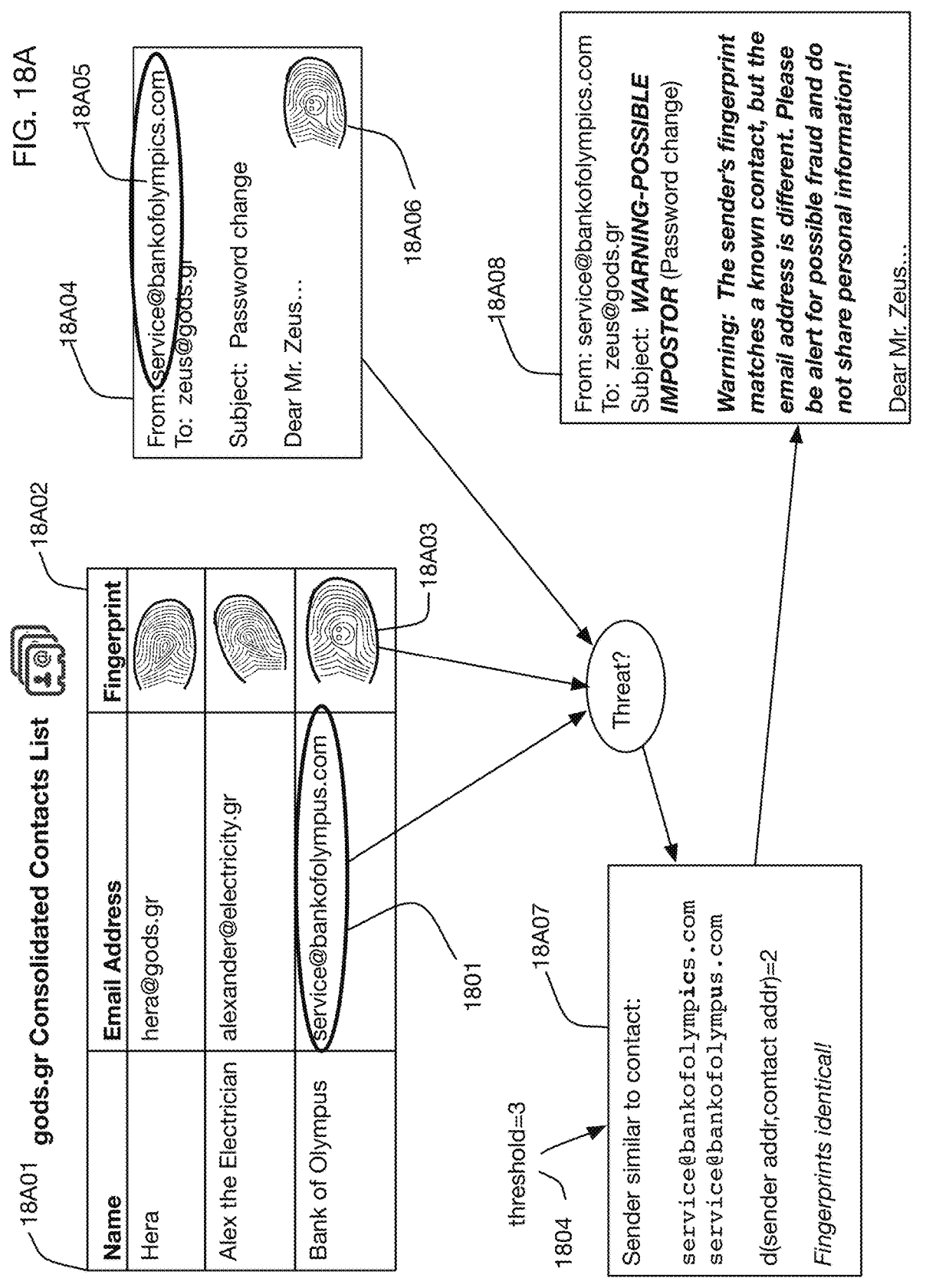

One or more embodiments may use any type of identity or identities to compare senders to known contacts or previous senders in order to flag potential threats. FIG. 18 illustrates a comparison using email addresses as identity. FIG. 18A illustrates an embodiment that further compares a sender biometric identifier embedded in a message with corresponding biometric identifiers of known contacts. One or more embodiments may use any form of biometric identifier to compare senders to contacts or to other lists of known senders, including for example, without limitation, a fingerprint, a palm print, a voice print, a facial image, or an eye scan. In FIG. 18A, contacts list 18A01 contains a column 18A02 with a fingerprint of each known contact. In this embodiment, incoming messages may include a fingerprint of the sender. Incoming message 18A04 has sender email address 18A05, and the message contains fingerprint 18A06 ostensibly from the sender. The threat detection system compares the sender email address 18A05 and the sender fingerprint 18A06 to identities of contacts in the contacts list 18A01. The fingerprint 18A06 matches fingerprint 18A03; however, the email address 18A05 differs from the corresponding contact email address 1801. Therefore, the threat detection system determines that the message may be a potential threat 180A07 since the sender's identity is similar to, but not identical to, that of a known contact, taking into account both the fingerprint and the email address. Transformed message 18A08 provides a warning that the sender may be an imposter who has, for example, stolen the fingerprint identity to appear to be the known contact, but who is using a falsified email address as part of an attack.

Figure 19:
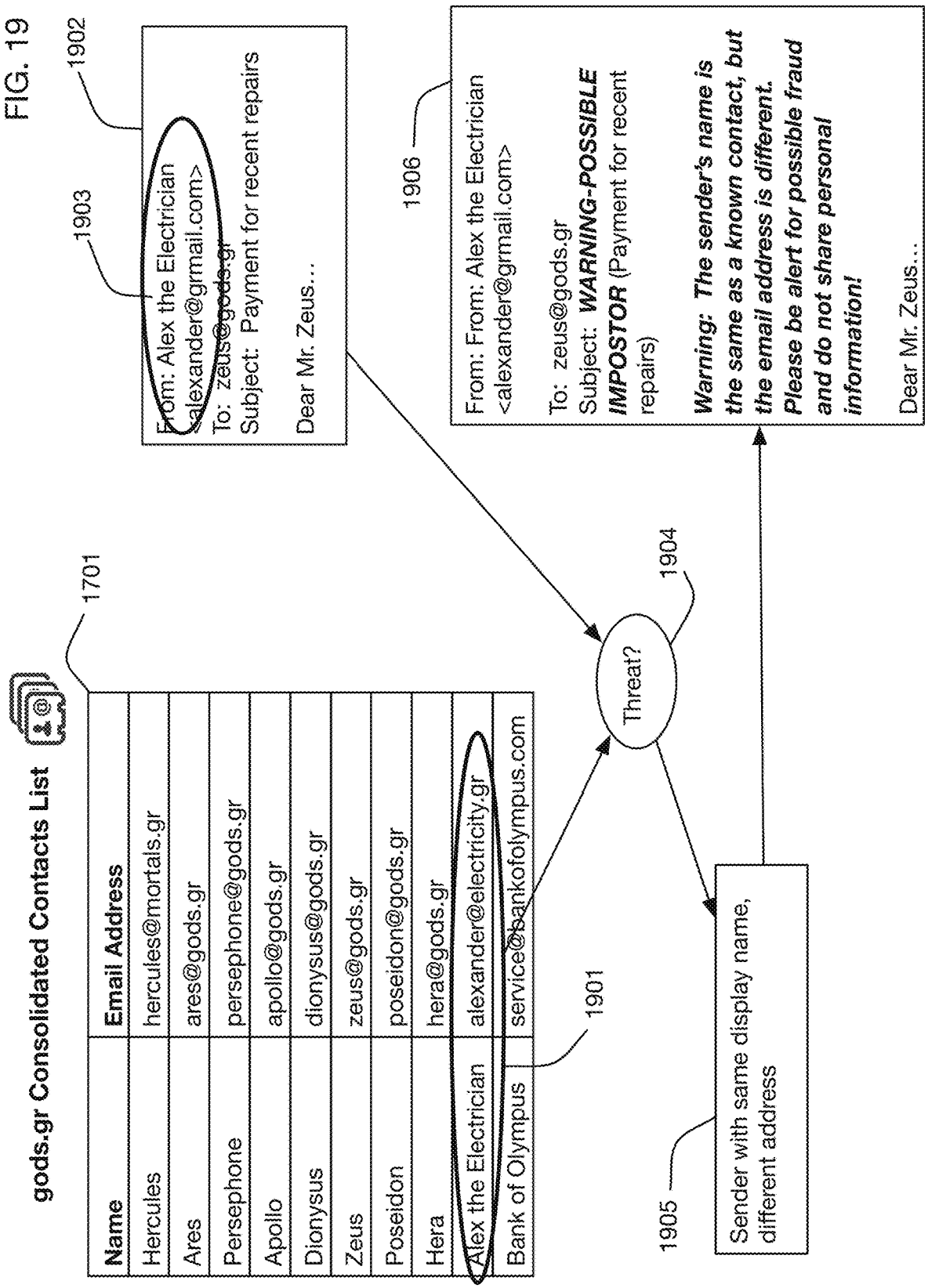
FIG. 19 shows a variation of the example of FIG. 18, where similarity of a sender to a known contact may include having the same email display name but a different email address.

FIG. 19 illustrates an example that compares both the display name and the address portions of an email address to determine if a sender is a potential impostor. Message 1902 is from sender 1903 with the same display name ("Alex the Electrician") as contact 1901. However, the sender's address (alexander@grmail.com) is different from the address of the contact 1901. Threat analysis 1904 therefore flags the sender as a potential impostor 1905, and adds warnings to transformed message 1906. As this example illustrates, one or more embodiments may compare senders to contacts using any combination of identities or partial identities to determine if a sender may be imitating a known contact.

Figure 20:
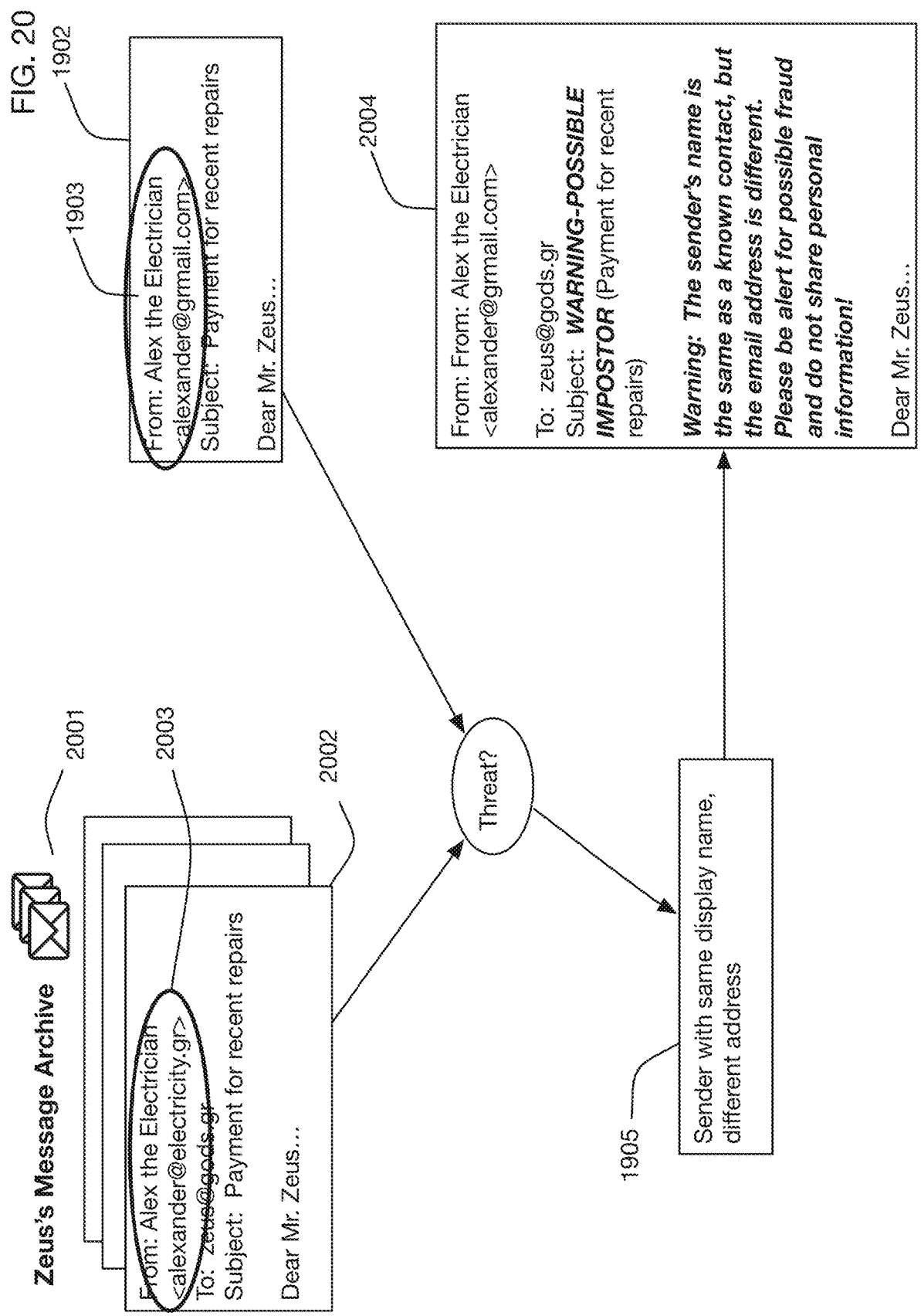
FIG. 20 shows a variation of the example of FIG. 19 that compares the sender of a message to previous senders in the Message Archive.

The examples of FIGS. 18 and 19 illustrate use of a Contact list to identify senders that have identities that are similar to, but not identical to, identities of known contacts. FIG. 20 illustrates an embodiment that checks for similarity of a sender to previous senders or receivers of messages in a Message Archive. Message 1902 is received from sender 1903. The sender identity 1903 is compared to senders that appear in Message Archive 2001. A similar sender is located in message 2002, and the identity 2003 of the sender of message 2002 is compared to the identity 1903 of the sender of the new message. As in FIG. 19, the threat detection system flags the sender as a potential impostor 1905 since the display name is the same but the address is different, and inserts warnings into transformed message 2004. It can be appreciated that more than one person can have the same name, especially common names, such as "Jim Smith." As such, the sender with the same display name but different address may or may not be an imposter.

One or more embodiments may use any combination of Contact lists and Message Archives to check the identities of senders and to perform threat analysis. For example, the techniques illustrated in FIGS. 19 and 20 may be combined, wherein a sender may be identified as a possible or probable impostor if the sender identity is similar to either a known contact or to a previous sender or receiver of a message in a Message Archive. One or more embodiments may calculate a similarity score or metric for a sender identity using any combination of data from Contacts and Message Archives.

Figure 21:
FIG. 21 illustrates an embodiment that detects a potential threat in an embedded link to a website if the link is similar to, but not identical to, a link in a previously received message.

One or more embodiments may apply any of the above techniques to other message parts of a message in addition to the message sender. For example, in phishing attacks a message may include a link to a malicious website that is a close replica of a legitimate website. One or more embodiments may analyze message links by comparing them to previously received links; if the link identities are similar but not identical, the system may flag the link as a potential threat. Any form of link identity may be used for the comparison, such as for example, without limitation, a domain name, an IP address, a certificate, a hyperlink display name, or any value obtained from or derived from the website that is the target of the link. FIG. 21 illustrates an example. Message 2102 contains link 2103 to a website. Message Archive 2101 contains a previously received message 2104 with a link 2105. Using a similarity metric like the one described with respect to FIG. 18, the domain names of the links 2103 and 2015 are compared; the result 2106 is compared to threshold 2107. Because the link 2103 is similar to, but not identical to the previously received link 2105, the message is flagged as a potential threat. One or more embodiments may insert a warning into the message, as for example was illustrated previously. In the example shown in FIG. 21, the threat protection system transforms message 2102 into modified message 2108, which changes link 2103 to an encoded link 2109. Clicking on the encoded link 2109 may for example perform additional checks or present a warning to the user.

One or more embodiments may compare any portion of a link or any portion of a domain name to the corresponding portion of other links or domain names in order to determine similarity. For example, the domain name 2105 (www.bankofolympus.com) includes a top-level domain (com), a second-level domain (bankofolympus), and a subdomain (www). One or more embodiments may compare domain names for similarity using only the top-level and second-level domains, for example, since organizations can easily assign, change or add subdomains. Thus a link with the same top-level and second-level domain, but a different subdomain likely does not represent a threat. As an illustration, if a link is received to www2.bankofolympus.com, the top and second level portions (bankofolympus.com) match the previously received top and second level portions of link www.bankofolympus.com; thus the new link may not be considered suspicious even though the full domain name differs slightly from the previous full domain name. Additional subdomains may also be ignored in one or more embodiments. For example, a link to www.homeloans.bankofolympus.com may be compared for similarity using only the top-level and second-level domain portion (bankofolympus.com), with the subdomains "homeloans" and "www" ignored for similarity comparisons. Similarity comparisons in one or more embodiments may also ignore link path names after the domain name, for example. Thus for example a link to www.bankofolympus.com/support may be considered identical to a previously received link to www.bankofolympus.com/login, if the similarity comparison compares only the domain name portion of the link (www.bankofolympus.com), or only the top-level and second-level domain portion (bankofolympus.com). In general, one or more embodiments may compare names (including links, addresses, identifiers, domain names, etc.) using any desired similarity measure on either full names or any portion or portions of the names. Portions of names compared may include for example, without limitation, any subset, slice, field, extract, transformation, prefix, or suffix of a name.

Figure 22:
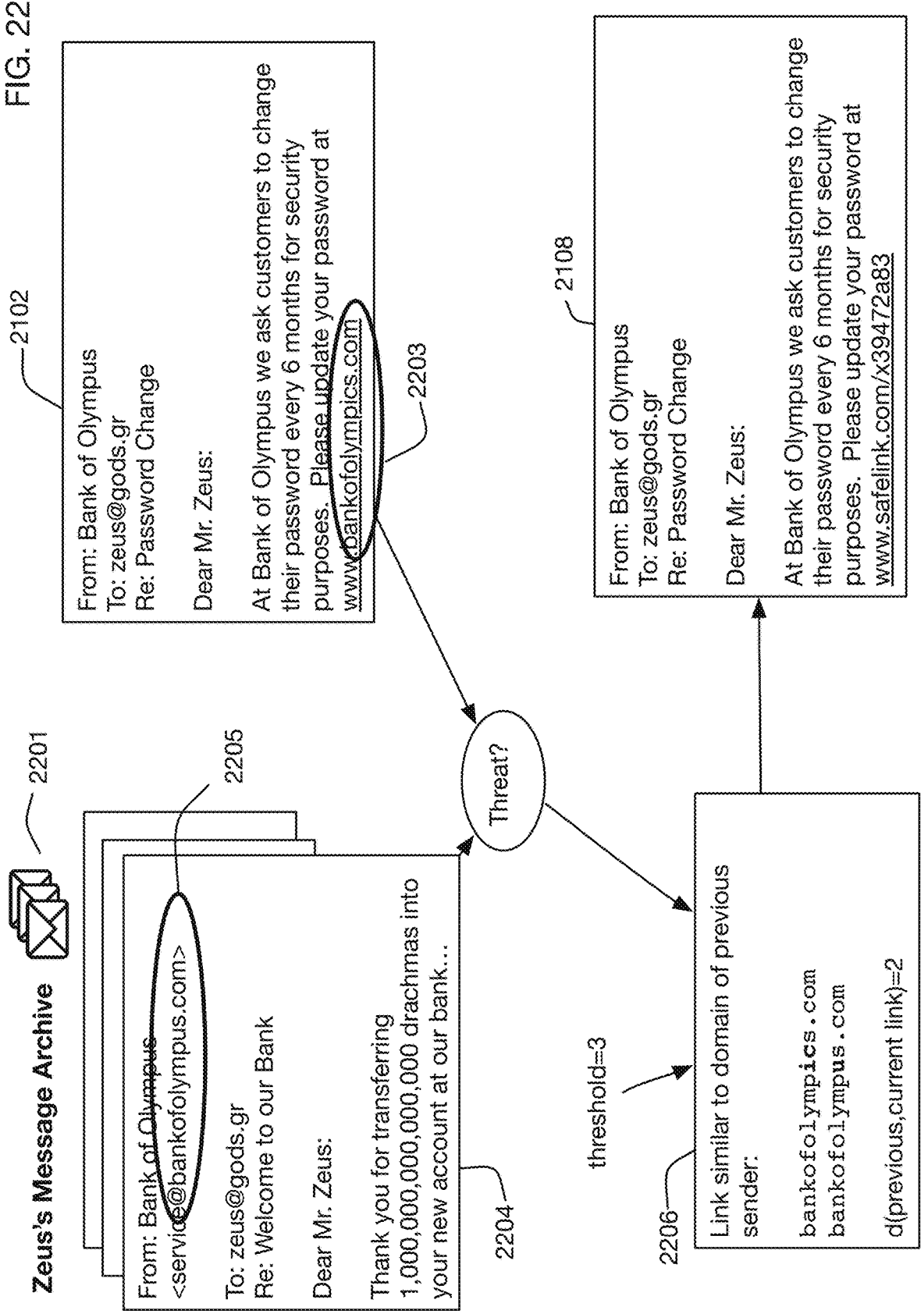
FIG. 22 shows a variation of the example of FIG. 21, where a link domain is compared to the domain of a sender of a previous message in the Message Archive.

One or more embodiments may compare a link in a message to any domain name referenced in any part of any message in a Message Archive. For example, the email address of the sender or receiver of a message generally contains a domain name; this domain name may be compared to a link address in an incoming message. FIG. 22 illustrates an example. Message 2102 contains a link to a website in domain 2203. Message Archive 2201 contains message 2204 from a sender from domain 2205. The system compares domain 2203 and domain 2205; the result 2206 shows that the domains are similar but not identical. The system therefore classifies message 2102 as a possible threat, and transforms it into message 2108 (as in FIG. 21) with an encoded link that provides additional protection or warnings.

Another indication that a message may be fraudulent is that it is contradictory to or inconsistent with previous messages from the same sender, from a similar sender, with the same or similar subject, or on the same or a similar topic. One or more embodiments may compare the contents of a message with the contents of previous messages in the Message Archive to identify contradictions or inconsistencies. A contradiction may be for example an explicit or implied inconsistency between messages, or it may be an explicit instruction or indication to change or disregard information provided in a previous message. Analyses for contradictions may use any methods to determine the meaning or purpose of the messages, including for example natural language processing, pattern matching, statistical analysis, or artificial intelligence. FIG. 23 illustrates an example of an embodiment that detects a contradiction by observing deposit instructions to two different account numbers. Message Archive 2301 contains a message 2302 from sender 2303 with subject 2304 that instructs the recipient to deposit funds into account number 2305. Subsequent message 2310 is apparently from the same sender and has the same subject, but it references a different account number 2315. Threat detection system 2320 analyzes message 2310 against previous messages in archive 2301 with the same or similar sender or subject, including message 2302, and determines that the account numbers are different. For example, 2320 may search for numbers in a particular format, or for numbers following selected keywords such as "account." It may also search for key phrases that suggest a contradiction, such as "please disregard," "please change," or "use . . . instead." One or more embodiments may use any analysis method to identify account numbers or similar elements within messages, or to identify inconsistencies or possible contradictions. The threat analysis result 2321 therefore flags message 2310 as a possible threat, and the system transforms message 2310 into modified message 2322 by inserting warnings into the subject line and the message contents.

FIG. 24 illustrates another example an embodiment that discovers an inconsistency that may represent a message threat. Message 2402 from sender 2403 requests the recipient to update a password, and it provides an embedded link to do so. Message archive 2401 contains several messages from the same sender. A threat protection system 2404 analyzes these previous messages and determines that the request is unusual 2405 since the sender has never used the phrase "update your password" and has never included an embedded link in a message. One or more embodiments may use any form of pattern analysis, parsing, classification, trend analysis, statistical analysis, artificial intelligence or analysis of writing style to determine whether a message represents an unusual message that is inconsistent with previously received messages. Thus the system transforms the message 2402 into modified message 2410 with the link 2406 transformed into encoded link 2411, which provides additional checking or warnings. As described in previous examples, one or more embodiments may also add warnings to the message, or may block all or part of the message.

Figure 25:
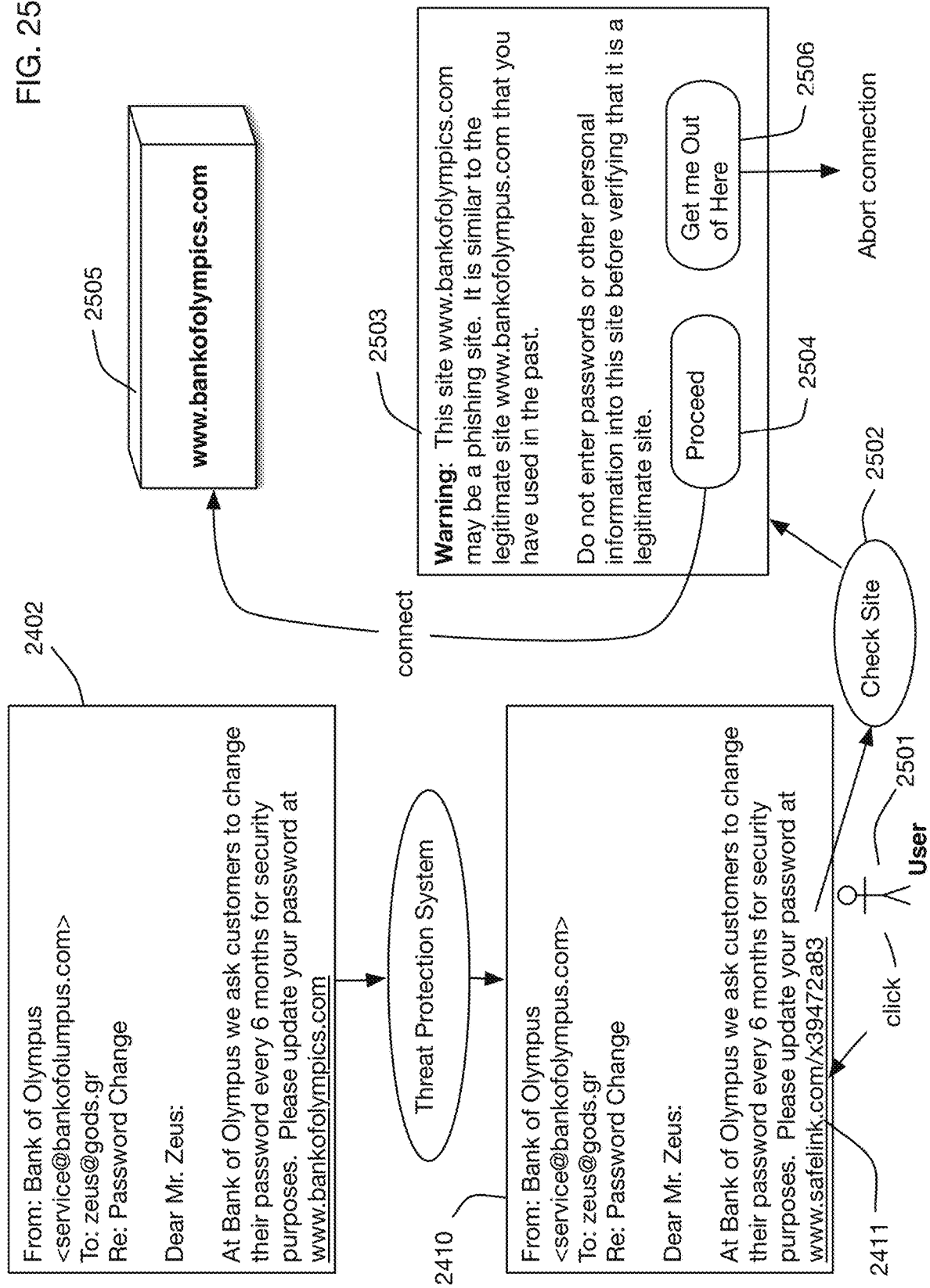
FIG. 25 illustrates an embodiment that transforms suspicious links into encoded links, where clicking on the encoded link performs additional checks and then presents a warning to the user.

FIG. 25 continues the example of FIG. 24 to show an illustrative warning embedded into an encoded website link. When user 2501 clicks encoded link 2411, the threat protection system may perform additional checks 2502 to determine whether the original link target is a potential threat. It may then display a warning message such as 2503. One or more embodiments may not perform any additional checks, but instead may directly display a warning when an encoded link is checked. One or more embodiments may block a site entirely if the check 2502 indicates that the site is a potential threat. Warning message 2503 may for example explain to the user why the link is a potential threat. It may also caution the user not to provide any personal or sensitive information to the site. The warning may provide the user with an option 2504 to proceed to the original site 2505, or an option 2506 to not connect. One or more embodiments may provide any desired information, education, warnings, caveats, or options to the user when the user clicks an encoded link or otherwise accesses a message that has been transformed by the threat protection system.

Figure 26:
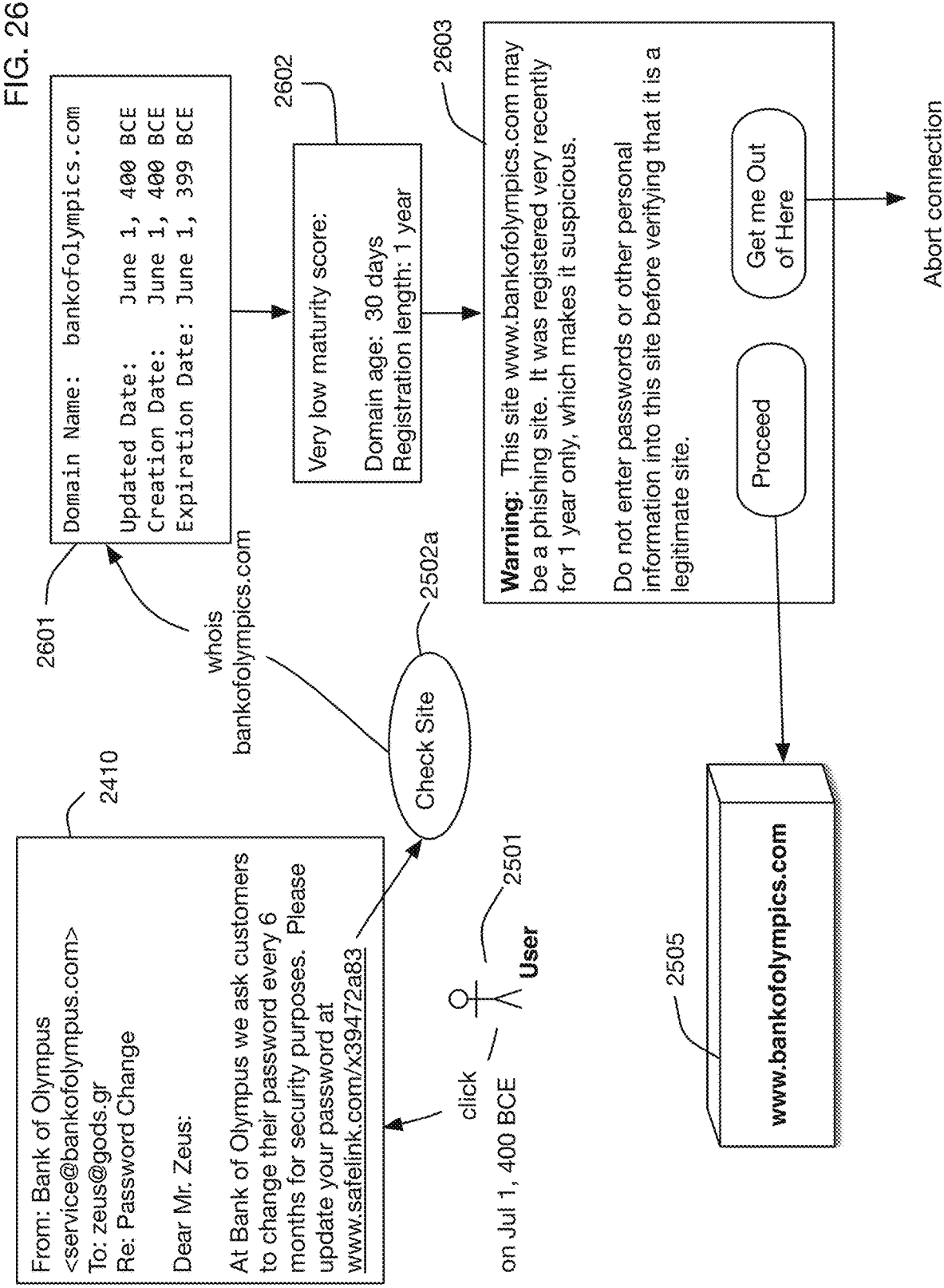
FIG. 26 illustrates an embodiment that checks the domain registration information for a website to assess whether the site presents a potential threat.

The check site process 2502 may perform any desired analysis of the site 2505 to determine if it is an actual, potential, or likely threat. FIG. 26 illustrates an embodiment that checks a site's domain registration records to determine the likelihood that the site is a threat. Check 2502a obtains registration information 2601 for the domain associated with the site. The system analyzes the elapsed time since the site was registered, and the length of time for which the site was registered, to determine how "mature" or stable the site is. The result 2602 indicates that the domain was registered recently (30 days ago) and was registered for only one year. This implies a relatively low "maturity score." Therefore, the system provides warning 2603 to the user. One or more embodiments may use any available domain registration information to determine whether a site may represent a threat. For example, one or more embodiments may calculate a maturity score for a website based on any combination of the duration of time since the domain for the site was registered and the length of time for which the domain was registered. One or more embodiments may apply a threshold value to the maturity score to determine whether the site represents a potential threat. Additional factors for a maturity or trustworthiness score can include who owns the domain (and their reputation), whether the email address registered with the domain uses the domain in question, whether that email address is itself suspicious.

Figure 26A:
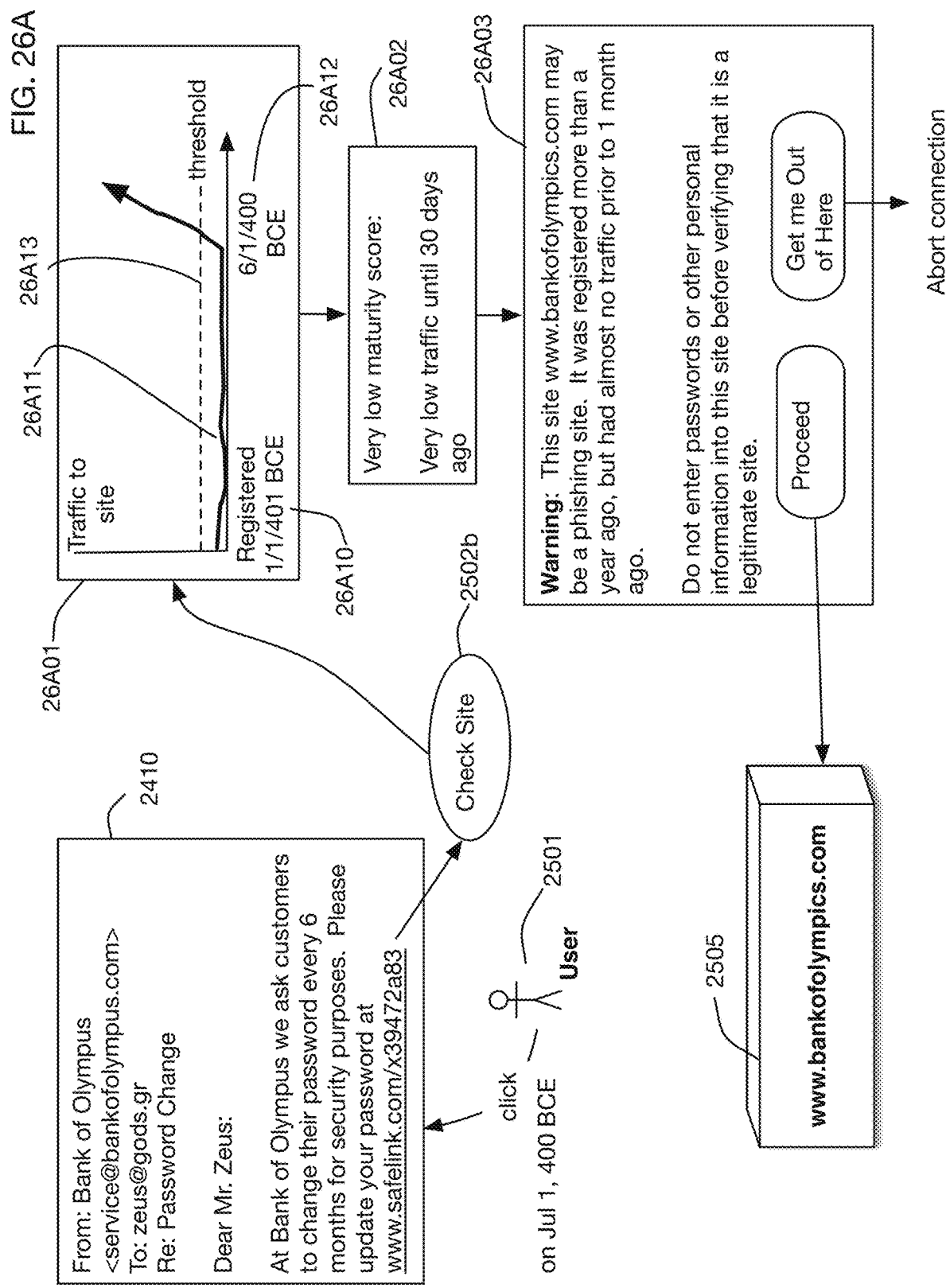
FIG. 26A illustrates an embodiment that checks history of traffic levels to a website to assess whether the site presents a potential threat.

One or more embodiments may assess the maturity of a website, domain name, or other identity by analyzing the pattern of traffic associated with that identity over time. For example, a website may have been registered long ago, but kept "dormant" until recently, in which case it may have a history of little or no traffic until recently; this pattern of traffic may suggest a possible threat. Traffic may be measured for example by services that measure DNS queries, or by services that monitor IP addresses of packets flowing through the Internet. Traffic may also be measured as email to or from specific domains. FIG. 26A illustrates an embodiment that checks the traffic history of a website prior to allowing access to the site. As in the embodiment of FIG. 26, a link to a website received in a message is rewritten into an encoded link; when user 2501 clicks on the encoded link, check 2502b accesses traffic history 26A01 for the site. One or more embodiments may use any source of traffic history information to perform check 2502b. For example, without limitation, traffic history may comprise any measurements of incoming connections to a domain or website or IP address, outgoing connections from a domain or website or IP address, email messages sent from or to a domain or address, or DNS queries for a domain name. In the example of FIG. 26A, the website referenced in the original message was registered at time 26A10, which predates the clicking of the link by more than a year. However, traffic measure 26A11 associated with the website was very low or zero for some time after registration. This low traffic measure suggests that the website, although registered, was effectively dormant for a significant period of time after registration. At time 26A12, traffic increased dramatically and exceeded threshold value 26A13. The check 2502b therefore uses this time 26A12 as a relevant measure of the maturity of the website, since it indicates when the site stopped being dormant and became active. Since this time of significant activity was very recent, the maturity score 26A02 indicates that the maturity of the site is low. Thus message 26A03 provides a warning that the site may be a threat.

In addition to transforming messages to add warnings or to encode website links, one or more embodiments may further transform messages to encode personal, sensitive, or confidential information. The encoded information may for example only be decoded and presented to the user if the user presents specific credentials, or if the user's identity matches a set of authorized recipients. FIG. 27 illustrates an embodiment that transforms a message to hide a security code from unauthorized users. Message 2701 contains a security code 2702 that should only be available to authorized users. The system 2703 detects this security code in the message, and encodes it into a protected link 2704. When a user 2705 clicks the link, a password prompt 2706 is presented to the user prior to displaying the security code. In one or more embodiments the password prompt may be replaced by an automated check of the identity and credentials of the user, or by any desired authentication and authorization scheme. The threat protection system 2703 may for example locate personal, sensitive, or confidential information in messages using natural language processing, pattern matching, artificial intelligence, or any text processing scheme or algorithm. In the illustrative example of FIG. 27, the system 2703 searches messages for specific phrases 2707. For any of the located phrases, a number or string matching a specific format that is near the phrase may be considered sensitive information, for example. For example, a number of the format "ddd-dd-dddd" (where each "d" is a digit) near the phrase "social security number" or "social security" may be considered to be a social security number, and thus may be encoded by the system.

Figure 28:
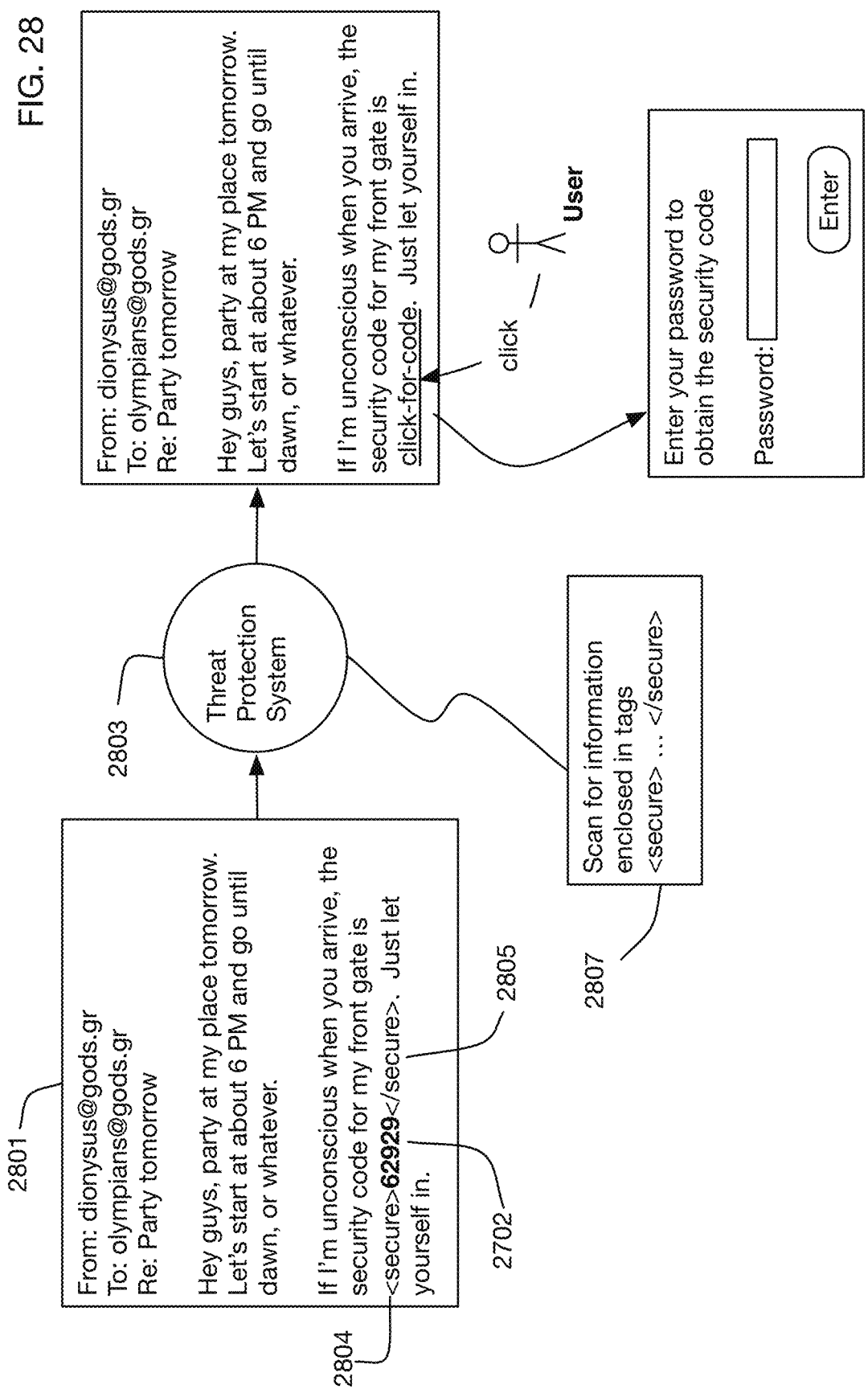
FIG. 28 illustrates a variation of the embodiment of FIG. 27, where a message sender may explicitly tag sensitive information that should be encoded by the system.

In one or more embodiments, the sender of a message may designate personal, sensitive, or confidential information explicitly. The threat protection system may then use these user designations to determine what information to encode. FIG. 28 illustrates an example where the sender of message 2801 (or an editor of the message) has inserted tags 2804 and 2805 around code 2702. The threat protection system 2803 searches for these tags 2807 and encodes information located within the tags. One or more embodiments may use any format for tags or other designations to identify information that should be encoded. In one or more embodiments the schemes illustrated in FIGS. 27 and 28 may be combined, wherein the sender may designate sensitive information and the system may in addition attempt to determine other sensitive information that has not been explicitly tagged.

Figure 29:
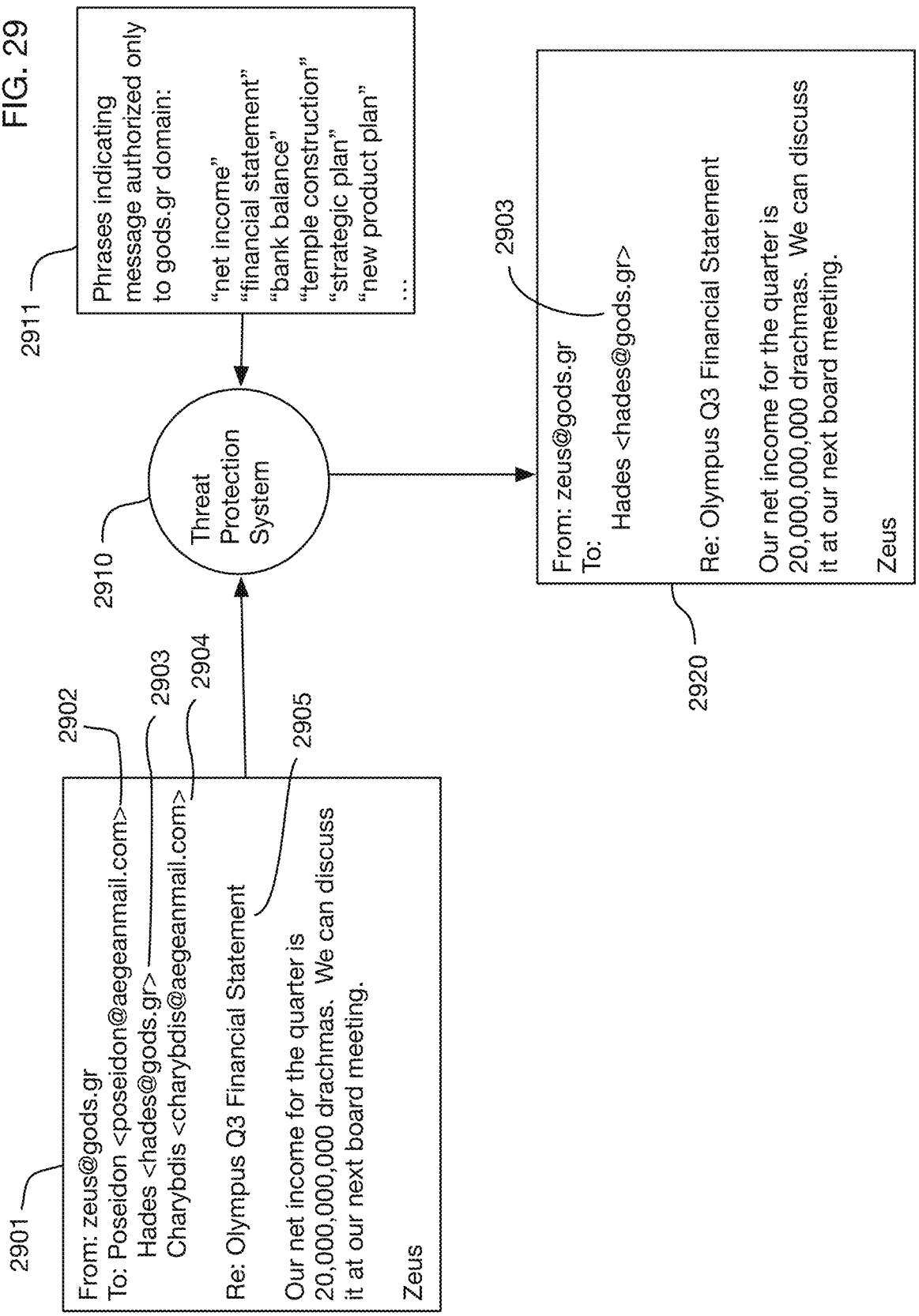
FIG. 29 illustrates an embodiment that transforms a message containing confidential or sensitive information by deleting receivers whose email addresses are not in a domain authorized to receive the information.

One or more embodiments may transform messages containing personal, sensitive, or confidential information in various ways to protect this information. For example, transformations may delete or substitute message recipients in order to ensure that the personal, sensitive, or confidential information is only sent to authorized receivers or to authorized domains. FIG. 29 illustrates an example. The Threat Protection System 2910 is configured to ensure that confidential information is sent only to email addresses in the gods.gr domain. One or more embodiments may apply similar rules to confidential information for a company or organization, for example, to ensure that this information is only sent within the company. One or more embodiments may have a list of multiple domains that are authorized to receive messages, or may apply any other rules to determine which email addresses are authorized to receive which messages or which types of information. Key phrase list 2911 provides phrases that indicate that a message contains or may contain confidential information. One or more embodiments may also use explicit tagging of sensitive information, as illustrated for example in FIG. 28. In the embodiment illustrated in FIG. 29, Threat Protection System 2910 scans message 2901 for the phrases 2911. This scan may be performed for example when sending, forwarding, or delivering a message. It may also be performed during or after message composition, for example as part of an email client. Because the title 2905 of the message contains a sensitive phrase, the message is flagged as having confidential information. The policy in this illustrative example is that only recipients with email addresses in the gods.gr domain are authorized to receive this information. Of the original recipients 2902, 2903, and 2904 in message 2901, only recipient 2903 has an email address in the authorized domain. Therefore, in this example the system transforms the message to revised message 2920, with only recipient 2903 remaining; the other recipients are deleted by the system.

In another example, the system "censors" or otherwise removes the sensitive phrase from the message 2901. The system sends a "censored" message to recipients 2902 and 2904, and sends the message 2901, uncensored, to the recipient 2903. In this way the system can allow partial content through.

Figure 30:
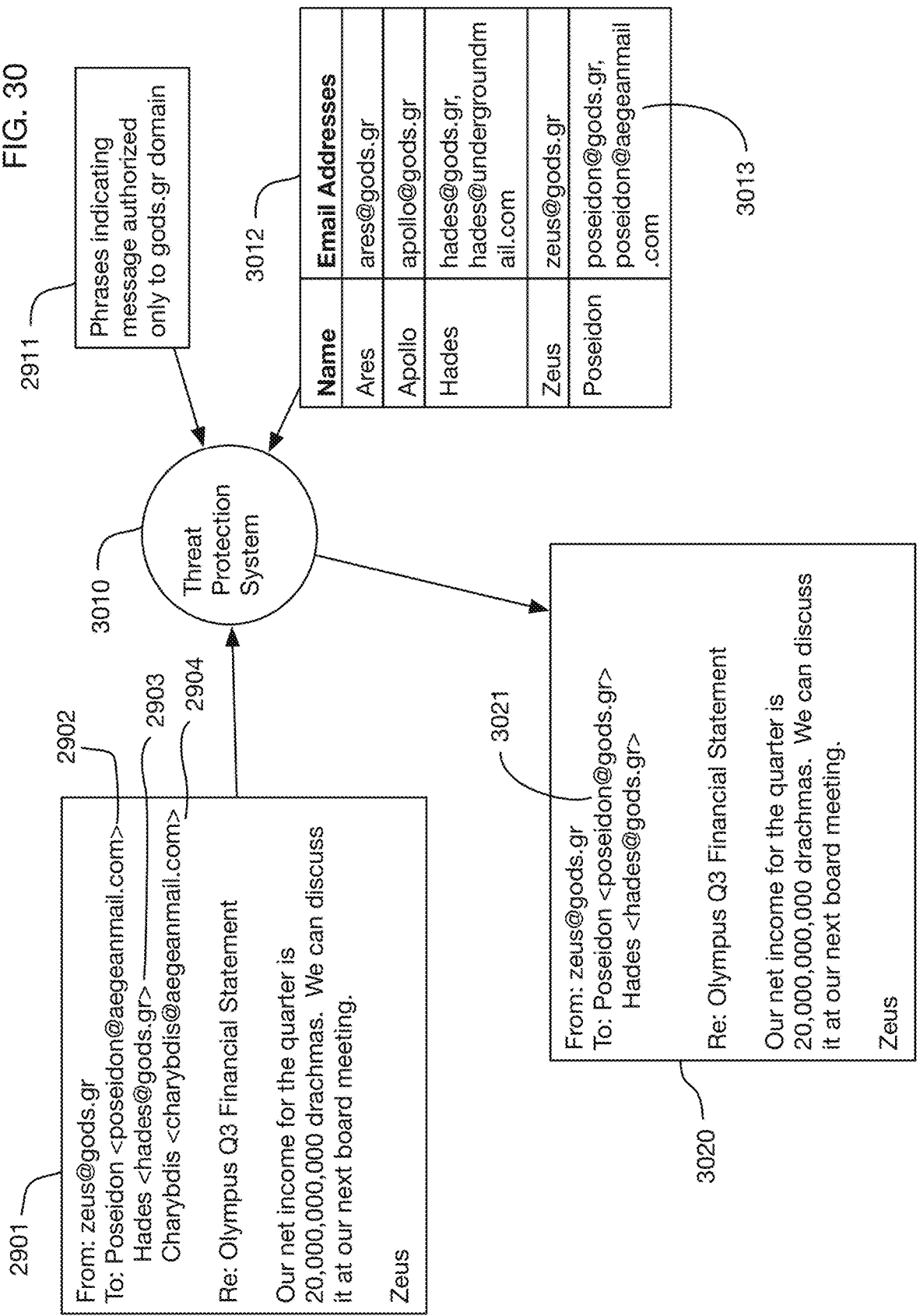
FIG. 30 extends the example of FIG. 29 with an embodiment that substitutes an email address in an authorized domain for an email address of the same user in an unauthorized domain, when the user has an email address in an authorized domain.

In one or more embodiments the threat protection system may also substitute a different email address when it transforms a message to remove a prohibited email address. FIG. 30 continues the example of FIG. 29 to illustrate email address substitution. As in FIG. 29, message 2901 is flagged as containing confidential information, based on the patterns defined in 2911, and email addresses 2902 and 2904 are removed from the recipients list because they are not in the authorized domain. In addition, contacts list 3012 is scanned by Threat Protection System 3010 to determine if a user whose email address is removed also has an email address in the authorized domain. In this example, user 3013 has two email addresses, one of which is the unauthorized address 2902 that is removed from the message, and the other of which is in the authorized domain. Therefore, the system 3010 may warn the user and/or make a substitution, and transform the message into message 3020 with address 3021 substituted for address 2902. The contact list 3012 has no matching authorized email address for the unauthorized address 2904; hence this address is simply removed with no substitution, censored, or autoreplied to.

Virtually every online account requires at least a username and password, commonly referred as to "login credentials", in order to access the account. Good password hygiene is the key to reducing the likelihood that a scam artist or criminal can access these accounts. It is recommended, among other things, that a user have a different password for each of their accounts and not to reuse passwords. At the very least, the user should have different login credentials to access their company account, bank account, email account, and other highly sensitive accounts.

Remembering all the different login credentials can be a challenge and it is not uncommon for a user to provide by mistake login credentials to a site that are restricted to another, sensitive cite. For example, the user forgets which login credentials to use for a site and they start entering every username, password, and combination they can think of or have used before in the hopes of entering the right one. One downside to this approach, which amounts to guessing, is that the user needlessly divulges login credentials, some of which may be for highly sensitive accounts. More troublesome, the user makes this a hazard disclosure over the public network to remote servers making the information susceptible to being stolen. Best practice would be, for example, to only send login credentials to a company account to a company server and no one else.

What is needed is a system that can identify when a user is logging into a site using login credentials that are restricted to another, sensitive site. For example, the user ties logging into their bank account using the username and password for their work account. The user's work login credentials are "wrong" in the sense they are not for accessing their bank account but are for accessing their work account. The system can warn the user of the mistake and/or block the user from submitting the login credentials to the site. When the user provides the right login credentials for a site, the system can pass them along to the site to complete the login process.

Figure 31:
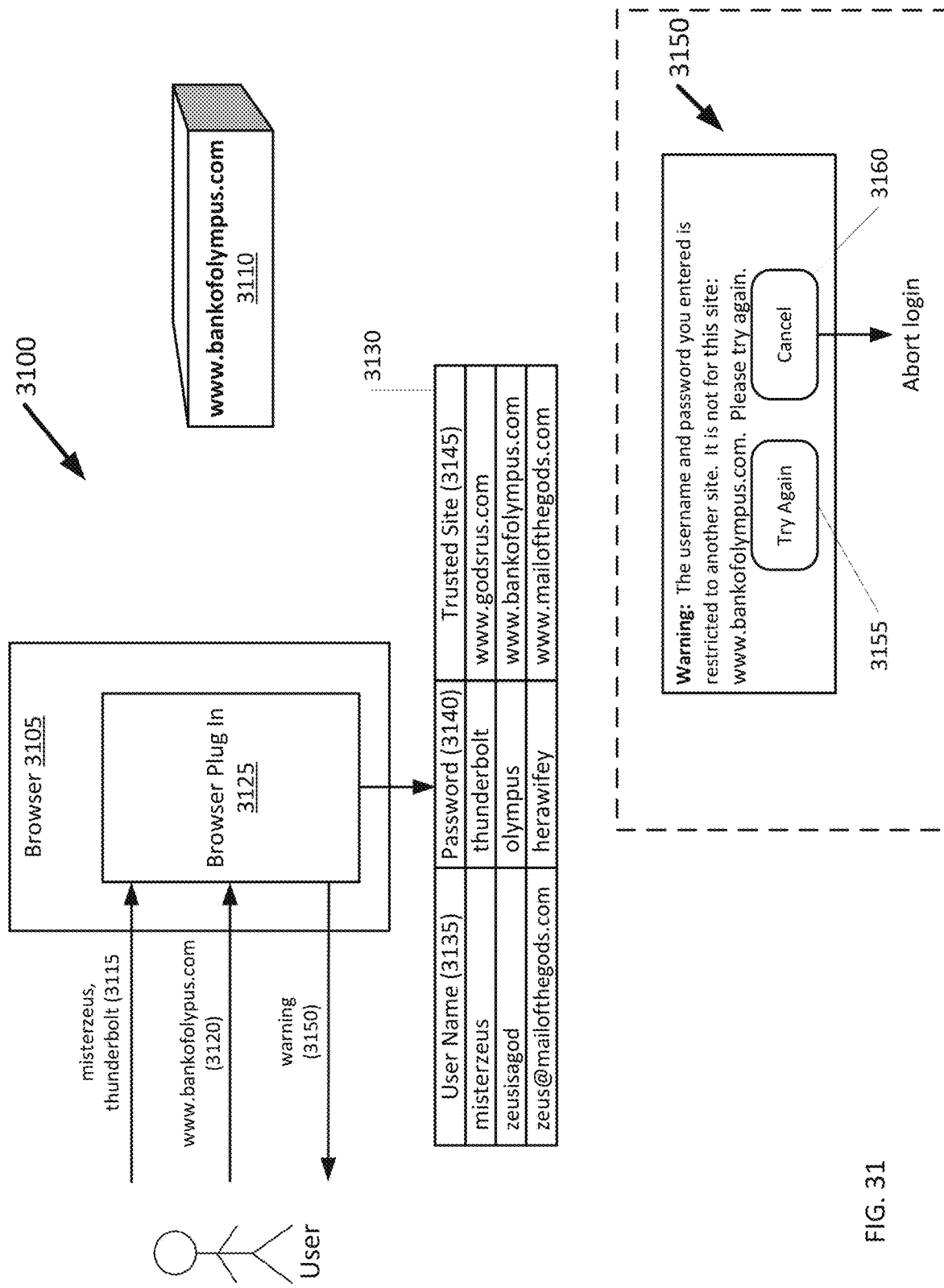
FIGS. 31 and 32 illustrate a system for warning a user that they entered a password that is restricted to another, sensitive site.

FIG. 31 shows a user navigating with their browser 3105 to a login page of 'The Bank of Olympus' (viz., bank website 3310) so they can check their bank account. The user provides their username and password, collectively login credentials 3115, and an identifier of the bank website 3310 (viz., www.bankofolympus.com). For ease of reference, a site requesting login credentials (e.g., the bank website 3310) is a called a "requesting site" and an identifier 3120 of the requesting site (e.g., www.bankofolympus.com) is called a "requesting site identifier". A system 3100 warns the user whether the login credentials 3115 they are providing are wrong for the requesting site, bank website 3110.

An example of the system 3100 includes a browser plugin 3125 that communicates with a data store 3130. The browser plugin 3125 can be included in the browser 3105 or used by the browser 3105. The data store 3130 can be stored locally (i.e., the browser plugin 3125 can access the data store 3130 without use of a network) or remotely in a database. Furthermore, the data store 3130 can be stored in any other format. For illustration purposes, the data store 3130 is described as and shown in the Figure as a table. As shown, the data store 3130 includes has a user name column 3135 with usernames associated with the user, a password column 3140 with passwords associated with the user, and a trusted site column 3145 with identifiers of trusted sites, called "trusted site identifiers".

In the example shown in the figure, the data store 3130 includes credentials and associated with trusted site identifiers (which can be described as 3-tuples) for the user's company account (misterzeus, thunderbolt, www.godsrus.com), the user's bank account (zeusisagod, olympus, www.bankofolympus.com), and user's email account (zeus@mailofthegods.com, herawifey, www.mailofthegods.com). Additional n-number of information can be stored for each account, in which case the information can be described as n-tuples.

The data store 3130 illustrates some possible login credentials and identifiers that may be used in one or more embodiments. The system 3100 can also use other type or types of credentials, such as any type of password or PIN. The system 3100 can use other identifiers include for example, without limitation, a domain name for the associated website, a complete URL for the web page, an IP address for the website, or information associated with or derived from a certificate associated with the website. The system 3100 can also use a combination of identifiers. For example, the browser plugin 3125 can compare the domain name and IP address associated with the website under question with the domain name and IP address associated with a trusted site. Some or all of the foregoing information can be stored in any unencrypted, encrypted, or hashed form. In convenient example, credentials stored in the data store 3130 are hashed using salted hashing.

In one or more embodiments, information for the data store 3130, including credentials and trusted site identifiers can be obtained from, augmented with, or validated against directories, registries, or databases that are organization-wide or that span organizations, such as for example ACTIVE DIRECTORY services. Information from multiple directories may be merged into or copied into the data store 3130, using for example utilities such as ADSYNC. The data store 3130 can also be created by an administrator. One or more embodiments of the system 3100 provide tools for administrators or other users to create or edit user registration entries and credentials, including for example tools to revoke user authorizations.

In response to the user's attempt to log into the bank website 3110, the browser plugin 3125 consults the data store 3130. The browser plugin 3125 looks up a trusted site identifier stored in the data store 3130 using the login credentials 3115 (misterzeus, thunderbolt) and finds the trusted site identifier 'www.godsrus.com', which corresponds to the user's company account.

The browser plugin 3125 compares the trusted site identifier (www.godsrus.com) with the requesting site identifier 3120 (www.bankofolympus.com) and determines they do not match. As such, the user provided the login credentials for their company account by mistake. In response, the browser plug-in blocks the user from submitting their company account credentials to the requesting site, bank website 3110. A convenient example of the browser plugin 3125 returns (displays) a warning 3150 to the user. The warning 3150 informs the user that they mistakenly entered credentials that are restricted to another, sensitive site. The warning 3150 can also include a "try again" option 3155 for the user to enter other credentials to login and/or a cancel option 3160 for the user to abort the login process.

Figure 32:
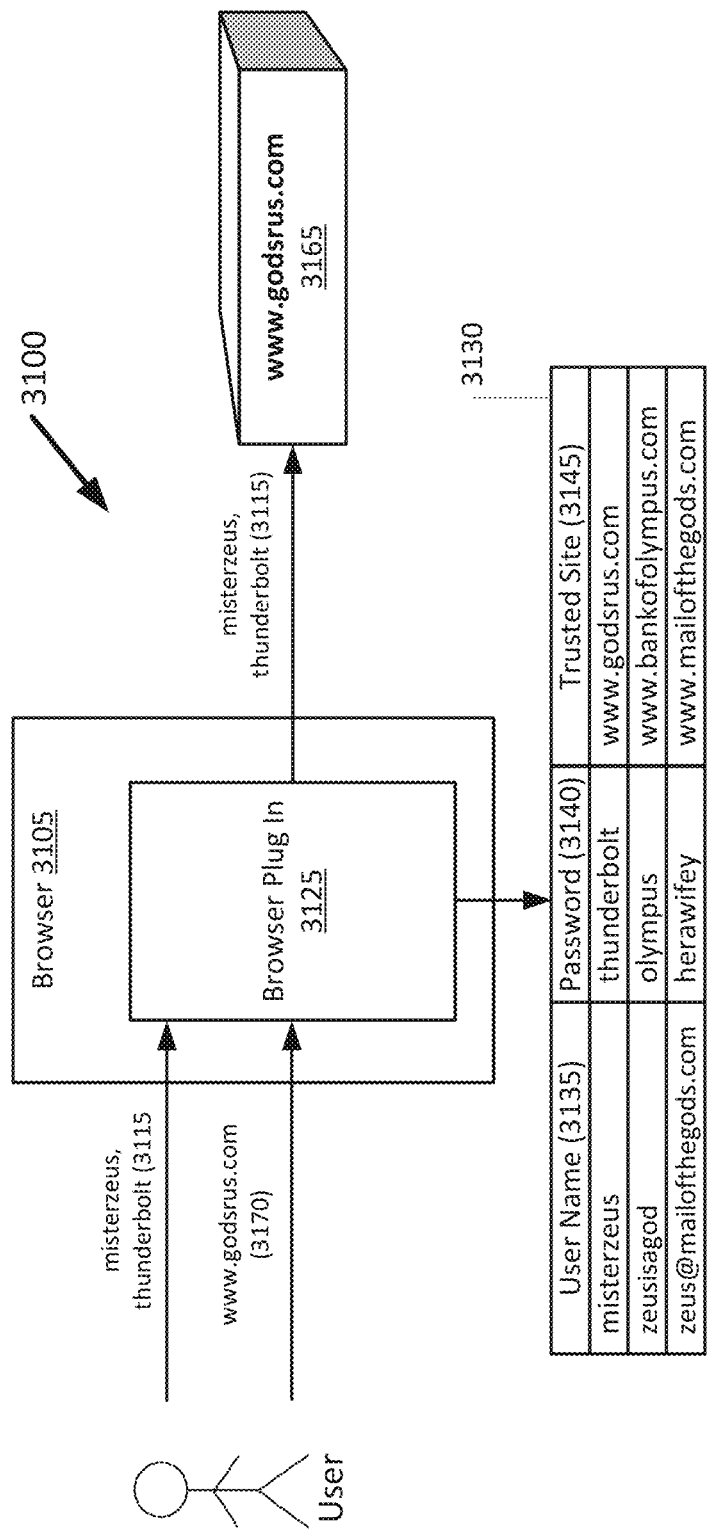

FIG. 32 shows the user navigating with their browser 3105 to a login page of 'Gods R Us' (viz., company website 3165) so they can log into their company account. The user provides the login credentials 3115 (misterzeus, thunderbolt) and a requesting site identifier 3170 of the company (viz., www.godsrus.com). In response, the browser plugin 3125 consults the data store 3130. The browser plugin 3125 looks up a trusted site identifier stored in the data store 3130 using the login credentials 3115 (misterzeus, thunderbolt) and finds the trusted site identifier 'www.godsrus.com'. The browser plugin 3125 compares the trusted site identifier (www.godsrus.com) with requesting site identifier 3170 (www.godsrus.com) and determines they match. As such, the user provided the correct login credentials for their company account. In response, the browser plugin 3125 submits the login credentials 3115 to the requesting site, company website 3165 to continue with the login process.

Examples of the system 3100 can also use screen images of a requesting site and a trusted site to determine whether login credentials provided by a user are correct for the requesting site. For the ease of reference, these images are called "screens". The system 3100 represents "durable" or "stable" parts of a screen by ignoring areas of the screen that change from one visit to another, such as display ads. The ignorable areas of the screen can be determined by examining a model that defines the logical structure of data (documents) and the way data is accessed and manipulated, such as the Document Object Model (DOM). Ignorable areas of the screen can also be determined by retrieving a page multiple times and determining which parts of the page have and have not changed. The browser plugin 3125 can store the stable parts of the screen or it can hash these parts for quick evaluation and comparison.

With respect to trusted sites, the browser plugin 3125 stores the stable parts of login pages of the trusted sites, called "trusted login screens". When a user navigates to the login page of the requesting site, for example, the browser plugin 3125 can hash the visual representation of the login page and compare the result to the hashes of the trusted screens. The hashes do not match when the user provides the wrong login credentials for the requesting site. In response, the browser plug-in blocks the user from submitting their credentials to the requesting site. The browser plugin 3125 can return (display) a warning (e.g., the warning 3150 of FIG. 31) to the user informing them that have used by mistake credentials that are restricted to another, sensitive site. Examples of the warning can also include a "try again" option for the user to enter other credentials to login and/or a cancel option for the user to abort the login process.

Examples of the system can also warn a user that they are providing credentials to a requesting site that is not safe for their credentials or other personal information, such as answers to security questions. By comparing the requesting site to a trusted site, the system can identify whether the requesting site is suspicious and, in turn, warn the user that the requesting site is unsafe for their personal information. A requesting site can be identified as an "unsafe site" based on a suspicion score for that site. For example, a suspicion score is compared with a threshold. Sites with high suspicion scores (e.g., above the threshold) may be blocked, those with low suspicion scores (e.g., below the threshold) may be allowed, and those with intermediate suspicion scores (e.g., at or near the threshold) may trigger a user warning. As another example, the requesting site is unsafe when suspicion score is in a specified range of values. Embodiments may use any desired methodology for calculating the suspicion score.

Continuing with the graphical analysis example described above, when the login screen of the requesting site matches a trusted login screen but the address of the requesting site differs from an address of the trusted site (or vice versa), the system computes a high suspicion score. In another example, the suspicion score may be determined based on how closely the domain name of a requesting site matches the domain name of a trusted site (while not matching it identically), as described above with reference to FIG. 7 (the domain name for a suspicious site 'www.bankorolympus.com' is similar to the domain name for a legitimate site 'www.bankorolympics.com'). In yet another example, the suspicion score for a requesting site identifier (such as domain name) may be determined based on how similar a display representation of the requesting site identifier is to a display representation of a trusted site identifier, as described above with reference to FIG. 18 (describing domain name 'www.bankofolympus.com' with the "a" in Cyrillic looks identical to the domain name 'www.bankofolympus' with the "a" in Latin). Comparison of display representations rather than underlying textual representations may protect against homograph attacks using internationalized domain names, for example.

A degree of similarity between a requesting site identifier and a trusted site identifier can be represented by a distance function or a similarity metric. An example of the distance function/similarity metric is described above with reference FIG. 18. When the distance/similarity metric is positive and below a threshold, for example, the requesting site is classified as an unsafe site for login credentials.

The browser plugin 3125 can look up a trusted site identifier in the data store 3130 as the user is typing in their login credentials. This can be done using any number of keyloggers, such as an application program interface (API)-based keylogger. The keylogger hooks a keyboard API inside the browser plugin 3125. The keylogger receives an event each time the user presses or releases a key while entering their login credentials. The keylogger records the events and passes them to the browser plugin 3125 to look up a trusted site identifier in the data store 3130.

While the invention herein disclosed has been described by means of specific embodiments and applications thereof, numerous modifications and variations could be made thereto by those skilled in the art without departing from the scope of the invention set forth in the claims.

What is claimed is:

1. A system for warning a user as to whether interaction with a site is safe or unsafe, the system comprising:
   a data store comprising trusted site identifiers of trusted sites; and
   a processor coupled to a non-transitory memory containing instructions executable by the processor to cause the system to:
   query the data store to obtain one or more trusted site identifiers of a trusted site including a screen image of the trusted site in response to a requesting site prompting a user for sensitive information;
   compare the trusted site identifiers with a corresponding number of identifiers of the requesting site including graphically comparing a screen image of the requesting site to the screen image of the trusted site to determine whether the requesting site is safe or unsafe based on the comparison of the trusted site identifiers with the requesting site identifiers including the graphical comparison of the screen image of the requesting site to the screen image of the trusted site; and
   permit the user to submit sensitive information if the requesting site is determined to be safe or prevent the user from submitting sensitive information if the requesting site is determined to be unsafe, wherein the comparing includes:
   determining a suspicion score based on the comparison of the trusted site identifiers with the requesting site identifiers including the graphical comparison of the screen image of the requesting site to the screen image of the trusted site; and
   determining whether the requesting site is either safe or unsafe based on the suspicion score.

2. The system of claim 1, wherein the sensitive information comprises user login credentials.

3. The system of claim 2, wherein the trusted site is associated with the user login credentials.

4. The system of claim 3, wherein the querying includes querying the data store as the user is entering in each character of user login credentials.

5. The system of claim 1, wherein determining whether the requesting site is either safe or unsafe includes comparing the suspicion score to a threshold.

6. The system of claim 1, wherein the requesting site is identified as unsafe when the suspicion score is in a specified range of values.

7. The system of claim 1, further comprising:
   providing a notification to the user indicating whether the requesting site is safe or unsafe.

8. The system of claim 1, wherein the suspicion score is a similarity metric determined based on a degree of similarity between a display representation of the requesting site identifier and a display representation of the trusted site identifier.

9. The system of claim 1, wherein the preventing of the user from submitting sensitive information comprises blocking the user from entering the sensitive information into an associated field provided by the requesting site when the requesting site identifiers do not match the trusted site identifiers.

10. The system of claim 1, wherein the requesting site identifiers and trusted site identifiers comprise any one of Uniform Resource Locators, Uniform Resource Identifiers, Internet Protocol addresses, domain names, and a combination thereof.

11. The system of claim 7, wherein the providing of the notification to the user that the requesting site is either safe or unsafe comprises warning the user that any sensitive information entered in a field provided by the requesting site is are restricted to another, sensitive site based on the comparison of the requesting site identifiers and trusted site identifiers.

12. A method for warning a user as to whether interaction with a site is safe or unsafe, the method comprising:
   providing a system comprising a processor coupled to a non-transitory memory containing instructions executable by the processor to cause the system to:
   query a data store, the data store comprising trusted site identifiers of trusted sites, to obtain one or more trusted site identifiers of a trusted site in response to a requesting site prompting a user for sensitive information;
   compare the trusted site identifiers with a corresponding number of identifiers of the requesting site including graphically comparing a screen image of the requesting site to the screen image of the trusted site to determine whether the requesting site is safe or unsafe based on the comparison of the trusted site identifiers with the requesting site identifiers including the graphical comparison of the screen image of the requesting site to the screen image of the trusted site; and
   permit the user to submit sensitive information if the requesting site is determined to be safe or prevent the user from submitting sensitive information if the requesting site is determined to be unsafe, wherein the comparing includes:
   determining a suspicion score based on the comparison of the trusted site identifiers with the requesting site identifiers including the graphical comparison of the screen image of the requesting site to the screen image of the trusted site; and
   determining whether the requesting site is either safe or unsafe based on the suspicion score.

13. The method of claim 12, wherein the sensitive information comprises user login credentials.

14. The method of claim 13, wherein the trusted site is associated with the user login credentials.

15. The method of claim 14, wherein the querying includes querying the data store as the user is entering in each character of user login credentials.

16. The method of claim 12, wherein determining whether the requesting site is either safe or unsafe includes comparing the suspicion score to a threshold.

17. The method of claim 12, further comprising:
   providing a notification to the user indicating whether the requesting site is safe or unsafe.

18. The method of claim 12, wherein the suspicion score is a similarity metric determined based on a degree of similarity between a display representation of the requesting site identifier and a display representation of the trusted site identifier.

* * * * *

UNITED STATES PATENT AND TRADEMARK OFFICE
CERTIFICATE OF CORRECTION

| | |
|---|---|
| PATENT NO. | : 11,258,785 B2 |
| APPLICATION NO. | : 16/732604 |
| DATED | : February 22, 2022 |
| INVENTOR(S) | : Jackie Anne Maylor et al. |

It is certified that error appears in the above-identified patent and that said Letters Patent is hereby corrected as shown below:

In the Claims

At Column 33, Claim number 11, Line number 3, please delete "are" after "is"

Signed and Sealed this
Twenty-sixth Day of April, 2022

*Katherine Kelly Vidal*

Katherine Kelly Vidal
*Director of the United States Patent and Trademark Office*